United States Patent [19]

Scott

[11] Patent Number: 5,113,455
[45] Date of Patent: May 12, 1992

[54] DIGITAL IMAGE SCALING BY STEPWISE PIXEL MOVEMENT

[75] Inventor: Kevin C. Scott, Rochester, N.Y.

[73] Assignee: Eastman Kodak Company, Rochester, N.Y.

[21] Appl. No.: 486,645

[22] Filed: Feb. 27, 1990

[51] Int. Cl.$^5$ .............................................. G06K 9/36
[52] U.S. Cl. ...................................... 382/47; 382/44; 358/451
[58] Field of Search ........................ 382/47, 56, 49, 44, 382/45, 46; 358/428, 451, 461

[56] References Cited

U.S. PATENT DOCUMENTS

| | | | |
|---|---|---|---|
| 3,976,982 | 8/1976 | Eiselen | 340/172.5 |
| 4,129,860 | 12/1978 | Yonezawa et al. | 340/324 |
| 4,302,776 | 11/1981 | Taylor et al. | 358/160 |
| 4,503,469 | 3/1985 | Kato | 358/287 |
| 4,532,602 | 7/1985 | DuVall | 364/577 |
| 4,587,621 | 5/1986 | DuVall | 364/577 |
| 4,610,026 | 9/1986 | Tabata et al. | 382/47 |
| 4,616,268 | 10/1986 | Shida | 358/287 |
| 4,636,869 | 1/1987 | Tomohisa et al. | 358/287 |
| 4,656,467 | 4/1987 | Strolle | 340/727 |
| 4,665,551 | 5/1987 | Sternberg | 382/49 |
| 4,712,140 | 12/1987 | Mintzer et al. | 358/260 |
| 4,764,975 | 8/1988 | Inoue | 382/47 |
| 4,829,587 | 5/1989 | Glazer et al. | 382/47 |
| 4,872,064 | 10/1989 | Tutt et al. | 358/464 |

OTHER PUBLICATIONS

S. Hazan, "A Novel LSI Architecture for Image Scaling", Proceedings of TENCON 87: 1987 IEEE Region 10 Conference 'Computers and Communications Technology Toward 2000', Seoul, Korea, 25–28 Aug. 1987, vol. 1, pp. 110–114.

K. Kashiwagi et al., "Scaling Algorithm for Bit-Map Image", IBM Technical Bulletin, vol. 27, No. 7B, Dec. 1984, pp. 4323–4325.

H. Hou et al., "Digital Processing of Halftone Images", Proceedings of the SPIE—The International Society of Optical Engineering, Methods of Handling and Processing Imagery, Los Angeles, Calif., Jan. 15–16, 1987, vol. 757, pp. 118–124.

P. Zamperoni, "Scaling of Contour-Coded Binary Images", Electronic Letters, Sep. 14, 1978, vol. 14, No. 19, pp. 608–610.

Primary Examiner—David K. Moore
Assistant Examiner—Yon Jung
Attorney, Agent, or Firm—Dennis R. Arndt

[57] ABSTRACT

Apparatus and accompanying method(s) digitally scaling, particularly reducing, an original image to yield a scaled image particularly suited for display by a document workstation in an image management system as one image in a composite multi-image display. Reduction scaling is achieved by mapping source pixels into destination pixels. Specifically, a reduced image is produced by moving through a source image by increments of a single full pixel with corresponding movement through a destination image in fractional movements in order to define corresponding pairs of pixel coordinate addresses in both images, i.e. one pixel coordinate address in the original image and a corresponding pixel coordinate address in the enlarged image. Once a pair of these addresses is defined, a current pixel in the enlarged image is set to the value of its corresponding pixel in the source image, with both of these pixels being defined by the integer values of their associated coordinate addresses. To digitally enlarge (magnify) the source image, incremental movement occurs on a pixel-by-pixel basis, both horizontally and vertically, in an enlarged image with fractional movement, in either both directions depending upon the desired scale factors, occurring in the source image. Given these incremental movements, the pixel values that occur at successive integer pixel coordinate addresses in the source image are merely copied, i.e. replicated, rather than mapped into corresponding integer pixel coordinate locations in the enlarged image.

20 Claims, 26 Drawing Sheets

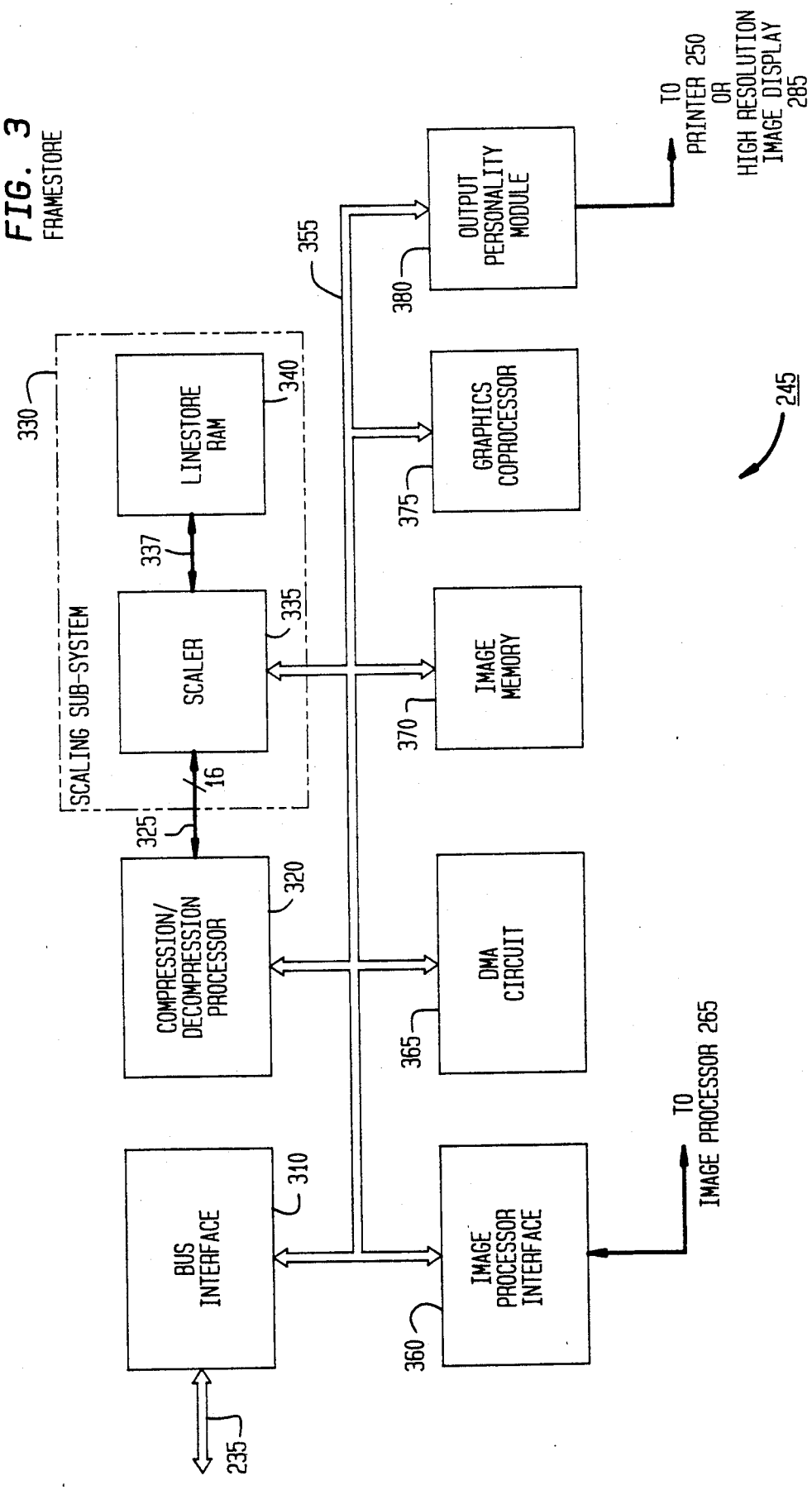

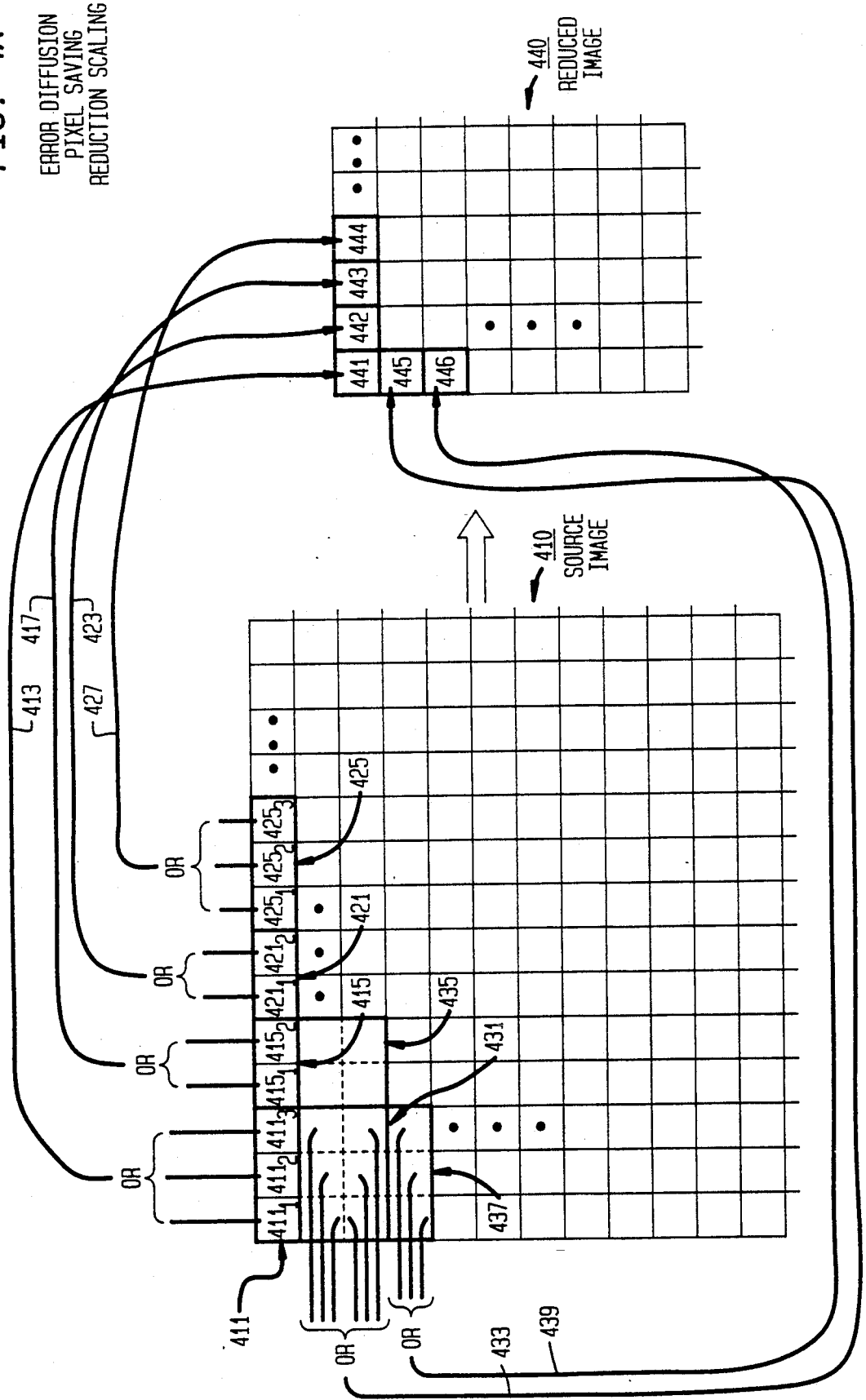

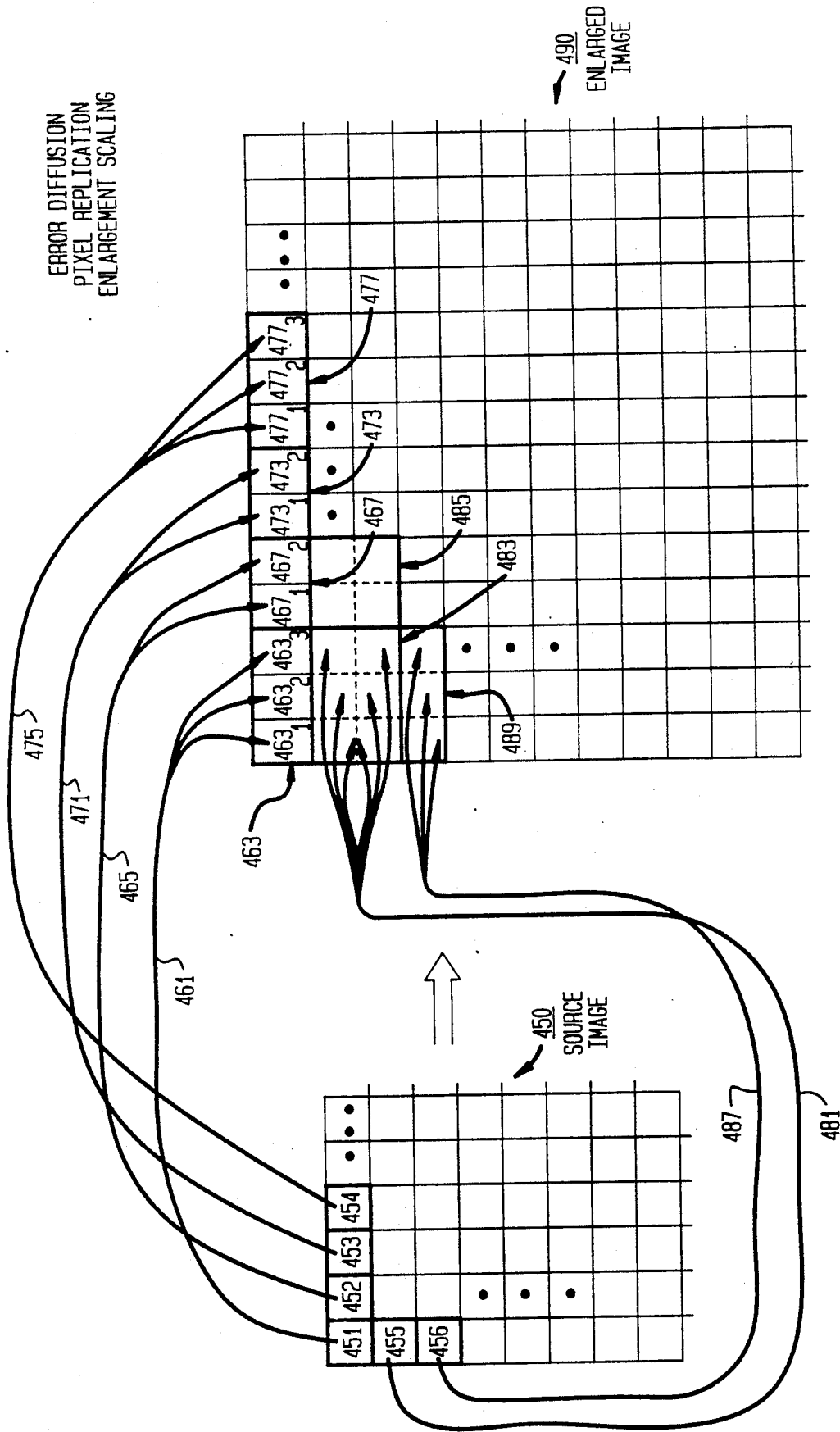

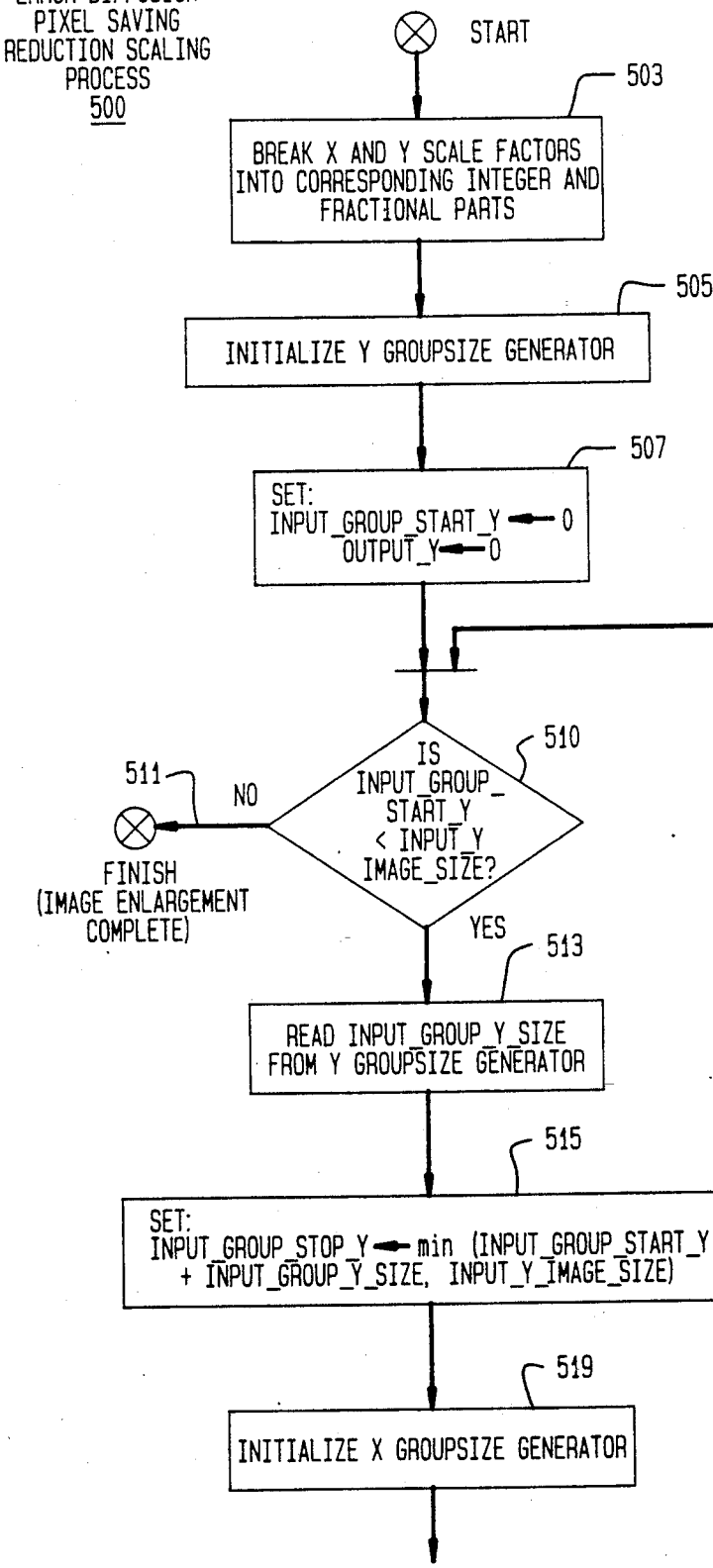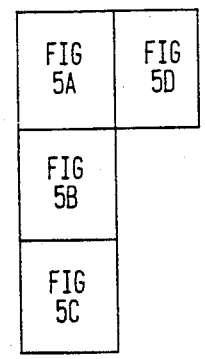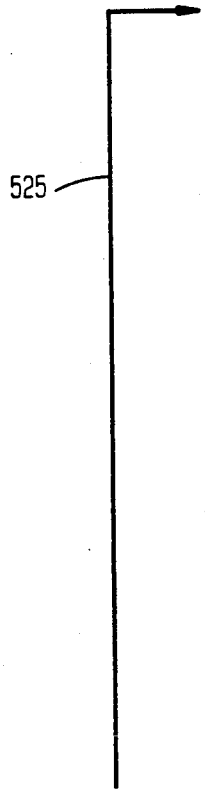

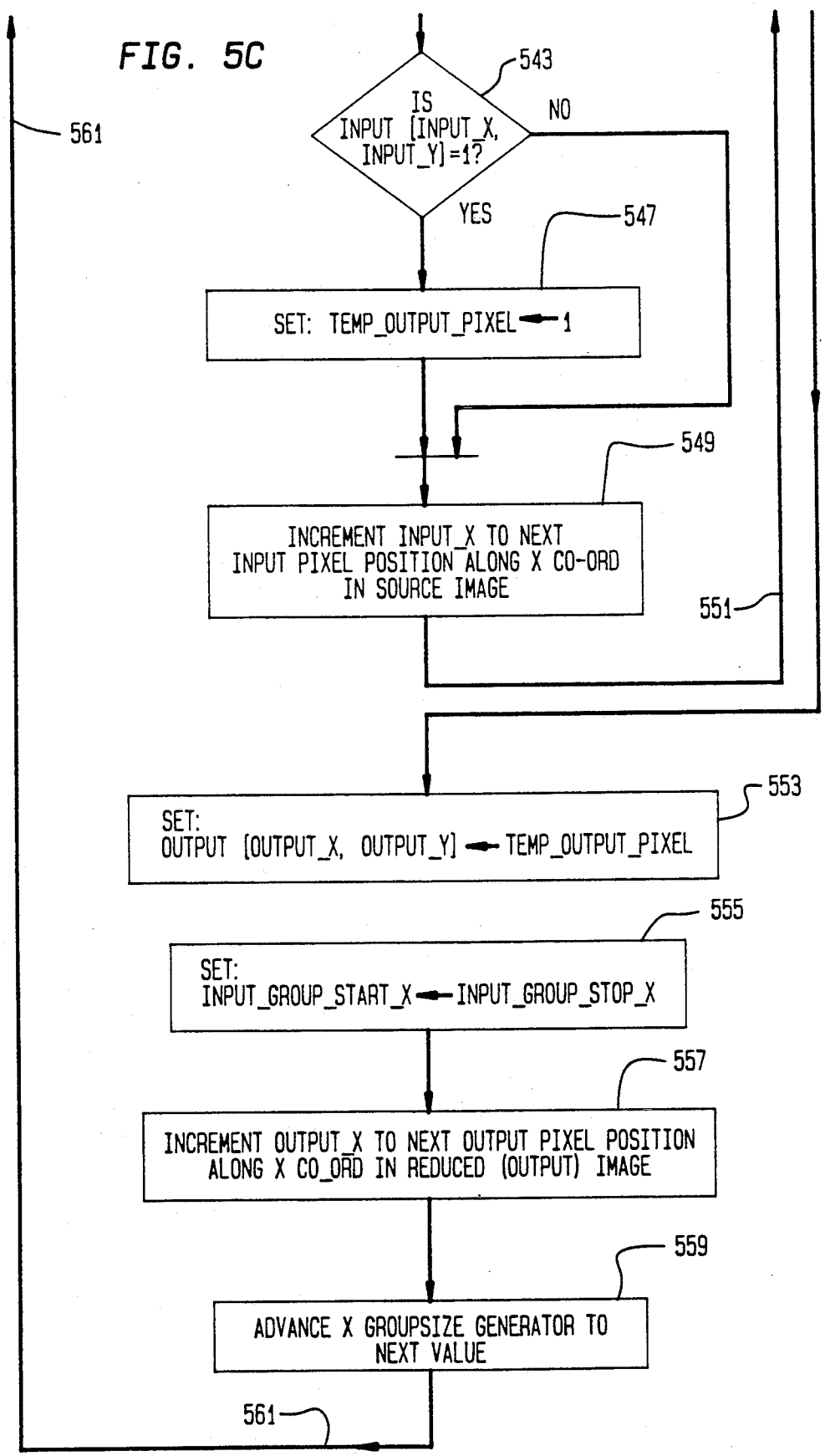

FIG. 6A
ERROR DIFFUSION
PIXEL REPLICATION
ENLARGEMENT SCALING
PROCESS
600
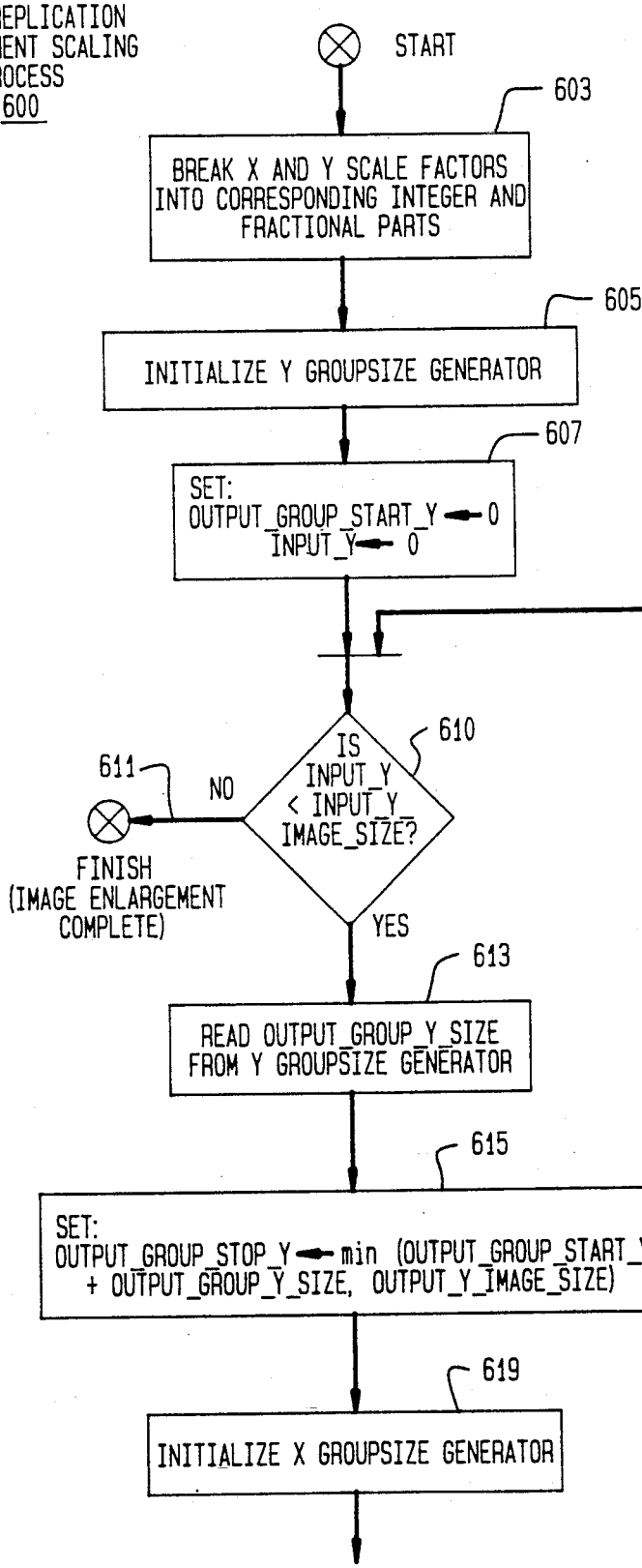
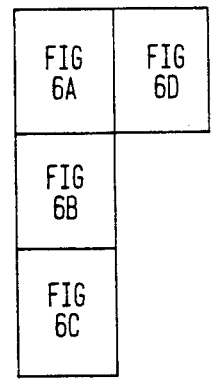
FIG. 6

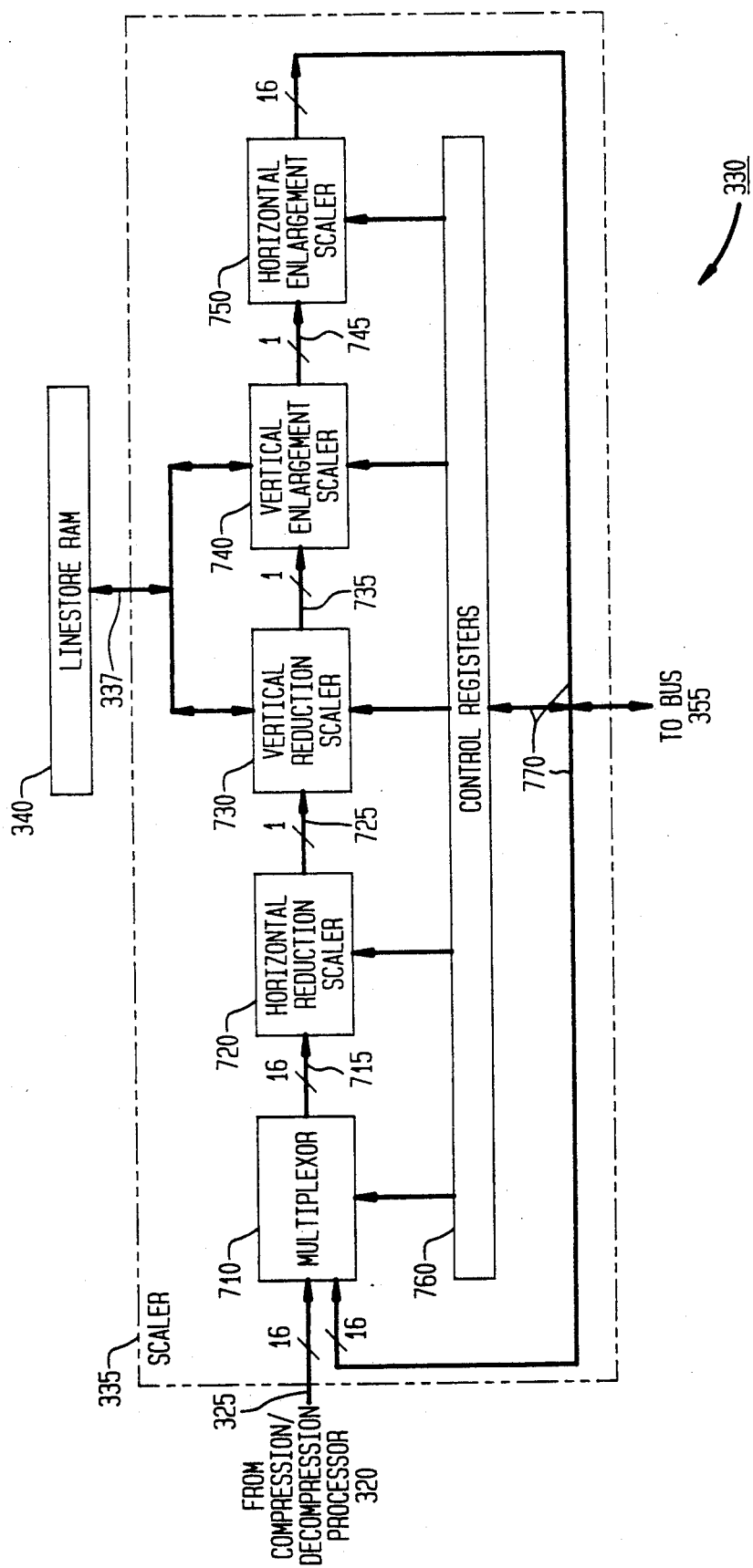

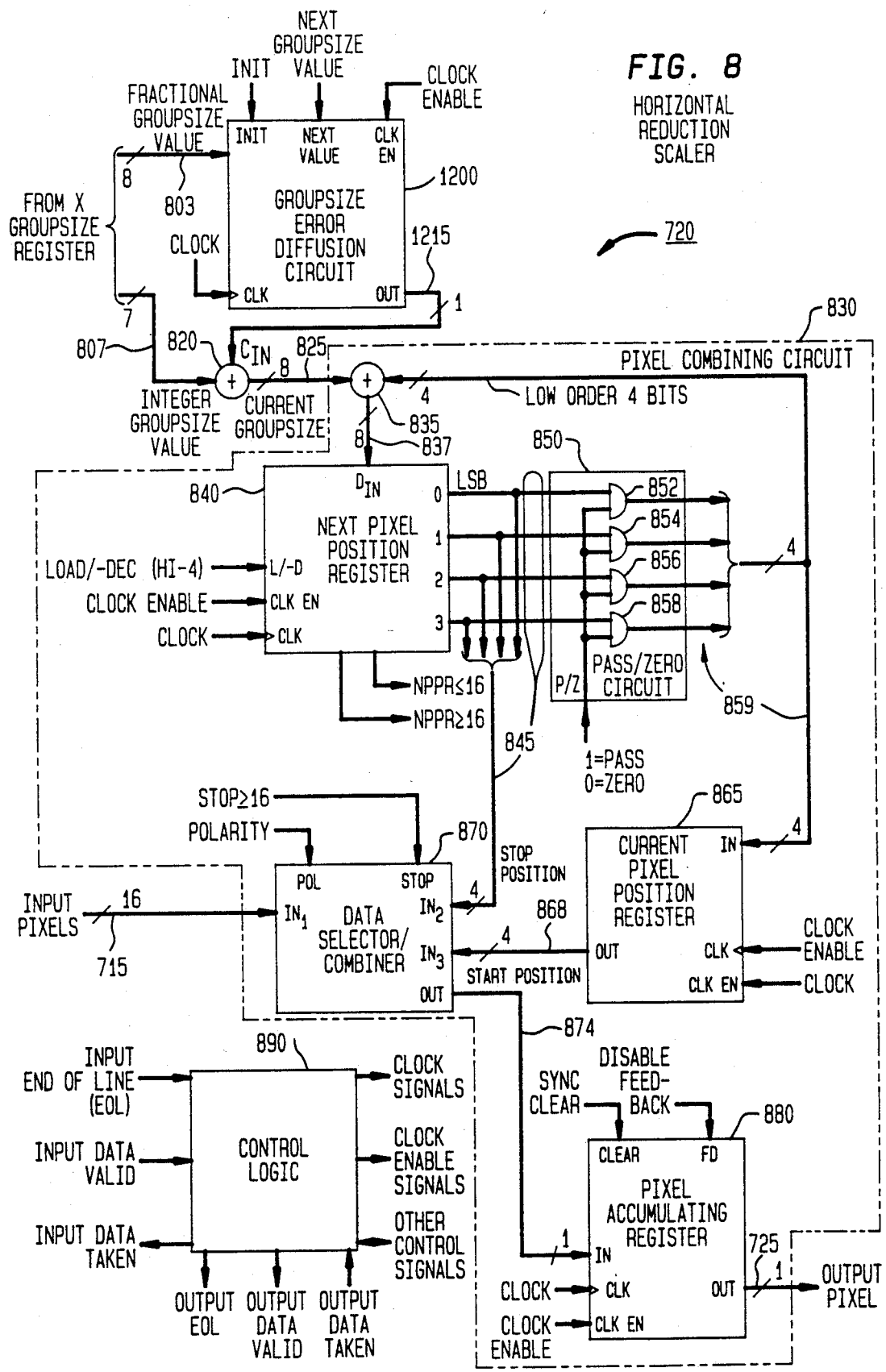

HORIZONTAL ENLARGEMENT SCALER

GROUPSIZE ERROR DIFFUSION CIRCUIT

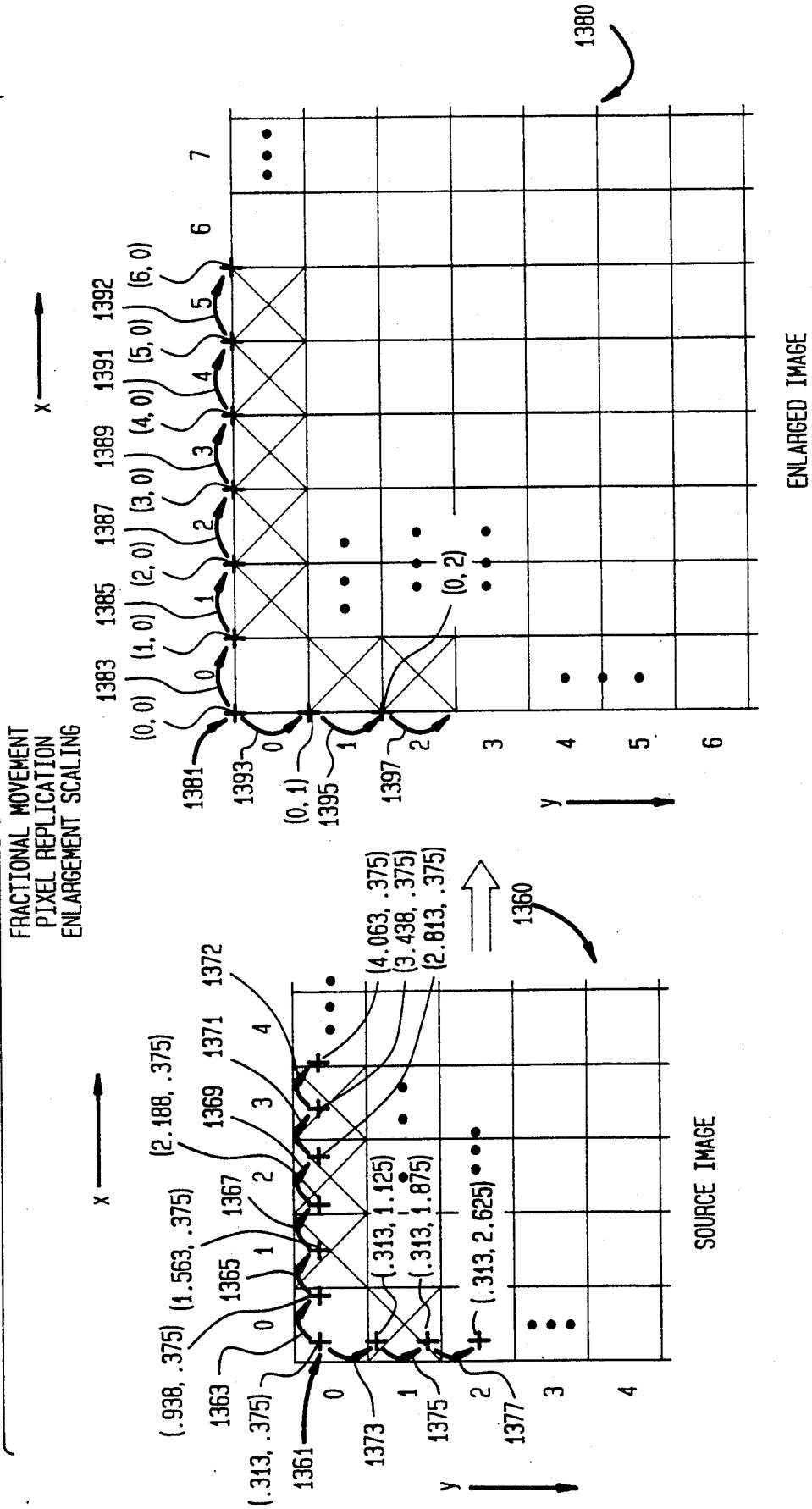

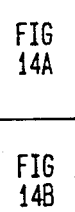

FIG. 14

| FIG 14A |
| FIG 14B |

FIG. 14A
FRACTIONAL MOVEMENT
PIXEL SAVING
REDUCTION SCALING
PROCESS
1400

 START

1405
SET:
X_OUTMOVE ← 1.0/X_SCALEFACTOR
Y_OUTMOVE ← 1.0/Y_SCALEFACTOR

1410
SET ALL PIXELS IN
REDUCED (DESTINATION) IMAGE TO ZERO

1415
SET:
INPUT_Y ← 0
OUTPUT_Y ← Y_OUTMOVE/2.0

1420
IS INPUT_Y < INPUT_Y_IMAGE_SIZE?

NO → FINISH 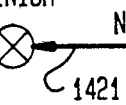
1421

YES 1425
SET:
INPUT_X ← 0
OUTPUT_X ← X_OUTMOVE/2.0

1430
IS INPUT_X < INPUT_X_IMAGE_SIZE?

1431 NO →
1455
INCREMENT PRESENT PIXEL
Y CO-ORD IN SOURCE
IMAGE BY 1:
INPUT_Y ← INPUT_Y+1

1460
FRACTIONALLY INCREMENT PRESENT
PIXEL Y CO-ORD IN REDUCED
(DESTINATION) IMAGE:
OUTPUT_Y ← OUTPUT_Y+Y_OUTMOVE

1463

1433 YES

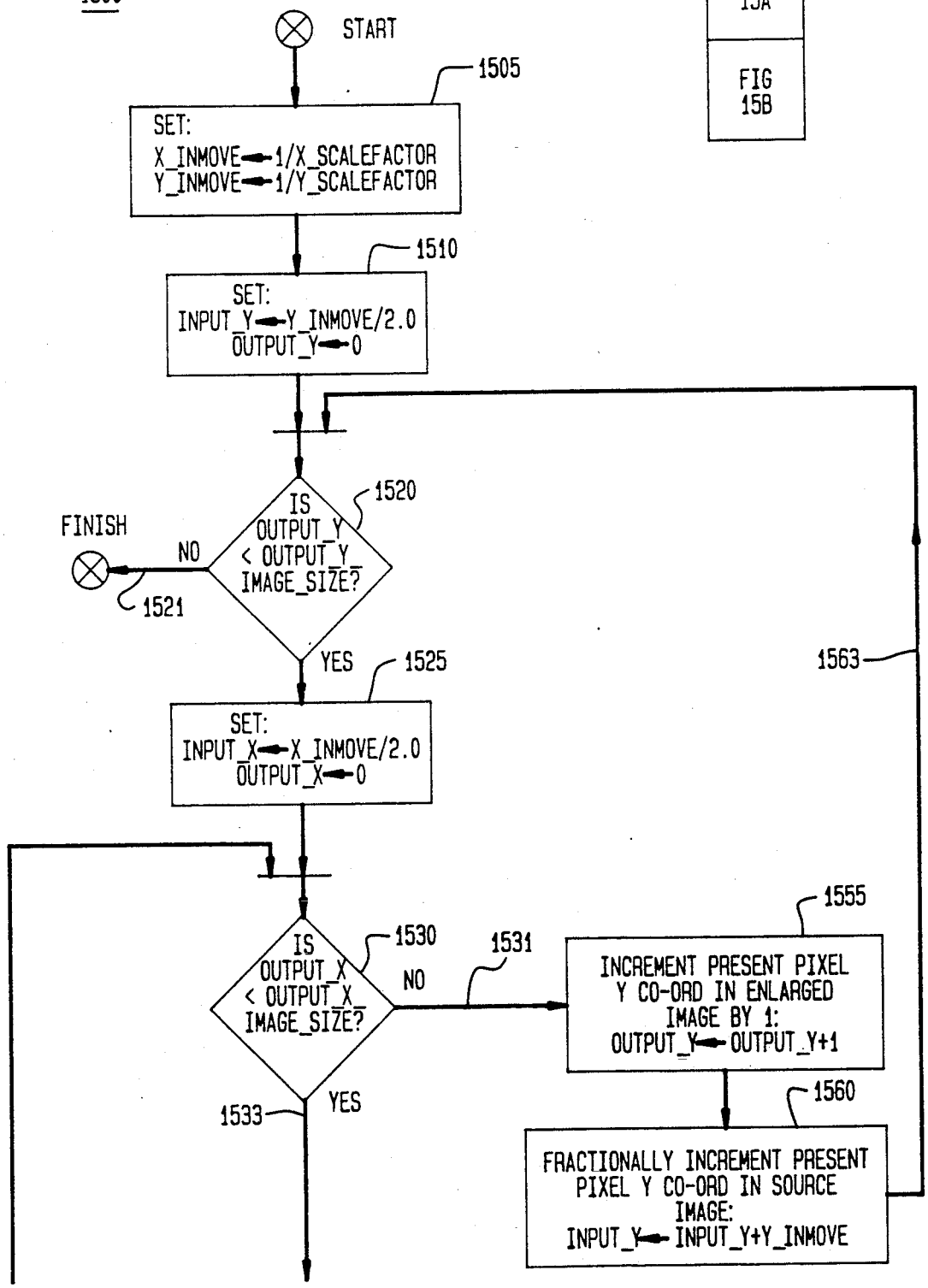

DIGITAL IMAGE SCALING BY STEPWISE PIXEL MOVEMENT

CROSS REFERENCE TO RELATED APPLICATION

This application describes and claims subject matter that is also described in a co-pending United States patent application entitled "A TECHNIQUE FOR PERFORMING DIGITAL IMAGE SCALING BY LOGICALLY COMBINING OR REPLICATING PIXELS IN BLOCKS OF DIFFERING GROUP-SIZES", that has been filed simultaneously herewith, assigned Ser. No. 07/486,646,now issued and is commonly owned by the present assignee.

TECHNICAL FIELD OF THE INVENTION

The invention relates to a technique, specifically apparatus and accompanying method(s) for use therein, for digitally scaling an image and particularly, though not exclusively, for providing scaled, reduced sized, images that are to be separately displayed as part of a composite multi-image display by a document workstation used within an image management system.

BACKGROUND ART

Gray scale images of various documents are often stored on microfilm for subsequent retrieval in order to conserve storage space by advantageously eliminating the need to store bulky paper originals. Retrieving (accessing) a microfilmed image of a document, on a manual basis, typically requires locating a desired roll of microfilm that houses the desired image, loading the roll into a manual reader and then advancing the microfilm to a desired frame at which the image is located. Thereafter, the image is optically enlarged and displayed on the reader.

Now, to minimize image retrieval time, particularly for archives that store a substantial number of documents, and also to permit the retrieved image to be electronically enhanced and processed, image management systems have been developed in the art. These systems are typified, for example, by the Kodak Image Management System (KIMS) system currently manufactured by the present assignee (KIMS is a trademark of the Eastman Kodak Company). Essentially, the KIMS system first locates the desired microfilm roll and frame through a computerized database inquiry. Then, an automated microfilm reader, i.e. a so-called film library also known as an autoloader, operating under computer control, fetches and then loads the desired roll into the reader. Once this has occurred, the film library automatically advances the roll to the desired frame. Thereafter, the film library electronically scans and digitizes a gray scale microfilm image present at the desired frame typically at a resolution of 300-400 dots/inch (approximately 118-157 dots/centimeter—cm), and finally applies the resulting digitized bi-tonal image onto a local area network for storage, display and/or printing at an appropriate node within the system.

An image management system, such as the KIMS system, generally contains several different nodes interconnected through a local area network and connected through a wide area network to other processing equipment, such as illustratively a host computer. Each such node, depending upon its sophistication, illustratively provides one or more image processing and/or network functions; for example, paper or film scanning, image printing, image display, file serving, and/or an interface to the wide area network. A document workstation typically serves as one of these nodes. Typically, a user of such an image management system enters commands to the system through a document workstation and in response receives displayed images in one form or another therefrom. The workstation transmits commands through local and/or wide area network connections from the user to a suitable node within the system or to an external host processor and thereafter receives appropriate compressed image data therefrom.

Frequently, the user of an image management system can readily identify a particular file of related images but can not readily identify which specific image he or she needs without first examining each image in that file. In particular, through the workstation, the user selects a given image file by examining successive portion(s) of a computer based cross-reference file resident on, for example, a host computer until he or she locates the image file of interest. Once this image file is located, the user, through the workstation, can command the host computer to download microfilm roll and frame numbers associated with all the images contained within the selected image file to the film library connected to a scanner node, then instruct the film library to sequentially access, scan, digitize and compress each image in the file and finally transfer each resulting compressed image over a local and/or wide area network connection(s) to the workstation for local display thereat. The user would then be required to observe each successive resulting image that appeared on the workstation until the specific image(s) he or she wanted was displayed. Unfortunately, by forcing the user to successively examine each image in the image file, a significant burden is placed on the user which frustrates the user and tends to greatly waste his or her time, particularly where the image file contains more than just a very small number of images.

Consider, for example, an image management system that stores image files of related documents for insurance claims. Such an image file associated with a single claim for property damage may contain illustratively 15-20 separate images of which some images may depict a claim form, other images may depict a report(s) from an insurance adjuster that documents property damage and so on for all other related documentation in the file. Accordingly, if a user sought to obtain an image of a specific item, such as the last item, contained within this particular image file, that user would be forced to wait until all the images for all preceding items in this file were successively displayed. Inasmuch as each image, depending upon its content, may take upwards of at least several seconds to be fully displayed at the workstation, the user could be waiting a minute or more until the particular image he or she wanted was displayed. If a wait of this or a similar duration were to be experienced by the user each time he or she accessed an image file, the user would likely waste a significant amount of time and become quite frustrated at the apparent slow response time of the image management system.

The vast majority of the images stored within an image management system tends to be of textual documents that may; as in the case of forms, also contain line art. Such textual images are bi-tonal in nature and predominantly contain background color with interspersed patterns of foreground color associated with textual characters and/or line art. The background color is usually either black or white with the foreground color being opposite in nature, i.e. respectively either white or black. The vast majority of the pixels that form any such textual image takes on the background color. After being digitized, the textual images are well thresholded but do not contain dithering or error diffusion.

One way to reduce the time required of a user to examine separate images in an image file would be to simultaneously display a number of these images at a document workstation, each at a reduced size in, for example, a corresponding non-overlapping portion of a composite multi-image display. As such, the display would resemble a grid of separate images, with each image being displayed at a reduced scale. The grid may illustratively contain 16 or 20 such images situated in separate corresponding cells contained within, for example, a common 4-by-4 or 4-by-5 matrix that fills a display screen. Once the composite display fully appeared on the display screen, the user could then very quickly glance through the entire display and select a particular image(s) he or she wanted for subsequent display at full scale. Advantageously, all the operations including the formation and depiction of the composite display at the workstation, image selection by the user and ultimate full scale display of the selected image(s) at the workstation would occur within a much shorter interval of time than that which would otherwise be required to successively display each image in the matrix at full scale.

Various techniques exist in the art to scale, specifically reduce, bi-tonal images. Unfortunately, for one reason or another, none of these techniques has proven to be completely satisfactory for use in forming composite images for display at a workstation in an image management system. Generally, though not always, these prior art techniques involve use of either convolution or two dimensional interpolation. For example, U.S. Pat. No. 4,829,587 (issued to Glazer et al on May 9, 1989) describes apparatus for re-scaling an image that relies on assembling sets of pixel values from an original image into sub-matrices and thereafter convolving the sub-matrices to compute scaled pixel values. This apparatus appears to be rather complex to implement. Another approach described in U.S. Pat. No. 4,302,776 (issued to Taylor et al on Nov. 24, 1981) relies on interpolating pixel values from an original image in both horizontal and vertical directions to yield a scaled image. A second interpolation based scaling technique is described in both U.S. Pat. Nos. 4,532,602 and 4,587,621 (both issued to DuVall on Jul. 30, 1985 and May 6, 1986, respectively). This technique relies on interpolating between pairs of pixel values to provide a scaled pixel value. Unfortunately, interpolation techniques tend to be arithmetically intensive and, as such, usually require an excessive number of clock cycles to process incoming pixel data. Consequently, interpolation based techniques tend to disadvantageously reduce the speed at which a multi-image composite display could be depicted by a document workstation, thereby limiting the throughput at which such images can be displayed by an image management system.

Another scaling technique, involving neither convolution or interpolation, is described in U.S. Pat. No. 4,610,026 (issued to Tabata et al on Sep. 2, 1986). This particular technique relies on determining each pixel value in a scaled image from a matrix of pixel values in an original image through use of periodicities that occur between corresponding image elements situated in the matrix in an original image and a corresponding matrix of pixels in a scaled image as defined by scale factor or magnification ratios occurring therebetween as well as from the pixel values in the matrix in the original image. Unfortunately, this technique also appears to be quite complex to implement.

Inasmuch as scaling techniques known in the art generally attempt to preserve as much image detail that resides in an original image as possible in an output image scaled therefrom, these prior art techniques, such as illustratively those specifically discussed above, tend to be complex to implement and/or consume an inordinate amount of processing time to perform. For these reasons, such techniques are not ideally suited for use in fabricating a composite multi-image display for display in an image management system.

Nevertheless, it is generally recognized in the art that a human eye can quickly recognize the overall content of a displayed image even though that image contains a considerable loss of detail. Accordingly, a composite multi-image display, which is to be used in an image management system and is merely displayed to allow a user to select among its constituent reduced images, can contain a significant amount of error as long as sufficient visual information remains in each reduced image to enable the user to quickly and grossly recognize the overall content of that image. Therefore, in providing such a composite image for display in an image management system, the need to preserve image detail becomes quite subservient to the need to provide a scaling technique that is relatively simple and inexpensive and performs image reduction relatively fast.

Therefore, a need exists in the art for a scaling technique that is useful in forming scaled, specifically reduced, versions of original images for display by an image management system and which is relatively simple and inexpensive to implement and is capable of producing scaled images within a minimal amount of processing time. The technique should operate with original images that generally contain textual and/or line art material, are predominantly background with essentially no dithering or error diffusion and are well thresholded. Furthermore, the technique should not be constrained to preserving considerable amounts of fine image detail in each scaled image but instead can produce scaled images that, in fact, contain a considerable loss of detail provided that the detail that remains in each scaled image is generally sufficient to permit a user to quickly recognize the overall content of that scaled image.

DISCLOSURE OF THE INVENTION

Accordingly, an object of the present invention is to provide apparatus and accompanying method(s) for scaling, specifically reducing, an original image for display as part of a composite image by a document workstation in an image management system.

A specific object is to provide such apparatus and accompanying method(s) that are relatively simple and inexpensive to implement.

Another specific object is to provide such apparatus and accompanying method(s) that are capable of producing scaled, specifically reduced, images within a minimal amount of processing time.

Another object is to provide such apparatus and accompanying method(s) that operate with original images that generally contain textual and/or line art material, are predominantly background with essentially no dithering or error diffusion and are well thresholded.

Lastly, another object is to provide apparatus and accompanying method(s) that are not constrained to preserving considerable amounts of fine image detail in each scaled image but rather are able to produce a scaled image that contains a sufficient amount of detail which readily permits a user to quickly recognize the overall shape of that scaled image.

These and other objects are accomplished in accordance with the teachings of the present invention by the inventive error diffusion pixel saving reduction scaling technique.

Specifically, reduction scaling is achieved through the inventive error diffusion pixel saving reduction scaling technique by logically combining pixel values in each block of pixels in an original bi-tonal image, preferably through an "OR" operation, in order to generate a corresponding single pixel value in the scaled image. To reduce an original image by a non-integer scale factor, the pixel blocks that form the original image are assigned differing groupsizes that periodically vary on a two-dimensional pattern from block to block throughout the original image. In particular, the horizontal and vertical size of successive horizontally and vertically aligned blocks of pixels in the original image is periodically varied between first and second corresponding integer values that respectively span the desired horizontal and vertical non-integer scale factors. The average value of the periodic variation occurring in each direction throughout a sufficiently large two-dimensional area in the original image substantially equals the fractional portion of the non-integer scale factor that occurs in that direction. If integer scaling is desired in either the horizontal or vertical direction, then the groupsize remains the same along that direction from block to block throughout the original image.

In accordance with the teachings of a preferred embodiment of the invention, two error diffusion circuits, which collectively produce a separate pre-defined periodic pattern of ones and zeroes for the vertical and horizontal directions, are used to generate a periodic variation between the two corresponding integer scale factors in each of these directions.

In accordance with a feature of the present invention, enlargement scaling can occur through use of a variation of the inventive error diffusion pixel saving reduction scaling technique, i.e. through use of the inventive error diffusion pixel replication enlargement scaling technique. Here, for enlargement scaling, each pixel in the original image is replicated to form a corresponding block of pixels in a destination (enlarged) image. In order to two-dimensionally magnify the source image by non-integer scale factors in both the horizontal and vertical directions, the groupsize of successive pixel blocks in the destination image is appropriately varied, also through a corresponding two-dimensional pattern. The groupsize remains fixed along either direction if the original image is to be magnified along that direction by an integer scale factor.

The above and other objects are also accomplished in accordance with the teachings of the present invention by the inventive fractional movement pixel saving reduction scaling technique.

Specifically, rather than relying on logically combining a block of pixels of varying groupsizes in order to yield a single pixel value in a reduced sized image with a one- or two-dimensional variation in the groupsize of successive blocks as defined by the vertical and horizontal scale factors, the inventive fractional movement pixel saving reduction scaling technique produces a scaled image by mapping source pixels into destination pixels. Specifically, a reduced image is produced by moving through a source (original) image by increments of a single full pixel with corresponding movement through a destination (reduced) image in fractional pixel movements to define corresponding pairs of pixel coordinate addresses in both images, i.e. one pixel coordinate address (location) in the original image and a corresponding pixel coordinate address in the reduced image. Once a pair is defined, a current pixel in the reduced image (as defined by the integer portion of the current coordinate address therein) is conditionally set to the value of its corresponding pixel in the source image (as defined by the integer portion of the current coordinate address therein) thereby effecting pixel saving.

In accordance with another feature of the invention, enlargement scaling can occur through use of a variation of the inventive fractional movement pixel saving reduction scaling technique, i.e. through use of the inventive fractional movement pixel replication enlargement scaling technique. To digitally enlarge (magnify) an original bi-tonal image, in accordance with the teachings of the inventive fractional movement pixel replication enlargement scaling technique, incremental movement occurs on a pixel-by-pixel basis, both horizontally and vertically, in an enlarged image with fractional pixel movement, in either or both directions depending upon the desired scale factors, occurring in the source (original) image. Given these incremental movements, the pixel values that occur at successive integer pixel coordinate locations in the source image are merely copied, i.e. replicated, into corresponding integer pixel coordinate locations in the enlarged image.

BRIEF DESCRIPTION OF THE DRAWINGS

The teachings of the present invention may be readily understood by considering the following detailed description in conjunction with the accompanying drawings, in which:

FIG. 3 depicts a block diagram of illustrative framestore 245 shown in FIG. 2;

FIG. 4A diagrammatically shows the manner through which an illustrative source image is scaled to yield an illustrative reduced image using the inventive error diffusion pixel saving reduction scaling method;

FIG. 4B diagrammatically shows the manner through which an illustrative source image is scaled to yield an illustrative enlarged image using the inventive error diffusion pixel replication enlargement scaling method;

FIG. 5 depicts the correct alignment of the drawing sheets for FIGS. 5A-5D;

FIGS. 5A-5D collectively depict a flowchart of Error Diffusion Pixel Saving Reduction Scaling process 500 that performs image reduction according to the inventive error diffusion pixel saving reduction scaling method;

FIG. 6 depicts the correct alignment of the drawing sheets for FIGS. 6A-6D;

FIGS. 6A-6D collectively depict a flowchart of Error Diffusion Pixel Replication Enlargement Scaling process 600 that performs image enlargement according to the inventive error diffusion pixel replication enlargement scaling method;

FIG. 7 depicts a block diagram of scaling sub-system 330 shown in FIG. 3 that performs image reduction and enlargement using the inventive error diffusion pixel reduction scaling, and error diffusion pixel replication enlargement scaling methods;

FIG. 8 depicts a block diagram of horizontal reduction scaler 720 shown in FIG. 7;

FIG. 13B diagrammatically shows the manner through which an illustrative source image is scaled to yield an illustrative enlarged image using the inventive fractional movement pixel replication enlargement scaling method;

FIG. 14 depicts the correct alignment of the drawing sheets for FIGS. 14A and 14B;

FIGS. 14A and 14B collectively depict a flowchart of Fractional Movement Pixel Saving Reduction Scaling process 1400 that performs image reduction according to the inventive fractional movement pixel saving reduction scaling method;

FIG. 15 depicts the correct alignment of the drawing sheets for FIGS. 15A and 15B;

FIGS. 15A and 15B collectively depict a flowchart of Fractional Movement Pixel Replication Enlargement Scaling process 1500 that performs image enlargement according to the inventive fractional movement pixel replication enlargement scaling method.

To facilitate understanding, identical reference numerals have been used, where possible, to denote identical elements that are common to various figures.

MODES OF CARRYING OUT THE INVENTION

After reading the following description, those skilled in the art will readily appreciate that the inventive scaling technique can be used in a multitude of different image processing applications for electronically scaling an image. The image itself can be obtained from a wide variety of different sources, such as illustratively from either magnetic or optical media, or from a paper or microfilm scanner or even from a network connection from other electronic and/or electro-optic image processing or scanning equipment. One such illustrative application of the inventive scaling methods involves locally scaling each image in a succession of images transmitted over a network connection to a document workstation in an image management system in order to produce a succession of reduced size images wherein each of the images will be simultaneously displayed in a non-overlapping portion of a common display screen at the workstation in order to provide a composite multi-image display. Inasmuch as the inventive system is particularly suited for use in an image management system, such as but not limited to for example the Kodak Image Management System (KIMS) system (KIMS is a trademark of Eastman Kodak Company), and specifically within a document workstation used within that system to provide such a composite multi-image display, the inventive scaling methods will be primarily discussed in that context.

Figure 1:
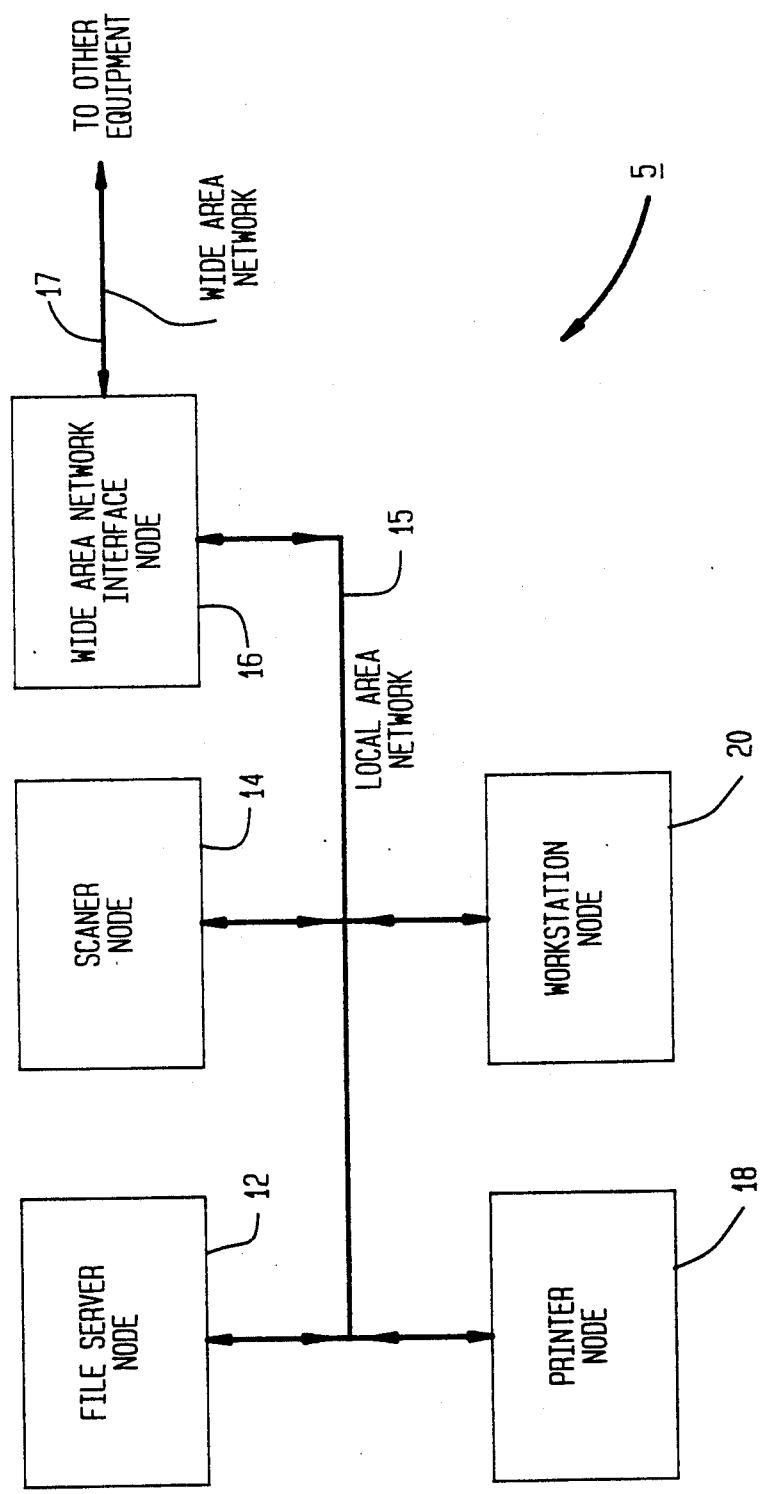
FIG. 1 depicts a simplified block diagram of a portion of image management system 5 that incorporates the teachings of the present invention.

A simplified block diagram of a portion of image management system 5 that incorporates the teachings of the present invention is depicted in FIG. 1. As shown, this system contains various nodes, specifically file server node 12, scanner node 14, wide area network interface node 16, printer node 18 and workstation node 20, all interconnected through local area network 15. These nodes can be situated at a single geographic location or can be dispersed over a relatively small geographic area as determined by the transmission capabilities of the local area network. Depending upon the configuration of system 5, this system may actually contain more than one of each of these nodes interconnected through one or more separate local area networks. To simplify the discussion, system 5 will be assumed to contain just one of each of these nodes interconnected through a single local area network.

Wide area network interface node 16 permits any of the other four nodes, i.e. file server node 12, scanner node 14, printer node 18 and workstation node 20, to communicate with other equipment (not shown), such as a remote host computer, through a logical connection established over wide area network 17 between that node and the equipment. The remote host computer provides centralized storage of, inter alia, image management data files. A user interacts with image management system 5 as well as with the other equipment connected thereto, such as the remote host computer, through workstation node 20. Through the workstation, the user can enter commands to the host computer to access stored images as well as to enter commands to any of the other nodes to perform other image processing operations. Workstation node 20 contains, as shown in FIG. 2 and discussed in detail below, a keyboard and associated display screen for entering commands and associated data into the system, a high resolution image display for providing a local display of accessed or scanned images, a local image memory for locally storing images, an image processor for providing local image processing, a scanner sub-system for locally scanning paper images into the image management system and typically a printer sub-system for locally generating a hardcopy depiction of an image.

By entering suitable instructions through the workstation, specifically the keyboard contained therein, a user can instruct the host computer to search through the image management data files in order to locate an image file of interest and download corresponding roll and frame numbers associated with each image in this file to a scanner node, such as scanner node 14 shown in FIG. 1, along with appropriate instructions to sequentially access and digitize each of these images. Alternatively, if the user is able to specify exactly which image is of interest from those stored within the image file, then the roll and frame numbers for just that image can be accessed by the host computer and thereafter supplied to the scanner node. In any event, scanner node 14 is incorporated into a film library (not shown). Given the instructions received from the host computer, the scanner node controls the film library to fetch and load a specified roll of microfilm into a microfilm reader contained within the library and thereafter advance the roll to a specified frame. The scanner node then electronically scans and digitizes a gray scale microfilm image present at the specified frame into a bit-mapped bi-tonal image typically at a resolution of 300-400 dots-/inch (approximately 118-157 dots/centimeter—cm), compresses the resulting bit-mapped bi-tonal image, and finally applies the compressed image as a packet with a suitable header (well known and not shown) onto local area network 15. Generally, documentary images are stored on the image management system. After being scanned and digitized, the resulting digitized images are well thresholded but do not contain dithering or error diffusion. If an entire image file is requested, as typically occurs, then the process described above is repeated to produce a digitized image for each stored image that resides in the desired image file.

The resulting compressed image(s) is routed as successive packets, over local area network 15, to workstation node 20. The workstation node then displays each of these images to the user at full scale on the high resolution display. If the user has instructed the host computer to access an entire image file, then each stored image will be successively displayed in full scale fashion on the high resolution display contained within workstation node 20. Once a particular image of interest in the file is fully painted onto the screen of the high resolution display, the user can enter an instruction to the scanner node, through the keyboard at the workstation, to temporarily stop any further images in the file from being scanned and displayed. Furthermore, the user is able through the workstation to graphically process the selected image, such as by inter alia rotating the image or attaching notes to the image to form an annotated image, and locally print the image. Also, through workstation node 20, the user can route a compressed image, either processed within the workstation or not, to printer node 18 in order to print a hardcopy version of the image. Printer node 18 typically contains a high resolution image printer, such as a suitable high volume laser printer, and handles print jobs on a batch basis. This printer is particularly useful in those situations where the user does not want to encumber the printer contained within the workstation with a large print job, such as printing a large image file or multiple copies of an image. In addition, through workstation node 20, the user can store compressed images in appropriate data files on file server node 12 for later retrieval. The file server node also controls the packet communication occurring over local area network 15. Inasmuch as the invention illustratively resides within workstation node 20 and the image management system thusfar described is well known in the art, the remainder of the discussion will specifically address both the workstation node and the inventive scaling methods and apparatus used therefor.

Figure 2:
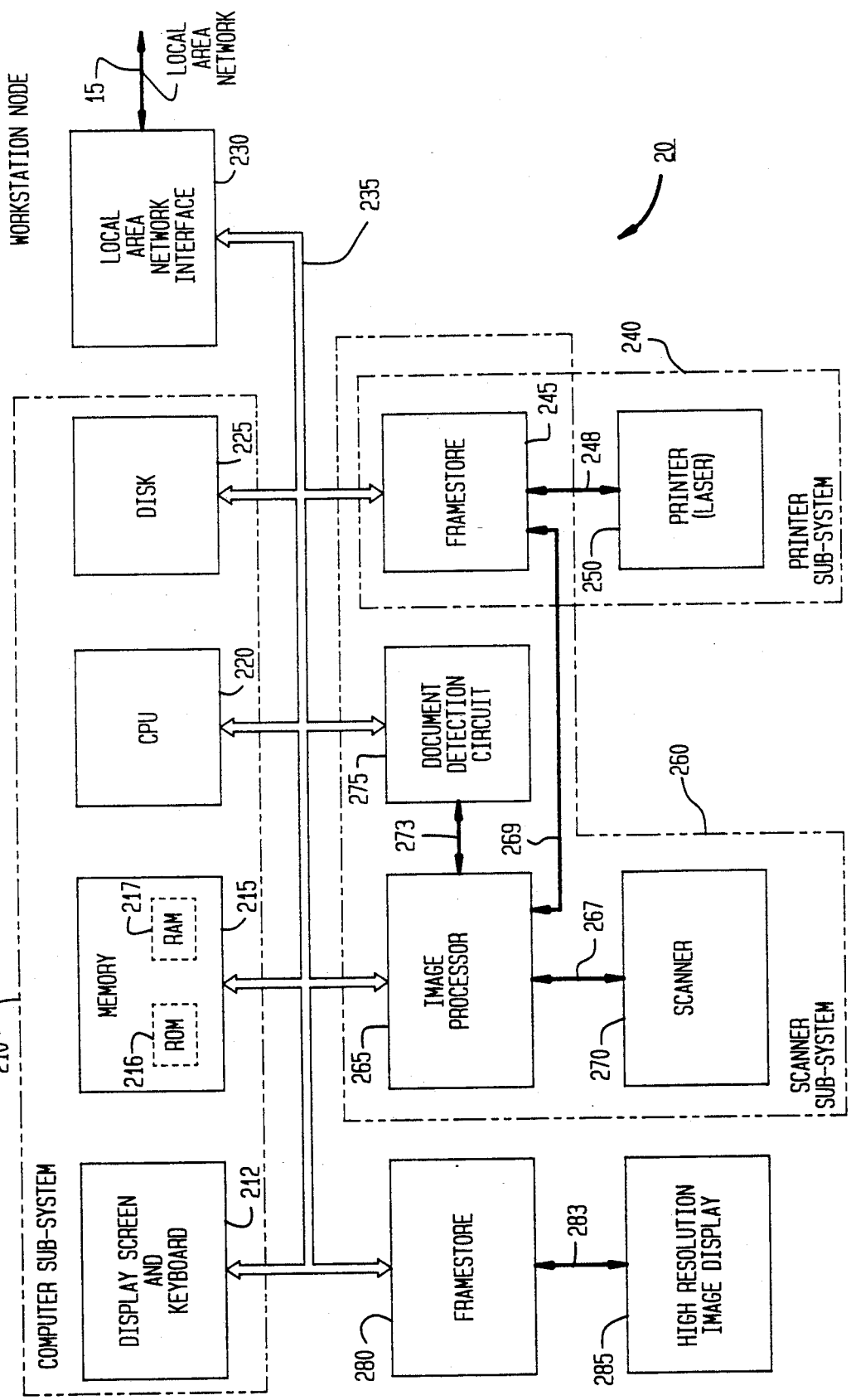
FIG. 2 depicts a block diagram of workstation node 20 which is shown in FIG. 1.

FIG. 2 depicts a block diagram of workstation node 20 shown in FIG. 1. This node contains computer sub-system 210, framestore 280, scanner sub-system 260, printer sub-system 240 and local area network interface 230 all interconnected through bus 235. High resolution image display 285 is driven by and connected to framestore 280. As noted, the user can enter appropriate commands into the workstation to receive one or more compressed images from a scanner node. These images can be subsequently displayed, processed and/or printed at the workstation.

Computer sub-system 210 is formed of display screen and keyboard 212, memory 215, central processing unit 220 and disk drive 225. Central processing unit 220, which can contain any one of many well known microprocessors, controls the operation of the workstation. In particular, the processor coordinates the operation of each of the sub-systems, as well as framestore 280 and local area network interface 230, contained within the workstation by transferring appropriate data thereamong and initiating appropriate image processing operations thereon. Specifically, the processor, operating under stored program control, receives incoming user commands from a keyboard contained within display screen and keyboard 212 and routes these commands over bus 235 to local area network interface 230 for subsequent transfer over both the local and wide area networks (see FIG. 1) to other nodes in the image management system or to the host computer associated therewith. The processor also transfers image and other data over bus 235 among the image processing sub-systems, framestore 280 and local area network interface 230 contained within the workstation. Memory 215 is formed of read only (ROM) memory 216 that stores a control program, such as a boot strap loader, and random access (RAM) memory 217 that is used as a temporary program and data store during execution of the control program. Disk 225 stores the remainder of the program that will be executed by either central processing unit 220 and the entire program executed by image processor 265. In addition, the disk can also store various images, in compressed form, that have been received, locally scanned and/or processed by the workstation for subsequent use.

Local area network interface 230 provides an interface to local area network 15 used within the image management system and through this network to other nodes in the system as well as to the host computer.

Scanner sub-system 260 locally scans and digitizes paper images for subsequent processing and display. In addition, the scanner sub-system receives compressed images over bus 235 for processing. Scanner sub-system 260 contains framestore 245, document detection circuit 275, image processor 265, all three of which are interconnected to bus 235, and scanner 270. Scanner 270 locally scans and digitizes a paper image at a resolution of typically 300-400 dots/inch (approximately 118-157 dots/cm). The resulting scanned bi-tonal pixels are applied, via lead 267, to image processor 265. As each scan line of the scanned image is applied to the image processor, this line is also routed, via lead 273, to document detection circuit 275. This circuit, which is well known, identifies the edges of the document contained within the scanned image and thereby defines an escribing rectangle located within the image that fully contains the document. The escribing rectangle is the smallest rectangle that completely holds the document. After all the scan lines have been processed by document detection circuit 275, this circuit supplies, over leads 273, to image processor 265 the width in terms of pixel positions along a scan line and the height in terms of the numbers of the starting and ending vertical scan lines in an image scan that collectively define the location of the horizontal and vertical borders of the escribing rectangle. To reduce the amount of the scanned image that needs to be processed as well as the amount of the image that eventually will be compressed and its attendant storage space within the image management system, image processor 265 processes only the portion of the image that is contained within the escribing rectangle. This processing can include, inter alia, rotating the image or attaching notes to the image to form an annotated image. Inasmuch as the specific image processing tasks that can be undertaken by the image processor are not relevant to the present invention, the different types of this processing will not be discussed any further.

As shown, workstation node 20 contains framestore 280 and framestore 245, the latter shared by scanner sub-system 260 and printer sub-system 240. The printer sub-system also includes printer 250. Incoming image data is applied to either framestore, via bus 235, or in the case of framestore 245, through lead 269, from image processor 265. Framestores 245 and 280 are essentially identical, with the principal difference therebetween noted below. In any event, either framestore provides a number of functions. First, the framestore scales an image by predefined amounts both vertically and horizontally to produce a reduced or enlarged image. Second, the framestore decompresses a received image, supplied illustratively by the host computer and graphically processes the image, as desired. In addition, the framestore can also compress an image, such as through a well known two-dimensional run length encoding method, and provide local image storage. The framestore also contains suitable output interfaces that enable the framestore to provide image data to a specific output device: illustratively a printer, such as via leads 248 to laser printer 250, or a display, such as via leads 283 to high resolution image display 285. Typically, a suitable cathode ray tube (CRT) based video monitor is used to implement this display. Inasmuch as the two framestores are used to drive different output devices, these framestores contain different output interfaces.

Inasmuch as framestore 245 and 280, apart from their self-contained output interfaces, are essentially identical, then, for purposes of illustration, the following discussion will specifically address framestore 245. A block diagram of illustrative framestore 245 is shown in FIG. 3. As shown, this framestore contains bus interface 310, compression/decompression processor 320, scaling sub-system 330, image processor interface 360, direct memory access (DMA) circuit 365, image memory 370, graphics coprocessor 375 and output personality module (output interface) 380, all interconnected through internal bus 355.

Bus interface 310 and image processor interface 360 provide a bi-directional interface between internal bus 355 and bus 235 or image processor 265 (see FIG. 2), respectively, both of which are located within the workstation. Image memory 370 is implemented with a suitable amount of RAM memory circuits to provide temporary storage for multiple decompressed images. DMA circuit 365 is used to establish direct memory access involving image memory 370 in order to transfer an image between memory 370 and any other component within framestore 245. Output personality module 380 functions as an output interface and is customized in hardware to be compatible with a specific output device that is to be driven by the framestore, e.g. printer 250 or high resolution CRT image display 285 (see FIG. 2).

Compression/decompression processor 320 (shown in FIG. 3), which is well known, functions to compress an image as well as decompress an image. Bi-tonal bit-mapped images are compressed to reduce not only the time and bandwidth required to transmit the image through the image management system but also the amount of memory space required to store an image. An image is compressed by processor 320 prior to its being transmitted, via bus 235, over a local area network to other nodes within the image management system or, via a wide area network, to the host computer. Scaling sub-system 330, which contains scaler 335 and linestore RAM 340, is used to two-dimensionally scale an image, with either the same or different scale factors used horizontally and vertically, to either reduce or enlarge the image by a desired amount. This allows the workstation, upon user instruction, to appropriately expand a portion of an image or generate a reduced size display of an image. Scaler 335 provides the actual two-dimensional image scaling of a bi-tonal image; while linestore RAM 340, connected via lead 337 to scaler 335, stores a current image scan line for use by the scaler. Graphics coprocessor 375 provides well known graphics functions, such as drawing a line and/or character, or clearing an area appearing on the output device as well as appropriately regulating the flow of output pixel data from framestore 245 to the particular output device, e.g. printer or CRT, that is to receive this data. Specifically, if this device is a printer, the graphics coprocessor merely scans through a given bit-mapped output image residing in the image memory once and sends the resulting output data for this image to the printer; however, if the output device is a CRT display, then this coprocessor repeatedly scans through a given bit-mapped output image residing in the image memory and successively sends the data for this image to the CRT display in order to appropriately refresh this display as often as needed.

Frequently, the user of an image management system, such as that illustratively described above, can readily identify a particular file of related images accessible through the host computer, specifically through entries in a cross-referenced database of available images accessible through the system, but can not readily identify which specific image he or she needs in a given file without first examining each image in that file. As such, the user is often constrained to observe each successive resulting image that appears at full scale on the high resolution display at the workstation until the specific image(s) he or she wanted is displayed. Accordingly, the user easily becomes frustrated by the delay inherent in waiting for a desired image to appear, particularly where the image file contains more than just a very small number of images.

A way to reduce the time required of the user to examine separate images in an image file would be to simultaneously display a number of these images at a document workstation, each at a reduced size in, for example, a corresponding non-overlapping portion of a composite multi-image display. In this manner, for example a 4-by-4 or 4-by-5 matrix of 16 or 20 separate images would fill the display screen. Once the composite display fully appeared on the display screen, the user could then very quickly glance through the entire display and select a particular image(s) he or she wanted for subsequent display at full scale. All the operations including the formation and depiction of the composite display at the workstation, image selection by the user and ultimate full scale display of the selected image(s) at the workstation would occur within a much shorter interval of time than that which would otherwise be required to successively display each image in the matrix at full scale. Unfortunately, the techniques known in the art for producing reduced sized images tend to be complex, slow or expensive and therefore are not ideally suited for use in fabricating a composite multi-image display for display at a workstation used within an image management system.

Moreover, a human eye can quickly recognize the overall shape of an image even though that image contains a considerable loss of detail. Accordingly, a composite multi-image display, which is now used to allow a user at a workstation to quickly select among its illustratively 16 or 20 constituent reduced images, can contain a significant amount of error as long as sufficient visual information remains in each reduced image to enable the user to quickly and grossly recognize its contents.

Hence, in accordance with the teachings of the present invention, a scaling technique has been developed for producing a reduced size image for inclusion in such a composite multi-image display. This technique substantially eliminates the drawbacks inherent in scaling techniques known in the art while producing a reduced bi-tonal image, that, while being degraded, nevertheless contains sufficient detail to enable the user to grossly recognize the overall content of the image. For purposes of illustration, the binary foreground and background color values in a bi-tonal image are assumed to be zero and one, respectively.

Specifically, reduction scaling is achieved in accordance with the invention by logically combining pixels values in each block of pixels in an original bi-tonal image, preferably through an "OR" operation, in order to generate a corresponding single pixel value in a reduced image. To reduce the original image by a non-integer scale factor, the pixel blocks that form the original image are assigned differing groupsizes that periodically vary on a two-dimensional pattern from block to block throughout the original image. In particular, the horizontal and vertical size of successive horizontally and vertically aligned blocks of pixels in the original image is periodically varied between two corresponding integer values that respectively span the desired horizontal and vertical non-integer scale factors. The average value of the periodic variation occurring in each direction throughout a sufficiently large two-dimensional area in the original image substantially equals the fractional portion of the non-integer scale factor that occurs in that direction. If integer scaling is to be produced in either the horizontal or vertical direction, then the groupsize remains the same along that direction from block to block throughout the original bi-tonal image. Inasmuch as the pixel values in each block in the original bi-tonal image are combined through an "OR" operation to yield a corresponding single pixel value in the scaled image, this single pixel value becomes "one" if at least one pixel value in its associated block is "one". As a result, the existence of at least one pixel in a block is in effect "saved" in the scaled image in an attempt to preserve the text or line art in the original image, while reducing its size. Error diffusion occurs in the scaled image as a result of alternating block sizes to achieve a non-integer scale factor. Though the inventive method for performing reduction scaling relies on pixel saving, this method does degrade the entire scaled image primarily due to growth of areas of foreground color, i.e. textual strokes and dots, in relation to the overall size of the image.

FIG. 4A diagrammatically shows the manner through which an illustrative source image is scaled to yield an illustrative reduced image using the inventive error diffusion and pixel saving scaling method. As shown, source (original) image 410 is to be reduced by different scale factors in both the vertical and horizontal directions, e.g. illustratively 2.33 horizontally and 1.5 vertically, to yield reduced image 440. To achieve this reduction scaling, the source image is broken into pixel groups (blocks) of varying groupsizes both horizontally and vertically. The groupsize in the horizontal direction varies between the values 2 and 3 with the fractional variation occurring between horizontally successive pixel blocks averaging out to the fractional value 0.33. In particular, the horizontal groupsize periodically varies as given by the values 3, 2, 2, 3 and so on. At the same time, the groupsize also periodically varies in a vertical direction. To provide a vertical reduction factor of 1.5, the vertical groupsize varies between 1 and 2 with the fractional variation occurring between vertically successive pixel blocks averaging out to the fractional value 0.5. Thus, the pixel blocks that collectively form the entire source image have a groupsize that varies on a periodic two-dimensional basis throughout this image. With the pixel blocks defined in this manner, the individual pixels that form each block are then logically combined, through an "OR" operation, to yield a single corresponding pixel value that occupies a corresponding spatial location in the scaled image.

As shown, source image 410 contains, among other pixel blocks, illustrative pixel blocks 411, 415, 421 and 425 located on a first scan line, followed by pixel blocks 431 and 435 located on second and third scan lines followed by pixel block 437 located on a fourth scan line in this image. While the number of illustrative pixel blocks that is specifically shown in FIG. 4A (as well as FIG. 4B discussed below) has been kept small for purposes of illustration and discussion, nevertheless the number that is shown is sufficiently large to fully illustrate the two-dimensional groupsize variation.

Successive pixel blocks 411, 415, 421 and 425 respectively contains individual pixels $411_1$, $411_2$ and $411_3$; $415_1$ and $415_2$; $421_1$ and $421_2$; and $425_1$, $425_2$ and $425_3$. The number of individual pixels that form each of these blocks periodically varies between the values 2 and 3 and horizontally averages out to the value 2.33. The individual pixels that form each of these successive blocks are logically combined through an "OR" operation to form successive single pixel values in the scaled image. Specifically, pixels $411_1$, $411_2$ and $411_3$ in block 411; pixels $415_1$ and $415_2$ in block 415; pixels $421_1$ and $421_2$ in block 421; and pixels $425_1$, $425_2$ and $425_3$ in block 425 are separately combined through corresponding simple "OR" operations to yield successive individual pixels 441, 442, 443 and 444 in scaled image 440, as symbolized by lines 413, 417, 423 and 427, respectively. Each of the individual pixels in the scaled image takes on the result of the "OR" combination of all the pixels in its corresponding block. Hence, if any pixel in a block is "on", then the corresponding individual pixel in the scaled image corresponding to that block is also set "on", thereby effecting a pixel saving operation. The same horizontal groupsize variation occurs in the second and third scan lines in the source image as can be seen by blocks 431 and 435 that respectively contain 3 and 2 pixels in the horizontal direction. The groupsize of successive pixel blocks 431 and 437 in the vertical direction periodically varies between 1 and 2 with an average variation yielding a vertical groupsize of 1.5. The individual pixels that form these blocks are also logically combined through an "OR" operation to yield the values of individual pixels 445 and 446 in the scaled image, as symbolized by lines 433 and 439, respectively. The process of logically combining the individual pixels in each remaining block in the source image by an "OR" operation to yield the value of a successive corresponding individual pixel in the reduced image continues until all the blocks in the original image have been processed in this fashion.

In addition, given this inventive technique to reduce the size of a bi-tonal image, a bi-tonal image can also be enlarged through a variation of the inventive reduction scaling technique. Specifically, to digitally enlarge (magnify) an original bi-tonal image, in accordance with the teachings of the present invention, each pixel in the original image is replicated to form a corresponding block of pixels in a destination (enlarged) image. In order to two-dimensionally magnify the source image by non-integer scale factors in both the horizontal and vertical directions, the groupsize of successive blocks of pixels in the destination image is appropriately varied, also through a corresponding two-dimensional pattern. The groupsize remains fixed along either direction if the original image is to be magnified along that direction by an integer scale factor. Inasmuch as non-integer pixel replication diffuses positional error into an enlarged image, the inventive method for performing image enlargement scaling is hereinafter referred to as the error diffusion pixel replication enlargement scaling method.

FIG. 4B diagrammatically shows the manner through which an illustrative source image is scaled to yield an illustrative enlarged image using the inventive error diffusion and pixel replication enlargement scaling method.

As shown, source (original) image 450 is to be enlarged by different scale factors in both the vertical and horizontal directions, e.g. illustratively 2.33 horizontally and 1.5 vertically, to yield enlarged image 490. To achieve this reduction scaling, the destination (enlarged) image is broken into pixel blocks of varying groupsizes both horizontally and vertically. The groupsize in the horizontal direction varies between the values 2 and 3 with the fractional variation occurring between horizontally successive pixel blocks averaging out to the fractional value 0.33. In particular, the horizontal groupsize periodically varies as given by the values 3, 2, 2, 3 and so on. At the same time, the groupsize also periodically varies in a vertical direction. To provide a vertical reduction factor of 1.5, the vertical groupsize varies between 1 and 2 with the fractional variation occurring between vertically successive pixel blocks averaging out to the fractional value 0.5. Thus, the pixel blocks that collectively form the entire enlarged image have a groupsize that varies on a periodic two-dimensional basis throughout this image. With the pixel blocks defined in this manner, the value of each individual pixel that forms the source image is merely replicated within a corresponding spatially located block of pixels in the enlarged image.

As shown, source image 450 contains illustrative single pixels 451, 452, 453, 454, 455 and 456. Enlarged image 490 contains, among other pixel blocks, illustrative pixel blocks 463, 467, 473 and 477 located on a first scan line, followed by pixel blocks 483 and 485 located on second and third scan lines followed by pixel block 489 located on a fourth scan line in this image. Successive pixel blocks 463, 467, 473 and 477 respectively contain individual pixels $463_1$, $463_2$ and $463_3$; $467_1$ and $467_2$; $473_1$ and $473_2$; and $477_1$, $477_2$ and $477_3$. The number of individual pixels that form each of these blocks periodically varies between the values 2 and 3 and horizontally averages out to the value 2.33. The value of individual pixel 451 in the original image is merely replicated, as symbolized by line 461, three times to generate the values of pixels $463_1$, $463_2$ and $463_3$ in block 463. Likewise, the values of individual pixels 452, 453 and 454 in the original image are merely replicated two, two and three times, respectively and as symbolized by respective lines 465, 471 and 475, to generate the values of pixels $467_1$ and $467_2$; $473_1$ and $473_2$; and $477_1$, $477_2$ and $477_3$ that respectively form blocks 467, 473 and 477 in the enlarged image. Accordingly, the value of each individual pixel in the original image becomes the value of each pixel in a corresponding pixel block in the enlarged image. The same horizontal groupsize variation occurs in the second and third scan lines in the scaled image as can be seen by blocks 483 and 485 that respectively contain 3 and 2 pixels in the horizontal direction. The groupsize of successive pixel blocks 483 and 489 in the vertical direction periodically varies between 1 and 2 with an average variation yielding a vertical groupsize of 1.5. The individual pixels that form these blocks are also formed by mere replication of the values of individual pixels 455 and 456 in the original image, as symbolized by lines 481 and 487, respectively. The process of logically replicating the value of each successive individual pixel in the original image to uniformly fill each successive corresponding block of pixels in the enlarged image continues until all the pixels in the original image have been processed in this manner.

Figure 5B:
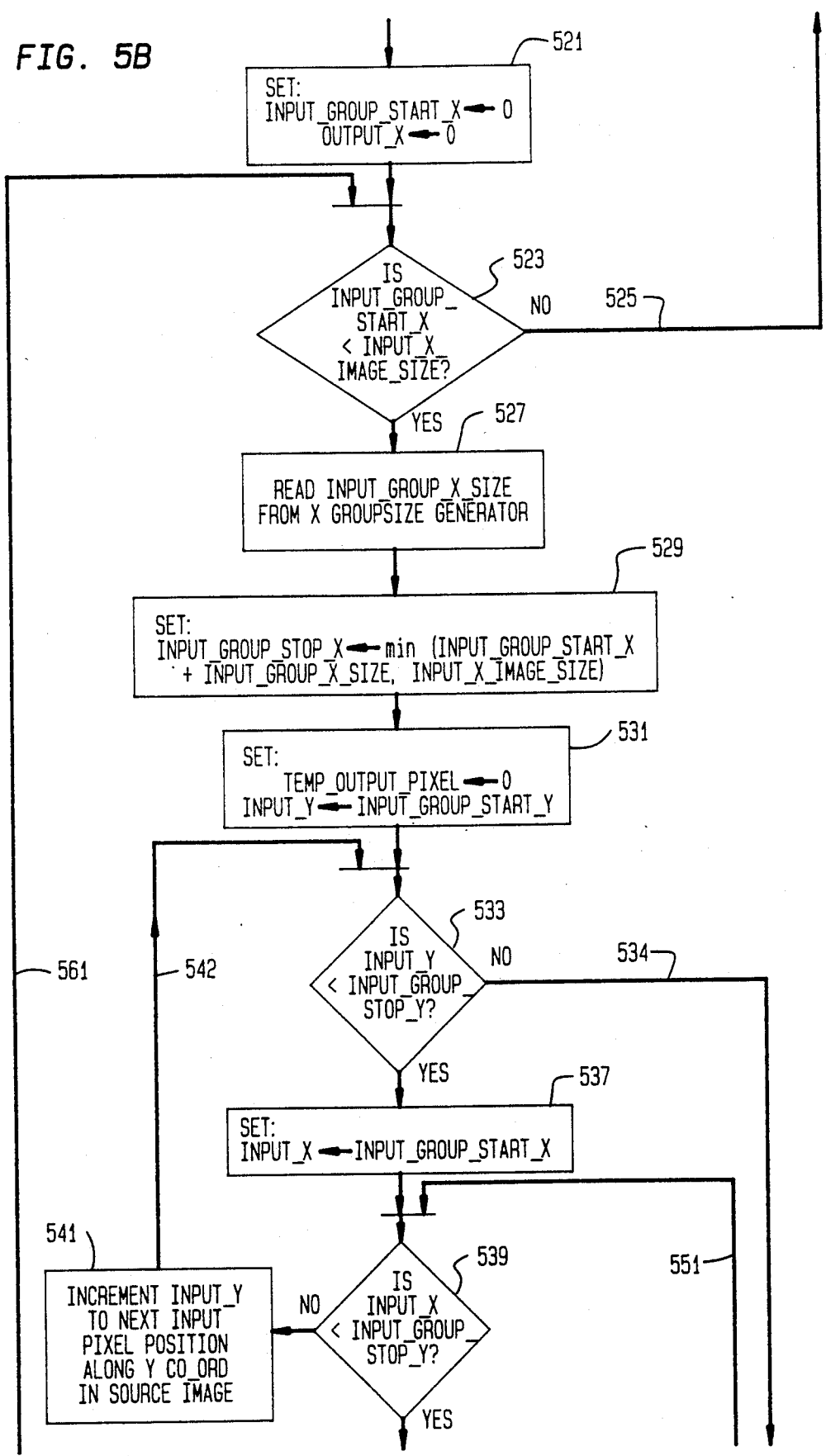
Figure 5D:
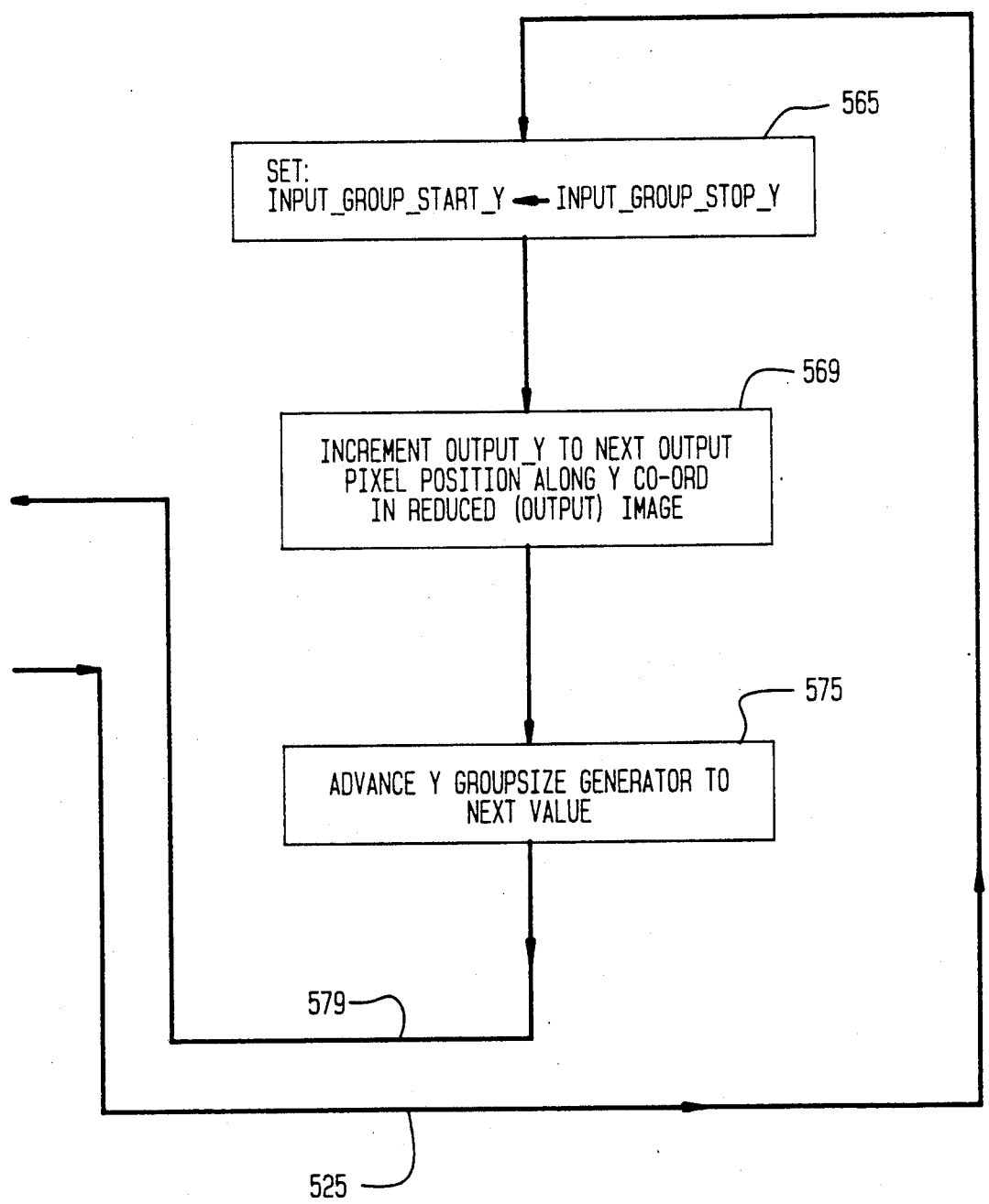

A flowchart of Error Diffusion Pixel Saving Reduction Scaling process 500 that performs image reduction according to the inventive error diffusion pixel saving reduction scaling method is collectively depicted in FIGS. 5A-5D; the correct alignment of the drawing sheets for these figures is shown in FIG. 5. This process, as well as those shown in FIGS. 6A-6D, 14A and 14B, and 15A and 15B (all of which are discussed in detail below), is suitable for being implemented in either hardware or software.

As shown, upon entry into process 500, step 503 is first performed to break the X and Y (horizontal and vertical) scale factors into corresponding integer and fractional parts. Thereafter, step 505 is executed to initialize the Y groupsize generator to generate the proper variation in the vertical groupsize between successive rows of pixel blocks. Preferably, two separate groupsize generators are used to generate the appropriate horizontal and vertical groupsize values for each successive pixel block in the original image for generating a reduced image (or in the destination image for use in connection with generating an enlarged image as occurs in connection with enlargement process 600 shown in FIGS. 6A-6D and discussed in detail below). These generators can be either appropriate software routines or preferably, as used herein, clocked feedback adders implemented in hardware. Once step 505 has occurred, step 507 is executed which initializes the values of two variables to the value zero: the vertical starting pixel location (Y coordinate in terms of pixel number) of the current pixel block in the original image, INPUT_GROUP_START_Y, and the Y coordinate of the single output pixel, OUTPUT_Y, whose value is currently being generated in the scaled image.

Once this initialization is complete, process 500 proceeds to decision step 510 which determines whether the entire original image has been processed. Specifically, if the starting Y coordinate of the current pixel block is equal to or now greater than the vertical size of the original image, i.e. the value of the variable INPUT_Y_IMAGE_SIZE which is also the first vertical pixel coordinate not contained within this image, then the entire original image has been completely scaled and hence execution exits from process 500 along NO path 511 which emanates from decision step 510. Alternatively, if this starting coordinate is less than the vertical image size, then the next row of pixel blocks remains to be scaled. In this case, execution of process 500 is directed along the YES path emanating from decision step 510 to step 513. Step 513, when executed, copies the next value of the vertical groupsize, INPUT_GROUP_Y_SIZE, for the next row of pixel blocks in the original image from the Y Groupsize generator. This value remains constant throughout this row. Once this step has occurred, execution proceeds to step 515. This step calculates the vertical position, INPUT_GROUP_STOP_Y, of the first pixel situated below the current pixel block. This position is determined to be the minimum of either the sum of the starting Y coordinate of the current block and the vertical size of the current block (INPUT_GROUP_START_Y + INPUT_GROUP_Y_SIZE) or the first vertical coordinate not contained within the original image (INPUT_Y_IMAGE_SIZE). Once this step has been fully performed, step 519 is performed to initialize the value of the X groupsize generator to generate the proper variation in the horizontal groupsize between successive pixel blocks in a row. Thereafter, step 521 is performed to initialize the value of two variables to zero: the horizontal starting pixel location (X coordinate in terms of pixel number) of the current pixel block in the original image, INPUT_GROUP_START_X, and the X coordinate of the single output pixel, OUTPUT_X, whose value is currently being generated in the scaled image.

Execution next proceeds to decision step 523. Steps 523 through 559 process the successive rows of pixels in the original image that collectively form the current row of pixel blocks in that image. Within these steps, steps 533 through 549 combine the pixels that form each pixel block in the original image to yield a corresponding single output pixel value.

Specifically, decision step 523 determines whether the current row of pixel blocks in the original image has been processed. If the X (horizontal) starting coordinate of the current row, i.e. the value of the variable INPUT_GROUP_START_X, is less than the width of the image, i.e. the value of the variable INPUT_X_IMAGE_SIZE, then the end of the current row has not yet been reached and at least one more pixel block remains to be processed in this row. Accordingly, execution proceeds via the YES path emanating from decision step 523 to step 527. The latter step, when performed, copies from the X Groupsize generator the next value of the horizontal groupsize, INPUT_GROUP_X_SIZE, for the successive block of pixels in current row of the original image. This value remains constant throughout this block. Thereafter, execution proceeds to step 529 which calculates the horizontal position, INPUT_GROUP_STOP_X, of the first pixel situated to the right of the current pixel block. This position is determined to be the minimum of either the sum of the starting X coordinate of the current pixel block and the horizontal size of the current block (INPUT_GROUP_START_X + INPUT_GROUP_X_SIZE) or the first horizontal coordinate not contained within the original image (INPUT_X_IMAGE_SIZE). Once this step has been fully performed, step 531 is performed to initialize the values of two variables. Specifically, the value of temporary variable TEMP_OUTPUT_PIXEL which is used to accumulate the output value for each pixel block is set to zero.

Additionally, the value of variable INPUT_Y which stores the Y coordinate of the current pixel in the original image that is being processed is set to the starting Y coordinate of the current pixel block, INPUT_GROUP_START_Y.

Execution next proceeds to decision step 533 which determines whether all the rows of pixels in the current pixel block have been processed, i.e. whether the next pixel to be processed has a Y coordinate value that is less than the vertical position, INPUT_GROUP_STOP_Y, of the first pixel situated below the current pixel block. In the event that the Y coordinate of the current pixel lies within the current pixel block, then execution proceeds to step 537 via the YES path emanating from decision step 533. Step 537, when performed, sets the value of the variable INPUT_X, which stores the X coordinate of the current pixel in the original image that is to be processed, to the starting X coordinate of the first pixel in each row of the current block, i.e. the value INPUT_GROUP_START_X. This value is the same for all rows of pixels that form the current pixel block. Once this value is set, execution proceeds from step 537 to decision step 539. This step, when performed, determines whether the current pixel to be processed lies horizontally beyond the end of the current pixel block being processed. In the event the current pixel lies within the current pixel block, i.e. the value of INPUT_X is less than the value of INPUT_GROUP_STOP_X, then execution proceeds, via the YES path emanating from decision step 539, to decision step 543. Decision step 543 determines whether the value of the current input pixel to be processed, i.e. INPUT [INPUT_X, INPUT_Y] is one In the event any input pixel in the current pixel block is one, then execution proceeds, via the YES path emanating from decision step 543, to step 547 which, when performed, sets the value of the temporary output value, TEMP_OUTPUT_PIXEL, to one. Execution then proceeds to step 549. If, alternatively, the current input pixel being processed is zero valued, then execution is routed, via the NO path emanating from decision step 543, directly to step 549. This latter step, when performed, increments the value of variable INPUT_X to the X coordinate position of next pixel situated within the current pixel block and lying in the current row of the source image. Once this has occurred, execution loops back, via path 551, to decision step 539 to process this next pixel. Alternatively, if decision step 539 determines that all the pixels in the current row of the present pixel block have been processed, i.e. the value of variable INPUT_X equals or exceeds the value of variable INPUT_GROUP_STOP_X, then execution proceeds, via the NO path emanating from decision step 539, to step 541. Step 541, when executed, increments the value of variable INPUT_Y to the Y coordinate position of the first pixel on the next row situated within the current pixel block of the source image. Once this occurs, execution loops back, via path 542, to decision step 533 to process this next row of input pixels in the current pixel block.

Now, in the event that all the pixels in the current pixel block have been processed, i.e. the Y coordinate of the current pixel to be processed (INPUT_Y) equals or exceeds the vertical position (INPUT_GROUP_STOP_Y) of the first pixel situated below the current pixel block, decision step 533 routes execution, via NO path 534, to step 553. This latter step, when performed, sets the next successive output pixel that appears in the bit map of the scaled image, i.e. OUTPUT [OUTPUT_X, OUTPUT_Y], to the value of the temporary output value, TEMP_OUTPUT_PIXEL. Thereafter, step 555 is performed which sets the X (horizontal) starting coordinate of the next pixel to be processed, i.e. the value of the variable INPUT_GROUP_START_X, to INPUT_GROUP_STOP_X, of the first pixel situated to the right of the pixel block that has now just been fully processed. Execution then proceeds to step 557 which, when performed, increments the value of variable OUTPUT_X to point to the X coordinate of the next successive output pixel in the scaled image. Thereafter, step 559 is executed to cause the X groupsize generator to produce its next value. Once this occurs, execution loops back, via path 561, to decision step 523.

If decision step 523 determines that the current row of pixel blocks in the original image has fully been processed, i.e. whenever the value of INPUT_GROUP_START_X, equals or exceeds the value of variable INPUT_X_IMAGE_SIZE, then execution proceeds, via NO path 525, to step 565. Step 565, when performed, sets the Y (vertical) starting coordinate of the next pixel block to be processed, i.e. the value of the variable INPUT_GROUP_START_Y, to the vertical position, INPUT_GROUP_STOP_Y, of the first pixel situated below the pixel block that has now just been fully processed. Execution then proceeds to step 569 which, when performed, increments the value of variable OUTPUT_Y to point to the Y coordinate of the next successive output pixel in the scaled image. Thereafter, step 575 is executed to cause the Y groupsize generator to produce its next value. Once this occurs, execution loops back, via path 579, to decision step 510 to process the next row, if any, of pixel blocks in the original image.

Figure 6B:
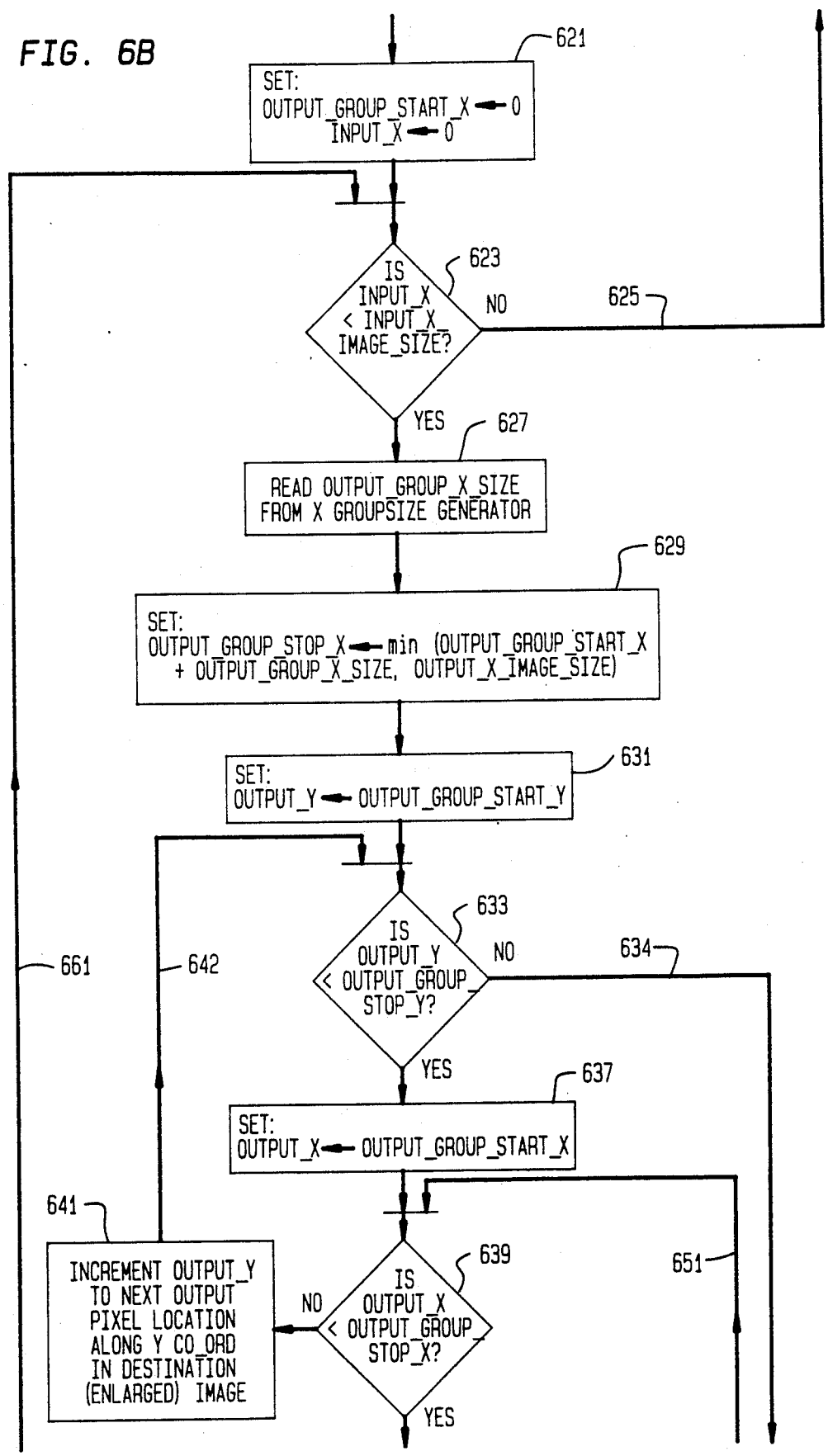
Figure 6C:
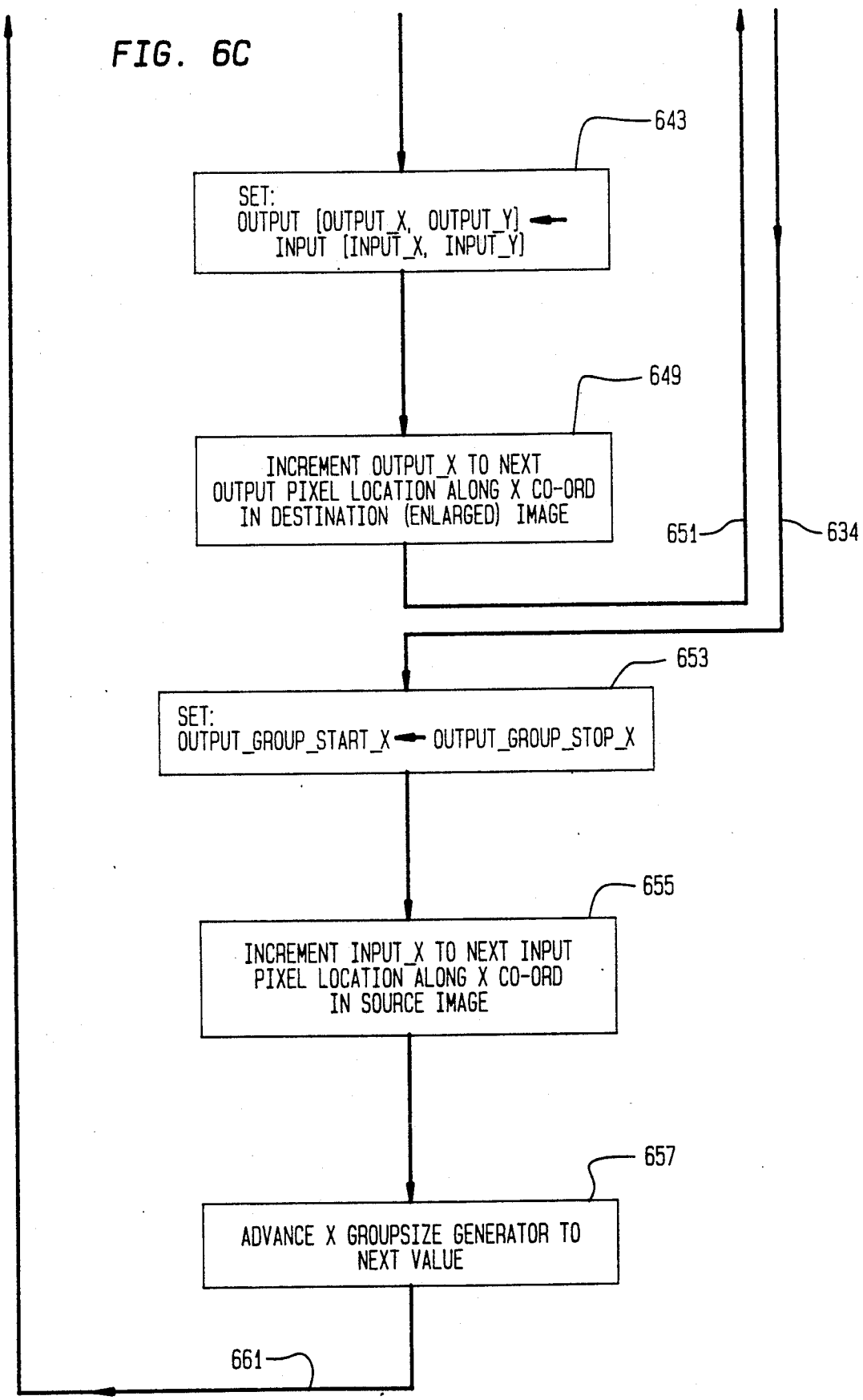
Figure 6D:
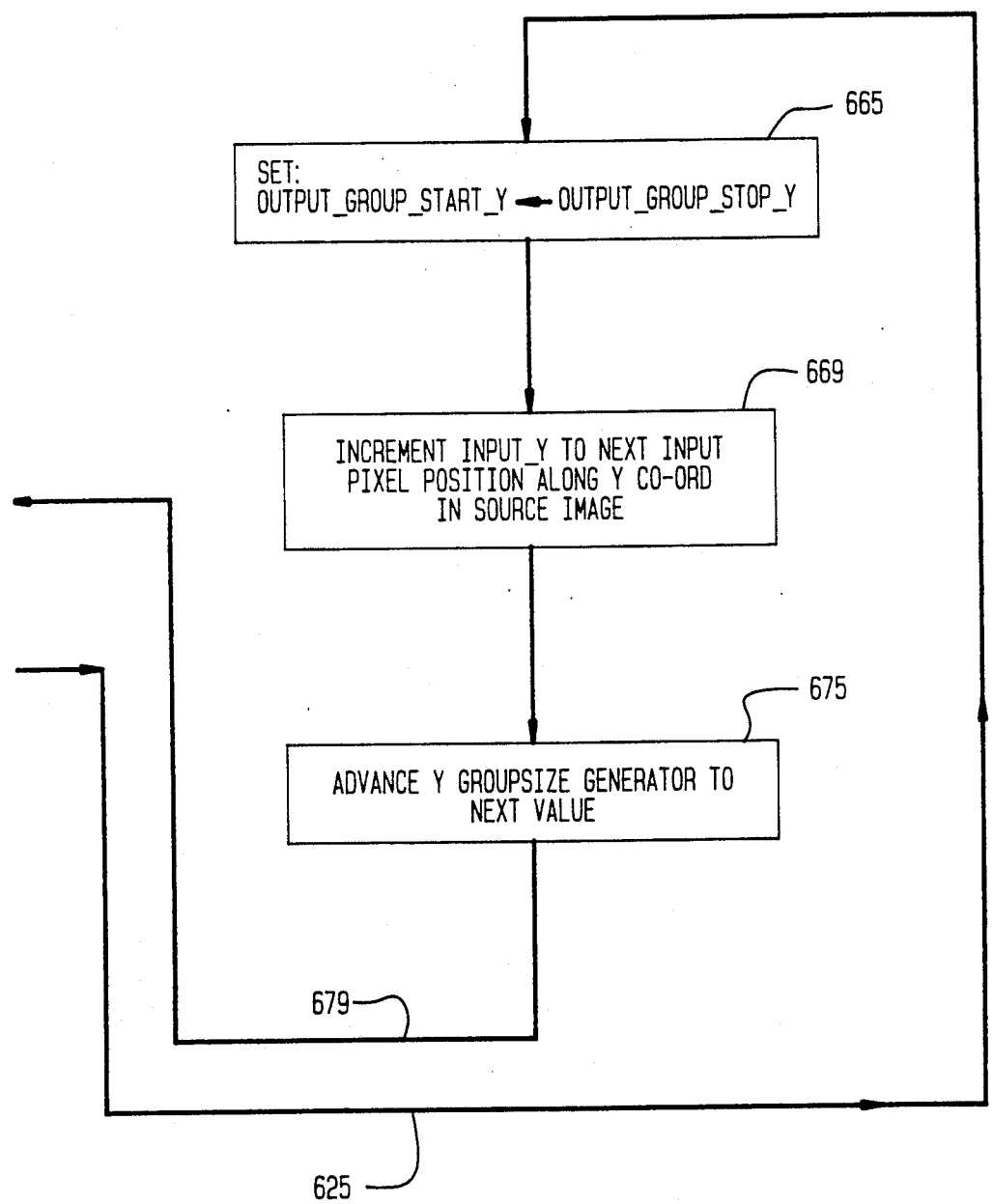

A flowchart of Error Diffusion Pixel Replication Enlargement Scaling process 600 that performs image enlargement according to the inventive error diffusion and pixel replication enlargement scaling method is collectively depicted in FIGS. 6A-6D; the correct alignment of the drawing sheets for these figures is shown in FIG. 6.

As shown, upon entry into process 600, step 603 is first performed to break the X and Y (horizontal and vertical) scale factors, here for magnification rather than reduction, into corresponding integer and fractional parts. Thereafter, step 605 is executed to initialize the Y groupsize generator to generate the proper variation in the vertical groupsize between successive rows of pixel blocks. As noted above, the groupsizes for enlargement relate to the pixel blocks in the destination (enlarged) image rather than in the original (source) image as with reduction scaling. Though separate X and Y groupsize generators are used for enlargement and reduction scaling, identical circuitry is used within these generators to generate the fractional groupsize value, as shown and described below in conjunction with FIG. 12. In any event, once step 605 has occurred, step 607 is executed which initializes the values of two variables to the value zero: the vertical starting pixel location (Y coordinate in terms of pixel number) of the current pixel block currently being generated in the enlarged image, OUTPUT_GROUP_START_Y, and the Y coordinate of the single input pixel value, INPUT_Y.

Once this initialization is complete, process 600 proceeds to decision step 610 which determines whether the entire original image has been processed. Specifically, if the Y coordinate of the current pixel to be processed in the original image is equal to or now greater than the vertical size of the original image, i.e. the value of the variable INPUT_Y_IMAGE_SIZE which is also the first vertical pixel coordinate not contained within this image, then the entire original image has been completely enlarged and hence execution exits from process 600 along NO path 611 which emanates from decision step 610. Alternatively, if this starting coordinate is less than the vertical image size, then the next row of pixels in the original image remain to be enlarged. In this case, execution of process 600 is directed along the YES path emanating from decision step 610 to step 613. Step 613, when executed, copies the next value of the vertical groupsize, OUTPUT_GROUP_Y_SIZE, for the next row of pixel blocks in the enlarged image from the Y Groupsize generator. This value remains constant throughout this row. Once this step has occurred, execution proceeds to step 615. This step calculates the vertical position, OUTPUT_GROUP_STOP_Y, of the first pixel situated below the current pixel block in the enlarged image. This position is determined to be the minimum of either the sum of the starting Y coordinate of the current block and the vertical size of the current block (OUTPUT_GROUP_START_Y+OUTPUT_GROUP_Y_SIZE) or the first vertical coordinate not contained within the enlarged image (OUTPUT_Y_IMAGE SIZE). Once this step has been fully performed, step 619 is performed to initialize the value of the X groupsize generator to generate the proper variation in the horizontal groupsize between successive pixel blocks in a row. Thereafter, step 621 is performed to initialize the value of two variables to zero: the horizontal starting pixel location (X coordinate in terms of pixel number) of the current pixel block in the enlarged image, OUTPUT_GROUP_START_X, and the X coordinate of the single pixel value in the original image, INPUT_X.

Execution next proceeds to decision step 623. Steps 623 through 657 replicate pixels in a current row of the original image to fill corresponding pixel blocks in the enlarged image. Within these steps, steps 633 through 649 replicate the value of a pixel in the original image to fill a corresponding block of pixels in the enlarged image.

Specifically, decision step 623 determines whether all the pixels in the current row in the original image have been processed. If the X (horizontal) starting coordinate of the current pixel, i.e. the value of the variable INPUT_X, is less than the width of the image, i.e. the value of the variable INPUT_X_IMAGE SIZE, then the end of the current row has not yet been reached and at least one more pixel remains to be processed in this row. Accordingly, execution proceeds via the YES path emanating from decision step 623 to step 627. The latter step, when performed, copies the next value from the X Groupsize generator of the horizontal groupsize, OUTPUT_GROUP_X_SIZE, for the successive block of pixels in the current row of the enlarged image. This value remains constant throughout this block. Thereafter, execution proceeds to step 629 which calculates the horizontal position, OUTPUT_GROUP_STOP_X, of the first pixel situated to the right of the current pixel block in the enlarged image. This position is determined to be the minimum of either the sum of the starting X coordinate of the current pixel block and the horizontal size of the current block in the enlarged image (OUTPUT_GROUP_START_X+OUTPUT_GROUP_X_SIZE) or the first horizontal coordinate not contained within the enlarged image (OUTPUT_X_IMAGE SIZE). Once this step has been fully performed, step 631 is performed to initialize the value of Y coordinate of the current pixel in the enlarged image, OUTPUT_Y, to the starting Y coordinate of the current pixel block, OUTPUT_GROUP_START_Y.

Execution next proceeds to decision step 633 which determines whether all the rows of pixels in the current pixel block in the enlarged image have been processed, i.e. whether the next pixel to be processed has a Y coordinate value, OUTPUT_Y, that is less than the vertical position, OUTPUT_GROUP_STOP_Y, of the first pixel situated below the current pixel block. In the event that the Y coordinate of the current pixel lies within the current pixel block, then execution proceeds to step 637 via the YES path emanating from decision step 633. Step 637, when performed, sets the value of the variable OUTPUT_X, which stores the X coordinate of the current pixel in the enlarged image that is to be processed, to the starting X coordinate of the first pixel in each row of the current block, i.e. the value OUTPUT_GROUP_START_X. This value is the same for all rows of pixels that form the current pixel block. Once this value is set, execution proceeds from step 637 to decision step 639. This step, when performed, determines whether the current pixel in the enlarged image lies horizontally beyond the end of the current pixel block. In the event the current pixel lies within the current pixel block, i.e. the value of OUTPUT_X is less than the value of OUTPUT_GROUP_STOP_X, then execution proceeds, via the YES path emanating from decision step 639 to step 643. Step 643, when performed, performs pixel replication by setting the value of the current pixel in the current pixel block in the enlarged image, OUTPUT [OUTPUT_X, OUTPUT_Y], to the value of the current pixel in the original image, INPUT [INPUT_X, INPUT_Y]. Execution then proceeds to step 649 which, when performed, increments the value of variable OUTPUT_X to the X coordinate position of next pixel situated within the current pixel block and lying in the current row of the enlarged image. Once this has occurred, execution loops back, via path 651, to decision step 639 to continue pixel replication for current pixel block. Alternatively, if decision step 639 determines that all the pixels in the current row of the present pixel block have been appropriately set, i.e. the value of variable OUTPUT_X equals or exceeds the value of variable OUTPUT_GROUP_STOP_X, then execution proceeds, via the NO path emanating from decision step 639, to step 641. Step 641, when executed, increments the value of variable OUTPUT_Y to the Y coordinate position of the first pixel on the next row situated within the current pixel block of the enlarged image. Once this occurs, execution loops back, via path 642, to decision step 633 to process this next row of input pixels in the current pixel block.

Now, in the event that all the pixels in the current pixel block have been appropriately set, i.e. the Y coordinate of the current pixel in the enlarged image (OUTPUT_Y) equals or exceeds the vertical position (OUTPUT_GROUP_STOP_Y) of the first pixel situated below the current pixel block, decision step 633 routes execution, via NO path 634, to step 653. Step 653, when performed, sets the X (horizontal) starting coordinate of the next pixel block to be set in the enlarged image, i.e. the value of the variable OUTPUT_GROUP_START_X, to the horizontal position, OUTPUT_GROUP_STOP_X, of the first pixel situated to the right of the pixel block that has now just been fully set. Execution then proceeds to step 655 which, when preformed, increments the value of variable INPUT_X to point to the X coordinate of the next successive pixel to be processed in the original image. Thereafter, step 657 is executed to cause the X groupsize generator to produce its next value. Once this occurs, execution loops back, via path 661, to decision step 623.

If decision step 623 determines that the current row of pixel in the original image has fully been processed, i.e. whenever the value of INPUT_X equals or exceeds the value of variable INPUT_X_IMAGE SIZE, then execution proceeds, via NO path 625, to step 665. Step 665, when performed, sets the Y (vertical) starting coordinate of the next pixel block to be set in the enlarged image, i.e. the value of the variable OUTPUT_GROUP_START_Y, to the vertical position, OUTPUT_GROUP_STOP_Y, of the first pixel situated below the pixel block that has now just been fully set. Execution then proceeds to step 669 which, when performed, increments the value of variable INPUT_Y to point to the Y coordinate of the next successive pixel to be processed in the original image. Thereafter, step 675 is executed to cause the Y groupsize generator to produce its next value. Once this occurs, execution loops back, via path 679, to decision step 610 to process the next pixel, if any, in the original image.

FIG. 7 depicts a block diagram of scaling sub-system 330 shown in FIG. 3 that performs image reduction and enlargement using the inventive error diffusion pixel reduction scaling, and error diffusion pixel replication enlargement scaling methods.

As shown, scaler 335 contains multiplexor 710, horizontal reduction scaler 720, vertical reduction scaler 730, vertical enlargement scaler 740 and horizontal enlargement scaler 750, all of which are connected to control registers 760 which are also contained within scaler 335. Separate scaling circuits are used not only for both reduction and enlargement scaling but also in each scaling direction, i.e. the horizontal and vertical directions. To provide increased scaling speed, each scaling circuit is implemented in hardware, as shown in conjunction with FIGS. 8-11 which are described in detail below. Furthermore, pipelined scaling is used wherein the output of one scaling stage feeds the input of a next scaling circuit in order to permit multiple scaling operations to occur simultaneously.

In this regard, horizontal reduction scaler 720, which reduces an incoming (original) bit-mapped image in the horizontal direction, receives incoming bit-mapped image data, specifically sixteen pixels in parallel, over leads 715. The output of scaler 720, which occurs in bit-serial fashion on lead 725, is applied as a data input to vertical reduction scaler 730. This latter scaler reduces an incoming bit-mapped image in the vertical direction and applies its reduced bit-mapped output data, also as bit-serial data, to lead 735 which, in turn, applies this data as a data input to vertical enlargement scaler 740. This enlargement scaler enlarges an incoming bit-mapped image, appearing in bit-serial form on lead 735, in the vertical direction. Inasmuch as both the vertical reduction and vertical enlargement scalers operate on a scan line of pixel data at a time, both of these scalers are connected, via leads 337, to linestore RAM 340, which provides temporary storage of a current scan line that is being processed. The output of vertical enlargement scaler 740, which is also in bit-serial fashion, is applied, via lead 745, as input to horizontal enlargement scaler 750. This latter scaler enlarges an incoming bit-mapped image in the horizontal direction and applies its resulting enlarged bit-mapped image data in sixteen-bit parallel form (i.e. sixteen bi-tonal pixels in parallel) to leads 770. Leads 770 are routed to control registers 760, to bus 355 and to one sixteen-bit input of multiplexor 710. The other sixteen-bit input to this multiplexor is uncompressed bit-mapped image data appearing on leads 325 and generated by compression/decompression processor 320 (see FIG. 3). Control registers 760, as shown in FIG. 7, provide initial register settings to each scaler to setup a desired scaling operation therein, and invoke and thereafter control the scaling operation provided by each of these scalers. In addition, the control registers provide suitable signals to multiplexor 710 to select the input data, i.e. either incoming decompressed image data appearing on leads 325 or enlarged image data appearing on leads 770, which will, in turn, be applied to leads 715. The control registers are formed of appropriate digital circuitry that is readily apparent to those skilled in the art. Advantageously, the series pipelined interconnection of the reduction and enlargement scalers enables a bit-mapped image to be simultaneously enlarged in one direction while being reduced in the other direction.

FIG. 8 depicts a block diagram of horizontal reduction scaler 720 shown in FIG. 7. As noted above, this scaler combines all the pixels situated on each horizontal scan line which spans a pixel block in an incoming image into a corresponding single output pixel value.

Scaler 720 contains a groupsize generator, formed of adder 820 and groupsize error diffusion circuit 1200, pixel combining circuit 830 and control logic 890. Information transfer involving this, as well as the other scaling circuits (i.e. vertical reduction scaler 730, vertical enlargement scaler 740 and horizontal enlargement scaler 750 as specifically shown in FIGS. 9-11 and discussed in detail below), uses a simple handshaking protocol to control the data transfer. Synchronous data transfer is used. Specifically, separate input data valid and data taken signals and output data valid and data taken signals are used. Whenever a device is supplying data, that device asserts the data valid signal during those clock cycles while this data is being supplied to another device. For example, while multiplexor 710 (see FIG. 7) supplies incoming bit-mapped data over leads 715 to scaler 720, this multiplexor asserts its output data valid signal which is, in turn, applied as the input data valid signal to scaler 720. Likewise, while scaler 720 supplies horizontally reduced pixel data over lead 725 to vertical reduction scaler 730, scaler 720 asserts its output data valid signal which, in turn, is applied as the input data valid signal to scaler 730. Furthermore, sixteen pixels, numbered from zero to fifteen, are simultaneously applied as input to scaler 720 over leads 715 with bit zero being the leftmost pixel. An end of line (EOL) control signal is asserted high during the occurrence of the last pixel in each scan line being processed. In addition, all of the sequential logic blocks in scaler 720, as well as in the other three scaling circuits (vertical reduction scaler 730, vertical enlargement scaler 740 and horizontal enlargement scaler 750 as specifically shown in FIGS. 9-11 and discussed in detail below) utilize a Clock Enable (Clk En) signal in addition to a regular (master) clock (Clk) signal. Through this enable signal, the sequential logic blocks will only respond to a rising edge on the clock signal if the Clock Enable is first asserted. The Clock Enable is used to suspend operation of the scaler circuit whenever that circuit is waiting to receive input pixel data over its input leads or transfer output pixel data onto its output leads. Furthermore, a synchronous initialize (INIT) signal, when asserted, initializes the scaler circuit. This INIT signal must be asserted for at least one clock cycle to properly initialize the entire circuit; this must occur prior to scaling an image. Similar initialize signals exist in vertical reduction scaler 730, vertical enlargement scaler 740 and horizontal enlargement scaler 750.

Within scaler 720, the current groupsize is generated through groupsize error diffusion circuit 1200 and adder 820 shown in FIG. 8. An X groupsize register (not specifically shown) stores the desired horizontal groupsize value for the entire image in both integer and fractional components. This non-integer groupsize value equals the desired horizontal reduction scale factor. Here, the fractional component of the horizontal scale factor, i.e. that of the X groupsize, is routed in eight-bit parallel form over leads 803 to an input of groupsize error diffusion circuit 1200. Based upon this fractional value, circuit 1200 generates an evenly distributed pre-defined pattern of successive "1's" and "0's" which average out to the fractional value. Each successive value in this pattern is generated at each successive clock pulse coincident with the application of a high level on both the NEXT VALUE and Clock Enable inputs to the groupsize generator. For example, to generate a value of 0.5, the pattern "1, 0, 1, 0, 1, 0, . . . " is produced. Alternatively, to generate a value of 0.33, the pattern "0, 1, 0, 0, 1, 0, . . ." is produced and so on for other fractional values. This single bit pattern is applied, via lead 1215, to a carry in ($C_{in}$) input of adder 820. The integer portion is applied via leads 807 in seven-bit parallel form to another input of this adder. As such, the eight-bit groupsize value produced by adder 820 and applied thereby to leads 825, for a non-integer scale factor, periodically varies between two integer values based upon the fractional component of the groupsize.

Pixel combining circuit 830 contains adder 835, next pixel position register 840, pass/zero circuit 850, current pixel position register 865, data selector/combiner circuit 870 and pixel accumulating register 880. Circuit 830 essentially forms a window in the horizontal direction of successive pixels that extend across as many input words on input leads 715 as necessary in order to form a horizontal line that spans a pixel block and at the same time combines the pixels within this line to form one resulting pixel value on output lead 725. Data selector/combiner 870 is a relatively simple combinatorial logic circuit, which is readily apparent to anyone skilled in the art, that combines all the pixels situated within a range of horizontal addresses, i.e. from a pixel situated at a start position, up to but not including a pixel situated at a stop position in a parallel word of data. The horizontal stop and start positions are applied in parallel over leads 845 and 868, respectively, to corresponding inputs, namely inputs $IN_2$ and $IN_3$, of selector/combiner 870. The output of the selector/combiner is a single bit, applied to lead 874, which is the logical "OR" combination of all the pixels situated within the range. The STOP-16 input to the selector/combiner, when asserted high, overrides the horizontal stop position applied to the selector/combiner in order to extend the range to the end of a sixteen-bit input word appearing on leads 715, i.e. up to and including bit fifteen of this word. A high level when placed on the Polarity input to the selector/combiner causes the input pixels to be inverted prior to being combined, i.e. "OR'ed" together.

Next pixel position register (NPPR) 840 is an eight-bit register that stores the position of the first pixel in the next group (block) to be processed, relative to bit zero of the current input word appearing on leads 715. This position may extend into subsequent input words. While a low ("zero") level is applied as a LOAD/-−DECREMENT (HI−4) signal to register 840, specifically the L/−D input thereof, the high order four bits contained within the register decrement and the low order four bits remain constant at each successive clock pulse coincident with the application of a high level to the Clock Enable signal. Alternatively, whenever this input is high ("one"), all eight bits appearing on leads 837 are to be loaded into this register. The NPPR≦16 and the NPPR≧16 outputs provided by this register are high whenever the contents of this register are respectively less than or equal to the value "16" or greater than or equal to the value "16". Though these control signals are applied to control logic 890, in order to simplify the drawing, these signals as well as other control signals generated within scaler 720 are merely shown as being either routed to or from this control logic as part of the "other control signals" associated therewith. The low order four bits produced by this register are routed, via leads 845, as the horizontal stop position to selector/combiner 870 and to the data input to pass/zero circuit 850.

Pass/zero (P/Z) circuit 850 contains four AND gates 852, 854, 856 and 858 that either gate (pass) the input values applied over leads 845 to leads 859 or apply a zero value to leads 859. The specific operation provided by circuit 850 is governed by the state of a control signal applied to a P/−Z control input to this circuit. If a high level is applied to this input, then a pass operation occurs; otherwise in the event a low level is applied to this input, zero is applied to leads 859. Leads 859 route the output of pass/zero circuit 850 to a low order four-bit input of adder 835 and to an input of current pixel position register 865. Adders 820 and 835 may be combined into one adder, if desired.

Current pixel position register (CPPR) 865 is a four-bit register that holds the horizontal starting position relative to the first bit in the current input word of the current pixel block being processed. The horizontal start position produced by register 865 is applied, via leads 868, as an input to selector/combiner 870.

Pixel accumulating register 880 contains a one-bit register with an internal feedback path (not specifically shown). This path contains an OR gate connected to the input of the one-bit register. One input to this gate is the one-bit output that appears on lead 725; the other input to this gate is the input to register 880 that appears on lead 874. The output of this gate is applied to the input of the one-bit register itself. Through the feedback path, register 880 can logically combine, through an "OR" operation, a succession of output pixel values over multiple clock cycles in order to form a single output bit appearing on lead 725. The feedback path is disabled (masked) by a high level applied to a DISABLE FEEDBACK input to register 880 whenever a calculation of a new output pixel value is to begin. The contents of register 880, specifically the one-bit register contained therein, are cleared by a high level applied as a SYNCHRONOUS CLEAR (SYNC CLEAR) signal to a clear input to register 880.

Control logic 890, in response to various incoming control and clock signals, such as inter alia input EOL and input data valid and output data taken signals, generates appropriate clock, Clock Enable and other control signals necessary to control both the operation of the circuitry contained within horizontal reduction scaler 720 and the transfer of input and output bit-mapped image data to and from this scaler.

Horizontal reduction scaler 720 operates in the following manner. The first operational situation that involves scaler 720 is initialization. To initialize the scaler, a high level is applied to the initialize (INIT) input to groupsize error diffusion circuit 1200 to set this circuit to produce its first fractional groupsize value. After this circuit is clocked and coincident with a low level appearing at its INIT input, circuit 1200 produces its second value and so on for each successive clock pulse coincident with a high level appearing on the NEXT VALUE and Clock Enable inputs to the groupsize generator. In addition, the P/−Z control input to P/Z circuit 850 is set low to force this P/Z circuit to produce a zero value at its output. As such, CPPR 865, on the next clock cycle after the application of a high level Clock Enable signal, loads a zero value as the current pixel position. At the same time, NPPR 840 is set, by a low level applied to its L/−D input, to load the first pixel position, after the current pixel block, that is to be processed. Also, during initialization, the contents of pixel accumulating register 880 are cleared to zero through use of the synchronous clear signal. In addition, the output data valid control signal is also set low.

Thereafter, two other operational situations arise: second, whenever the current input pixel block ends at or before the end of the current input word (either of the signals NPPR≦16 or Input EOL is true—high) or third, whenever the current input pixel block extends into a subsequent input work (in which case both of the control signals NPPR≦16 and Input EOL are false—low). During the time occupied by the second situation, data selector/combiner 870 is processing the final portion of the input pixel block. In addition, during this situation, the output data valid signal is asserted after a clock edge. In addition, during this situation, groupsize error diffusion circuit 1200 advances its contents to the next value in succession as soon as its present value is used, i.e. on the upcoming clock edge. If an end of line occurs, then circuit 1200 is then re-initialized. In addition, P/Z circuit 850 is set to "pass" its input data to its output if an end of line has not occurred or apply a "zero" to its output once an end of line occurs and the Input EOL control signal goes high. In addition, CPPR 865 loads its input value which is the horizontal starting position of the next pixel block. Furthermore, NPPR 840 is set to advance to the first position after the upcoming (next) pixel block. After a clock edge, pixel accumulating register 880 presents the final pixel value for the current pixel block which is concurrently being applied to output lead 725. In addition, the feedback path of register 880 is disabled, through the feedback disable control signal applied thereto, in order for this register to properly begin accumulating pixel values for the next pixel block. Now, during the third situation, i.e. when the current input pixel block extends into a subsequent input word (in which case both of the control signals NPPR≦16 and Input EOL are false—low), the following occurs. First, during the time occupied by the third situation, data selector/combiner 870 is processing a non-final portion of the input pixel block. In addition, during this time, the output data valid control signal is set low after a clock edge. Furthermore, during this time, the groupsize error diffusion circuit does not advance its value. P/Z circuit is set during this time to provide a "zero" output to output leads 859 and, from there, to an input of adder 835 and CPPR 865. Furthermore, during this time, the CPPR will load its input value, which is maintained at zero. In addition, during this time, NPPR 840 is set to decrement through application of a low level control signal applied to its L/−D input, such that the high order four bits contained in this register will decrement at each successive clock pulse occurring during this time but the value of its low order four bits will remain fixed. Lastly, during this time, pixel accumulating register 880 accumulates its input value with its internal feedback path being enabled or disabled whenever the output data valid control signal is set to a low or high level, respectively.

Figure 9:
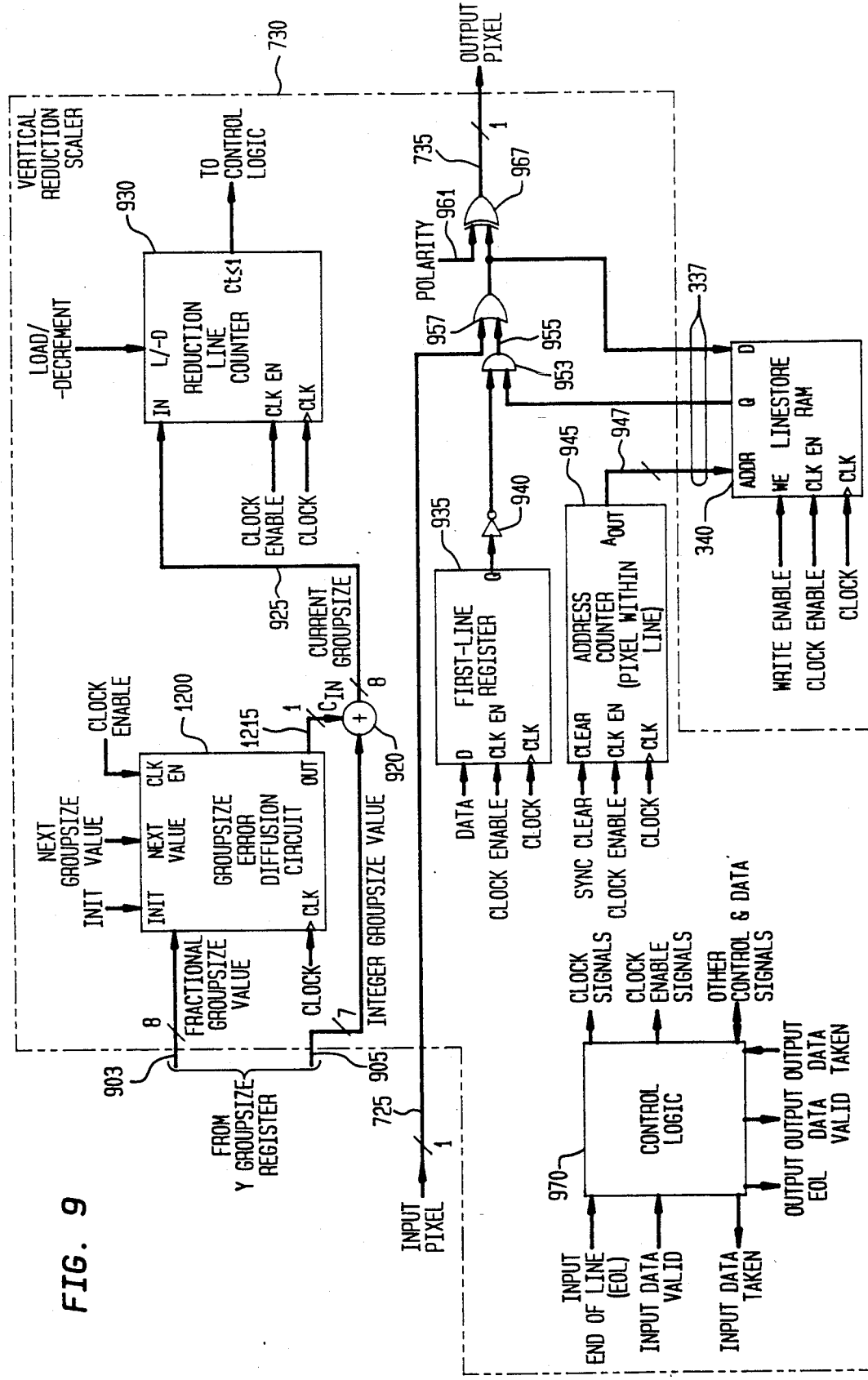
FIG. 9 depicts a block diagram of vertical reduction scaler 730 shown in FIG. 7.

FIG. 9 depicts a block diagram of vertical reduction scaler 730 shown in FIG. 7. This scaler combines successive groups of scan lines in an incoming bit-mapped image into a corresponding single output scan line. Each output scan line is produced during the time a final input line of each incoming pixel block is being applied to the scaler. At other times, an input scan line is either stored in a linestore RAM or combined with scan line data already present in this RAM.

Linestore RAM 340, which is connected, via leads 337, to scaler 730, stores a cumulative result of the input lines that have been processed in a current group. Each bit in this RAM operates essentially as a "D" type flip-flop through which that bit can receive input and provide an output value in a common clock cycle. The value of each bit in this RAM is "OR'ed", as discussed below through gates 953 and 957, with a corresponding input pixel. The resultant bit value is then written back into the corresponding bit position in this RAM. The write enable signal applied to this RAM is asserted high continuously except at those times while scaler 730 is waiting for a data transfer to be complete and its operation is suspended.

Scaler 730 contains a groupsize generator, formed of adder 920 and groupsize error diffusion circuit 1200; reduction line counter 930; first-line register 935; address counter 945; gates 940, 953, 957 and 967; and control logic 970. Within scaler 730, the current groupsize is generated through groupsize error diffusion circuit 1200 and adder 920 shown in FIG. 9. A Y groupsize register (not specifically shown) stores the desired vertical groupsize value for the entire image in both integer and fractional components. This non-integer groupsize value equals the desired vertical reduction scale factor, i.e. the number of successive scan lines in an original image that is to be reduced into one scan line in a reduced image. Here, the fractional component of the vertical scale factor, i.e. that of the Y groupsize, is routed in eight-bit parallel form over leads 903 to an input of groupsize error diffusion circuit 1200. Based upon this fractional value, circuit 1200 generates, as noted above, a pre-defined pattern of successive "1's" and "0's" which average out to the fractional value. Each successive value in this pattern is generated at each successive clock pulse coincident with a high level appearing on the NEXT VALUE and Clock Enable inputs to the groupsize generator. This single bit pattern is applied, via lead 1215, to a carry in ($C_{in}$) input of adder 920. The integer portion is applied via leads 905 in seven-bit parallel form to another input of this adder. As such, the eight-bit groupsize value produced by adder 920 and applied thereby to leads 925, for a non-integer scale factor, periodically varies between two integer values based upon the fractional component of the groupsize.

Reduction line counter 930 maintains a count of the current scan line being processed within a current pixel block. The counter is loaded with the current integer Y groupsize value appearing on lines 925 and then is successively decremented to one for each group of scan lines. Whenever a high level is applied to the load/decrement (L/−D) control input to this counter, the counter will load its contents from the Y groupsize value appearing on leads 925; otherwise, whenever the L/−D input remains at a low level, the counter will decrement at each successive clock pulse provided the Clock Enable to this counter is first asserted. The Ct≦1 output signal produced by counter 930, which is applied as an input to control logic 970, is asserted high whenever the contents of this counter become less than or equal to the value "one". Provided scaler 730 is operating correctly, the contents of counter 930 should never reach zero.

First-line register 935 is a clocked "D" flip/flop. The output of this flip/flop, which is asserted high during the first line in any incoming group of scan lines, for each row of pixel blocks, is inverted through inverter 940 and applied as an input to AND gate 953 and, from there via lead 955, through OR gate 957, to disable a feedback path of previous line pixel data into linestore RAM 340.

Address counter 945 maintains a count of the current pixel position within each scan line. At the end of each scan line, the synchronous clear (SYNC CLEAR) input to this counter is asserted high to clear the counter in preparation for the next scan line. The contents produced by this counter are applied in parallel, via leads 947 contained within leads 337, as an address to linestore RAM 340.

The polarity of the bi-tonal output pixels serially appearing on line 735 can be inverted, when desired. This is accomplished by applying a high level as a polarity control signal, via lead 961, to a first input of two-input Exclusive OR gate 967. The "OR'ed" combination produced by OR gate 957 of the input pixel appearing on input lead 725 and the values of the corresponding pixels stored within linestore RAM 340 is applied as a second input to gate 967. The high level polarity signal appearing on lead 961 causes gate 967 to invert the value of the "OR'ed" pixels appearing at its second input. The resulting pixel values produced by gate 967 are applied in serial fashion as output pixels to output lead 735.

Control logic 970, in response to various incoming control and clock signals, such as inter alia input EOL and input data valid and output data taken signals, generates appropriate clock, Clock Enable and other control signals necessary to control both the operation of the circuitry contained within vertical reduction scaler 730 and the transfer of input and output bit-mapped image data to and from this scaler.

Vertical reduction scaler 730 operates in the following manner. The first operational situation that involves scaler 730 is initialization. To initialize the scaler, a high level is applied to the initialize (INIT) input to groupsize error diffusion circuit 1200 to set this circuit to produce its first fractional groupsize value. During initialization, reduction line counter 930 is loaded with the current integer Y groupsize value appearing on leads 925. In addition, first-line register 935 is set to produce a high level at its output. Furthermore, the contents of address counter 945 are cleared to zero.

Thereafter, three other operational situations arise: second, whenever the first line of a group of scan lines is being processed (the output of the first-line register is high); third, whenever scan lines other than the last line in this group are being processed (the Ct≦1 control signal produced by reduction line counter 930 is low), and fourth, whenever the last line in this group is being processed (this Ct≦1 control signal is high). The second situation is not exclusive of the third and fourth situations. During the second situation, when only the first line in a group is being processed, the feedback path involving gates 953 and 957 is disabled by the high level output generated by first-line register 935. In addition, the output data valid signal produced by control logic 970 may be asserted true or false depending upon whether the first line is also the last line in the current group. During the third situation, when scan lines other than the last line (including the first and all successive scan lines, if any, but not the last scan line in the group) are being processed, the following occurs. First, during the time while this situation occurs, the output of the first-line register will reflect whether the current line is the first line in the group, i.e. as in the second situation described above) and will control whether the feedback path involving linestore RAM 340 is enabled to allow the "OR'ing" of successive scan lines in the group to continue with the results appropriately stored back into the linestore RAM. Also, during this time, a low level NEXT GROUPSIZE VALUE control signal is continuously applied to groupsize error diffusion circuit 1200 such that the groupsize produced by this circuit does not advance to its next successive value. In addition during this time, reduction line counter 930 is set to decrement its contents, by a suitable application of a low level to its L/−D input. Also, during this time, the Clock Enable input to this counter is asserted high when the control signal Input EOL is true, i.e. while the last pixel in the current scan line is being applied, over lead 725, to scaler 730. Address counter 945 increments its address at all successive clock pulses during this time except when the Input EOL control signal is true; when this control signal becomes true, a pulse is applied to the SYNCHRONOUS CLEAR input to this counter to clear its contents. Lastly, during this time, the input to first-line register 935 is set to false; the Clock Enable input to this register is asserted high whenever the Input EOL control signal becomes true. Lastly, during the fourth situation, when the last scan line in the group is being processed, the following occurs. First, a high level is applied, as the NEXT GROUPSIZE VALUE control signal, to groupsize error diffusion circuit 1200 whenever the Input EOL control signal becomes true, in order to cause this circuit to produce its next successive output value on lead 1215 and thereby advance the Y groupsize to its next successive integer value. In addition, during this time, reduction line counter 930 is set to load, and the Clock Enable signal to this counter is asserted high when the input EOL control signal becomes true. Also, during this time, address counter 945 is set to increment is contents except whenever the Input EOL control signal is true. Once the Input EOL control signal becomes true, the address counter is cleared through application of a pulse to its SYNCHRONOUS CLEAR input. Lastly, during this time the input to first-line register 935 is set high, its Clock Enable input will be true during the occurrence of the Input EOL control signal in order to once again disable the feedback path involving linestore RAM 340.

Figure 10:
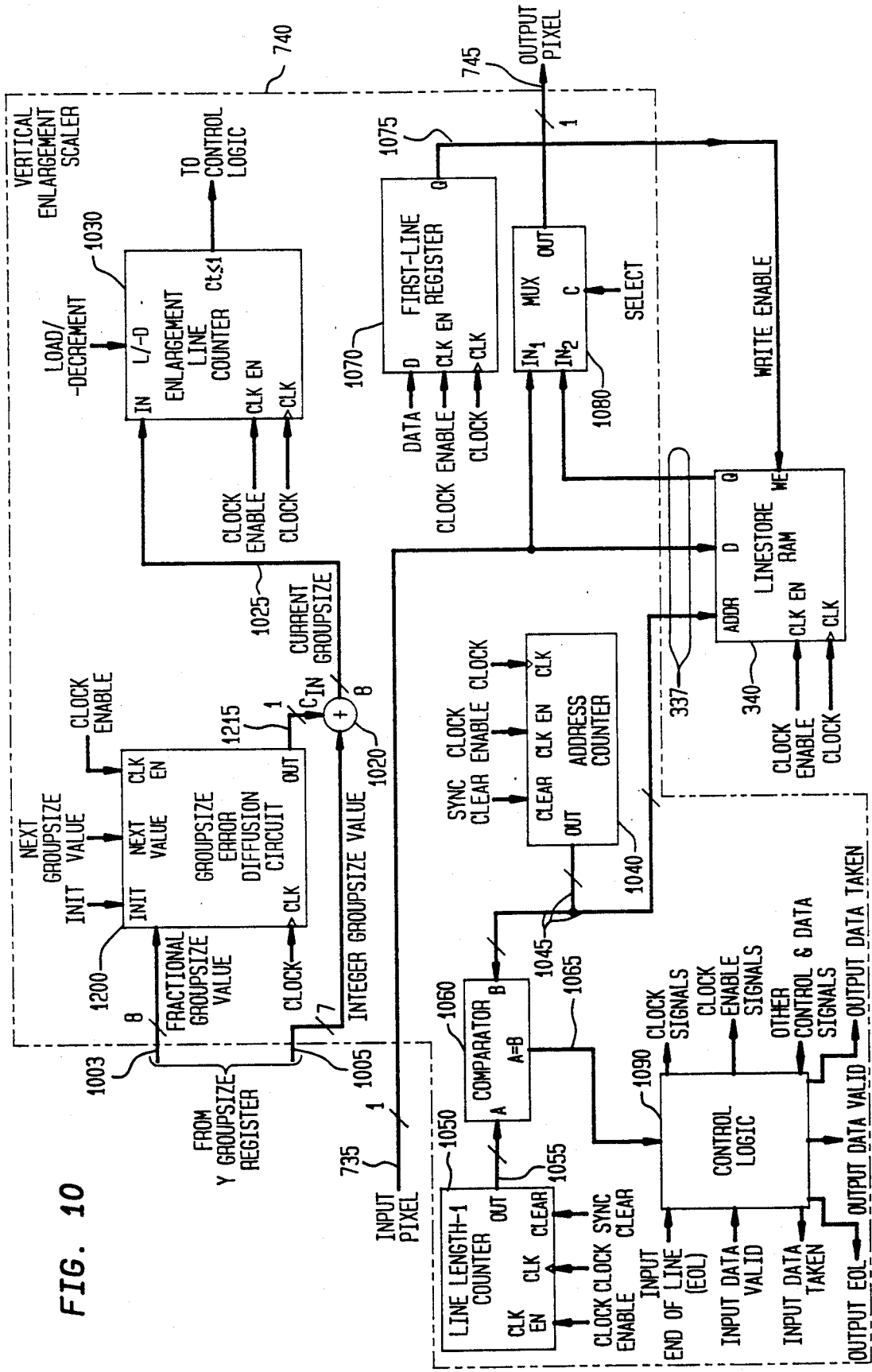
FIG. 10 depicts a block diagram of vertical enlargement scaler 740 shown in FIG. 7.

FIG. 10 depicts a block diagram of vertical enlargement scaler 740 shown in FIG. 7. As noted above, this scaler converts each incoming line of pixel values into groups of successive output lines that form pixel blocks in the enlarged image. The first output scan line of any group is produced during the time that the input line for this group is being applied to scaler 740. Appropriate handshaking, as defined above, is used to appropriately control, specifically stop, the flow of input pixels to scaler 740.

Linestore RAM 340, which is connected, via leads 337, to scaler 740, stores an input line of pixel values that is to be currently used in generating a group of output scan lines that forms the current pixel block in the enlarged image. The write enable signal applied to this RAM is asserted high while the input line, i.e. the first line of each group, is being applied as input over leads 735 to scaler 740 and specifically to linestore RAM 340.

Scaler 740 contains a groupsize generator, formed of adder 1020 and groupsize error diffusion circuit 1200; enlargement line counter 1030; address counter 1040; linelength-1 counter 1050; comparator 1060; first-line register 1070; multiplexor 1080; and control logic 1090. Within scaler 740, the current groupsize is generated through groupsize error diffusion circuit 1200 and adder 1020 shown in FIG. 10. A Y groupsize register (not specifically shown) stores the desired vertical groupsize value for the enlarged image in both integer and fractional components. This non-integer groupsize value equals the desired vertical enlargement scale factor, i.e. the number of successive scan lines in an enlarged image that is to be generated from each scan line in an incoming image. Here, the fractional component of the vertical scale factor, i.e. that of the Y groupsize, is routed in eight-bit parallel form over leads 1003 to an input of groupsize error diffusion circuit 1200. Based upon this fractional value, circuit 1200 generates, as noted above, a pre-defined pattern of successive "1's" and "0's" which average out to the fractional value. Each successive value in this pattern is generated at each successive clock pulse. This single bit pattern is applied, via lead 1215, to a carry in ($C_{in}$) input of adder 1020. The integer portion is applied via leads 1005 in seven-bit parallel form to another input of this adder. As such, the eight-bit groupsize value produced by adder 1020 and applied thereby to leads 1025, for an non-integer scale factor, periodically varies between two integer values based upon the fractional component of the groupsize.

Enlargement line counter 1030 maintains a count of the current scan line that is being produced within the current group of lines. This counter is loaded with the current integer Y groupsize value appearing on lines 1025 and then is successively decremented to one for each line in the current group. Whenever a high level is applied to the load/decrement (L/−D) control input to this counter, the counter will load its contents from the Y groupsize value appearing on leads 1025; otherwise, whenever the L/−D input remains at a low level, the counter will decrement at each successive clock pulse provided the Clock Enable to this counter is first asserted. The $Ct \leq 1$ signal produced by counter 1030, which is applied as an input to control logic 1090, is asserted high whenever the contents of this counter become less than or equal to the value "one". Provided scaler 740 is operating correctly, the contents of counter 1030 should never reach zero.

Address counter 1040 maintains a count of the position of the current word within the current line. At the end of each line, the synchronous clear (Sync Clear) input to this counter is asserted high to clear the counter in preparation for the next scan line. The contents produced by this counter are applied in parallel, via leads 1045 contained within leads 337, as an address to linestore RAM 340 and to one input of comparator 1060.

Linelength-1 counter 1050 maintains a count, only during the first line of each group to be generated, of the current input word in the line. This counter, incrementing from zero, stops at a value that is one less than the number of words in this line. While the remaining output lines are being generated in this group, the value produced by counter 1050 remains constant. The output of counter 1050 is applied, via leads 1055, to another input of comparator 1060.

Comparator 1060 is used during the generation of all output lines in the current group, other than the first, to form an output EOL control signal at the appropriate time. Whenever the address residing within address counter 1040 equals the value stored within linelength-1 counter 1050, i.e. one less than the number of words in a line, comparator 1060 applies a high level to lead 1065 which, through control logic 1090, generates an Output EOL control signal to signify that the end of the current line being generated has been reached.

First-line register 1070 is a clocked "D" flip/flop. The output of this flip/flop is asserted high during the first line that is to be generated for any group of output scan lines. The output of this flip/flop is applied, via lead 1075, as a Write Enable input to linestore RAM 340 in order to enable writing of pixel data for the first scan line into the linestore RAM.

Multiplexor 1080, operating in response to a suitable select signal generated by control logic 1090 and applied to a control (C) input of this multiplexor, passes the incoming line of pixel values appearing on lead 735 and applied to a first input ($IN_1$) of this multiplexor to output lead 745 as the pixel data for the first line in the group. However, for all successive lines in this group, the multiplexor is set, by its select signal, to route pixel data read from linestore RAM 340 and applied to a second input ($IN_2$) of this multiplexor onto output lead 745 as the output pixel data for these successive lines.

Control logic 1090, in response to various incoming control and clock signals, such as inter alia input EOL and input data valid and output data taken signals, generates appropriate clock, Clock Enable and other control signals necessary to control both the operation of the circuitry contained within vertical enlargement scaler 740 and the transfer of input and output bit-mapped image data to and from this scaler.

Vertical enlargement scaler 740 operates in the following manner. The first operational situation that involves scaler 740 is initialization. To initialize the scaler, a high level is applied to the initialize (INIT) input to groupsize error diffusion circuit 1200 to set this circuit to produce its first fractional groupsize value. After this circuit is clocked and once a low level is applied to its INIT input, as noted above, circuit 1200 produces its second value and so on for each successive clock pulse appearing coincident with a high level appearing on the NEXT VALUE and Clock Enable inputs to the groupsize generator. During initialization, enlargement line counter 1030 is loaded with the current integer Y groupsize value appearing on leads 1025. In addition, the contents of address counter 1040 and linelength-b 1 counter 1050 are both cleared to zero. Furthermore, first-line register 935 is set to produce a high level at its output.

Thereafter, four other operational situations arise: second, whenever the first line of each group of scan lines in an enlarged image is being processed (the output of the first-line register is high); third, whenever scan lines other than the first line in this group are being processed (the output of the first-line register is low); fourth, whenever lines in this group other than the last line therein are being processed (the $Ct \leq 1$ control signal produced by enlargement line counter 1030 is low); and fifth, whenever the last line in this group is being processed (this $Ct \leq 1$ control signal is high). The second and third situations here are not exclusive of either the fourth or fifth situations. During the time when the second situation occurs, i.e. when the first line in a group in the enlarged image is being processed, the following occurs. The flow of incoming pixel values over lead 735 is enabled by control logic 1090. In addition, the incoming pixel data is written into linestore RAM 340. Multiplexor 1080 is instructed by control store 1090 to route the incoming pixel data appearing on leads 735 to output leads 745. Furthermore, address counter 1040 and linelength-1 counter 1050 are incrementing in lockstep; except when the Input EOL control signal becomes true. When this control signal becomes true, then the address counter is cleared by application of a pulse to the SYNCHRONOUS CLEAR input to this counter. In addition and in response to the true state of the Input EOL control signal, the Clock Enable and SYNCHRONOUS CLEAR inputs to linelength-1 counter 1050 are both set true if the $Ct \leq 1$ signal produced by enlargement line counter is true (high). Alternatively, if this $Ct \leq 1$ signal is false (low), then the Clock Enable and SYNCHRONOUS CLEAR inputs to the linelength-1 are both set false (low). Moreover, the state of the Output EOL control signal follows that of the Input EOL control signal. During the third situation, when lines in the enlarged image other than the first line (including all successive scan lines, if any, and the last scan line in the group) are being processed, the following occurs. First, during the time while this situation occurs, incoming pixel values are inhibited by control logic 1090 from occurring over lead 735. Second, linestore RAM 340 is successively read to produce duplicate output lines of pixel values. Multiplexor 1080 is instructed by control store 1090 to route the output of the linestore RAM, rather than incoming pixel data, to output leads 745. In addition, address counter 1040 counts words that occur within each output scan line currently being processed. Also, during this time, control logic 1090, in response to an output signal produced by comparator 1060 and appearing on lead 1065, produces the Output EOL control signal. The Clock Enable input to the linelength-1 counter is set false (low) so that the linelength-1 counter holds its previously counted value that occurred at the end of the second situation, except when the Output EOL control signal becomes true. When this signal becomes true, the SYNCHRONOUS CLEAR signal applied to address counter 1040 will be asserted high thereby clearing the contents of this counter. In addition and in response to the occurrence of the Output EOL control signal, the Clock Enable and SYNCHRONOUS CLEAR inputs to linelength-1 counter 1050 are both set true if the $Ct \leq 1$ output produced by enlargement line counter 1030 is true (high). Alternatively, if this $Ct \leq 1$ output is false (low), then the Clock Enable and SYNCHRONOUS CLEAR inputs to the linelength-1 counter are both set false (low). During the fourth situation, when lines in the enlarged image other than the last line (including the first and all successive scan lines, if any, other than the last scan line in the group) are being processed, the following occurs. First, during this time, a low level NEXT GROUPSIZE VALUE control signal is continuously applied to groupsize error diffusion circuit 1200 such that the groupsize produced by this circuit does not advance to its next successive value. In addition and during this time, enlargement line counter 1030 decrements by the application of a low level to its L/—D input. The Clock Enable input to this counter is asserted high whenever the Output EOL control signal is true. In addition, during this time, address counter 1040 increments except when the Output EOL control signal is true at which time a pulse is applied as a SYNCHRONOUS CLEAR signal to this counter so as to clear its contents to zero. Furthermore, during this time, the data input to first-line register 1070 remains low; however, the Clock Enable signal applied to this register is enabled during this time whenever the Output EOL control signal becomes true. Lastly, during the fifth situation, when the last line in the enlarged image is being processed, the following occurs. First, during this time, a high level is applied, as the NEXT GROUPSIZE VALUE control signal, to groupsize error diffusion circuit 1200, whenever the Output EOL control signal becomes true, in order to cause this circuit to produce its next successive output value on lead 1215 and thereby advance the Y groupsize to its next successive integer value. In addition, during this time, a high level is maintained at the L/—D input to enlargement line counter 1030 and its Clock Enable input will be operated in order to cause this counter to load the integer groupsize value appearing on leads 1025 whenever the Output EOL control signal becomes true. During this time, address counter 1040 successively increments its contents except when the Output EOL control signal becomes true at which point a pulse is applied to the SYNCHRONOUS CLEAR input to this counter in order to clear its contents to zero. Lastly, during this time, the data input to first-line register 1070 is maintained high, with the Clock Enable input to this register being true whenever the Output EOL control signal goes true.

Figure 11:
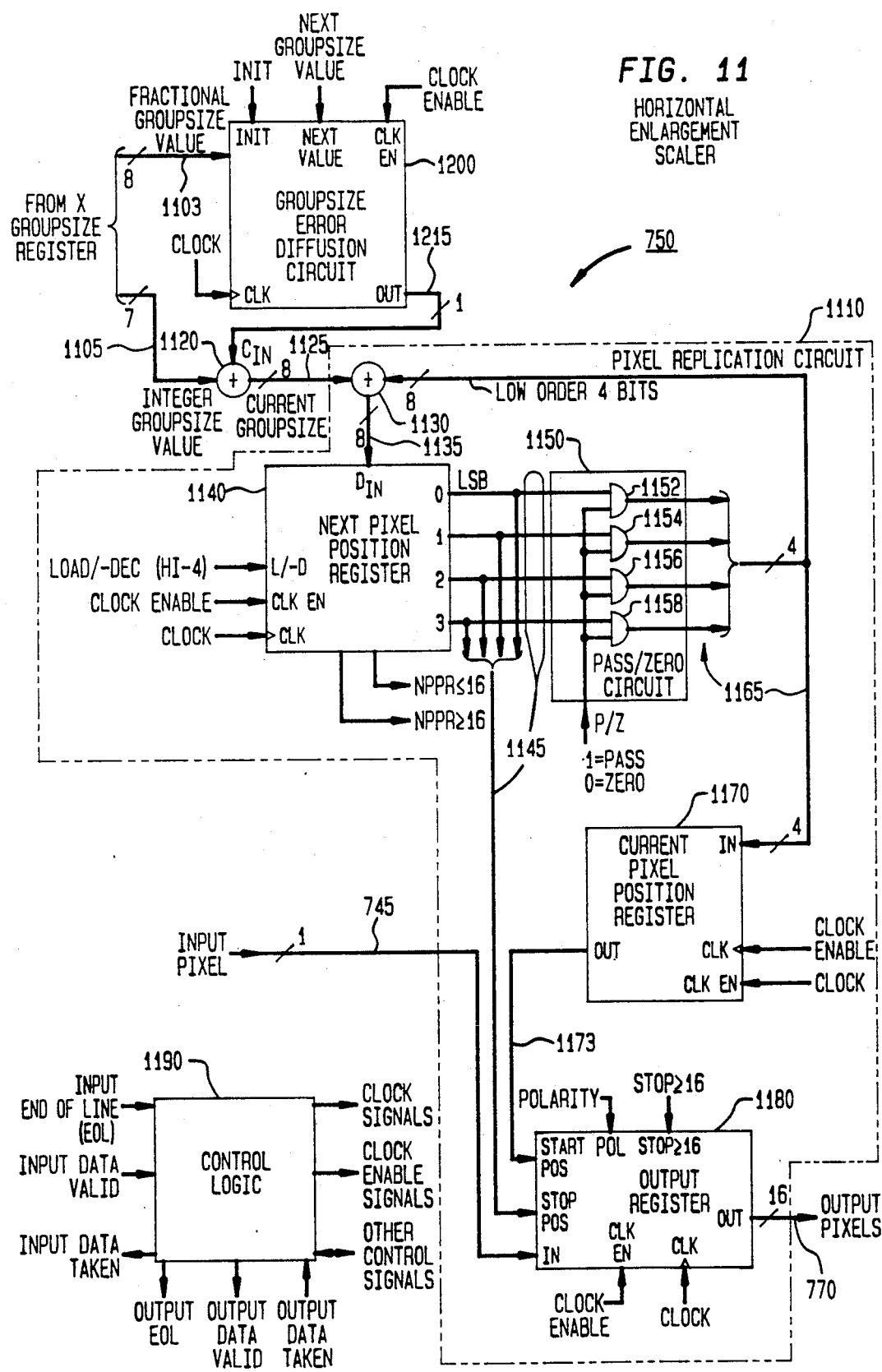
FIG. 11 depicts a block diagram of horizontal enlargement scaler 750 shown in FIG. 7.

FIG. 11 depicts a block diagram of horizontal enlargement scaler 750 shown in FIG. 7. As noted above, this scaler converts each incoming pixel into a group of horizontally successive output pixels that is situated in a current line in an enlarged image.

Scaler 750 contains a groupsize generator, formed of adder 1120 and groupsize error diffusion circuit 1200; pixel replication circuit 1110 and control logic 1190. Within scaler 750, the current groupsize is generated through groupsize error diffusion circuit 1200 and adder 1120. An X groupsize register (not specifically shown) stores the desired vertical groupsize value for the enlarged image in both integer and fractional components. This non-integer groupsize value equals the desired horizontal enlargement scale factor, i.e. the number of successive pixels in a scan line in an enlarged image that is to be generated from each pixel in an incoming image. Here, the fractional component of the horizontal scale factor, i.e. that of the X groupsize, is routed in eight-bit parallel form over leads 1103 to an input of groupsize error diffusion circuit 1200. Based upon this fractional value, circuit 1200 generates, as noted above, a pre-defined pattern of successive "1's" and "0's" which average out to the fractional value. Each successive value in this pattern is generated at each successive clock pulse coincident with a high level appearing on the NEXT VALUE and Clock Enable inputs to the groupsize generator. This single bit pattern is applied, via lead 1215, to a carry in ($C_{in}$) input of adder 1120. The integer portion is applied via leads 1105 in seven-bit parallel form to another input of this adder. As such, the eight-bit groupsize value produced by adder 1120 and applied thereby to leads 1125, for a non-integer scale factor, periodically varies between two integer values based upon the fractional component of the groupsize.

Pixel replication circuit 1110 contains adder 1130, next pixel position register 1140, pass/zero circuit 1150, current pixel position register 1170 and output register 1180. Circuit 1110 replicates an incoming pixel value appearing on lead 745 across as many horizontally situated pixels in the enlarged image as specified by the integer groupsize value appearing on leads 1125.

Next pixel position register (NPPR) 1140 is an eight-bit register that stores the position of the first pixel after a current group of output pixels, relative to bit zero of the current output word. This position may extend into subsequent output words. While a low ("zero") level is applied as a LOAD/—DECREMENT (HI—4) signal to register 1140, specifically the L/—D input thereof, the high order four bits contained within the register decrement and the low order four bits remain constant at each successive clock pulse coincident with the application of a high level to its Clock Enable input. Alternatively, whenever this input is high ("one"), all eight bits then appearing on leads 1135 are loaded into this register. The NPPR $\leq 16$ and the NPPR $\geq 16$ outputs provided by this register are high whenever the eight-bit contents of this register are respectively less than or equal to the value "16" or greater than or equal to the value "16". Though these control signals are applied to control logic 1190, in order to simplify the drawing, these signals as well as other control signals generated within scaler 750 are merely shown as being either routed to or from this control logic as part of the "other control signals" associated therewith. The low order four bits produced by register 1140 are routed, via leads 1145, as the horizontal stop position to output register 1180 and to the data input to pass/zero circuit 1150.

Pass/zero (P/Z) circuit 1150 contains four AND gates 1152, 1154, 1156 and 1158 that either gate (pass)

the input values applied over leads 1145 to leads 1165 or apply a zero value to leads 1165. The specific operation provided by circuit 1150 is governed by the state of a control signal applied to a P/−Z control input to this circuit. If a high level is applied to this input, then a pass operation occurs; otherwise in the event a low level is applied to this input, zero is applied to leads 1165. Leads 1165 route the output of pass/zero circuit 1150 to a low order four-bit input of adder 1130 and to an input of current pixel position register 1170. Adders 1120 and 1130 may be combined into one adder, if desired.

Current pixel position register (CPPR) 1170 is a four-bit register that holds the horizontal starting position relative to bit zero in the current output word being processed in the enlarged image. The horizontal start position produced by register 1170 is applied, via leads 1173, as an input to output register 1180.

Output register 1180 contains an addressable register file that permits one-bit input pixel data appearing on input lead 745 to be written into a range of successive single-bit locations in the register. Separate addresses supplied to the start and stop position inputs to this register respectively define the first location in this range and the first location after this range. The output bits produced in parallel by this register and appearing on leads 770 are numbered from zero to fifteen with bit zero being the leftmost pixel. The Stop≧16 control input to register 1180 overrides the stop position input and allows the range to extend to the end of a current output word (up to and including bit fifteen thereof). A high level, when applied to the polarity input to register 1180, causes this register to invert each sixteen bit word of pixel data then being applied to output leads 770.

Control logic 1190, in response to various incoming control and clock signals, such as inter alia input EOL and input data valid and output data taken signals, generates appropriate clock, Clock Enable and other control signals necessary to control both the operation of the circuitry contained within horizontal enlargement scaler 750 and the transfer of input and output bit-mapped image data to and from this scaler.

Horizontal enlargement scaler 750 operates in the following manner. The first operational situation that involves scaler 750 is initialization. To initialize the scaler, a high level is applied to the initialize (INIT) input to groupsize error diffusion circuit 1200 to set this circuit to produce its first fractional groupsize value. After this circuit is clocked and a low level is applied to the INIT input, as noted above, the circuit produces its second value and so on for each successive clock pulse coincident with a high level appearing on the NEXT VALUE and Clock Enable inputs to the groupsize generator. During initialization, pass/zero circuit 1150 is set to provide a "zero" output on leads 1165. In addition, the Clock Enable input to CPPR 1170 is set true so that the CPPR loads the zero value produced by P/Z circuit 1150 and appearing on leads 1165. Furthermore, a high level is applied to the load/decrement (L/−D) input to NPPR 1140 thereby causing this register to load the value produced by adder 1130 which is the first position after the current output pixel group.

Thereafter, two other operational situations arise: second, whenever the current group of output pixels ends at or after the end of the current output word or an incomplete output word must be written at an end-of-line condition (either of the signals NPPR≧16 or Input EOL is true—high) or third, whenever the current group of output pixels stops before the end of the current output word (in which case both of the control signals NPPR≧16 and Input are false—low). During the second situation, a single incoming pixel value appearing on lead 745 is being written into a final portion of an output pixel group stored within output register 1180 for the current output word. In addition, during this situation, the output data will be applied in parallel over leads 770 by register 1180 after a clock edge. In addition, during this situation and as soon as the present groupsize value is used which is indicated by NPPR≧16 being true, a high level is applied as the NEXT GROUPSIZE VALUE control signal to groupsize error diffusion circuit 1200 in order to cause this circuit to advance the integer groupsize to the next successive value. If the signal Input EOL becomes true during this time, then groupsize error diffusion circuit 1200 will be re-initialized by the application of a pulse to its INIT input. In addition, during this time P/Z circuit 1150 is set to apply a "zero" to its output. In addition, during this time, CPPR 1170 loads its input value which is the starting position of the next group of pixels. Furthermore, if both the Input EOL and NPPR≧16 control signals are both false, then a low level is applied to the load/decrement input to NPPR 1140 in order to cause this register to decrement the contents of its high-order four bits while maintaining the value of its low-order four bits constant. If either the Input EOL or NPPR≧16 control signal becomes true during this time, then NPPR 1140 is set, by application of a high level to its load/decrement input, to load the first position after the next group of output pixels. Now, during the third situation, i.e. when the current group of output pixels stops before the end of the current output word (in which case both of the control signals NPPR≧16 and Input EOL are false—low), the following occurs. First, during the time occupied by the third situation, data has not been completely written into output register 1180. Second, the pixel data contained within this register will not be written by this register onto leads 770 after the occurrence of a clock edge. In addition, during this time P/Z circuit 1150 is set to "pass" the position appearing on leads 1145 of the first pixel in the next upcoming pixel group to the CPPR and to adder 1130. The CPPR will then load this value. Also, during this time, NPPR 1140 is set, by application of a high level to its load/decrement input, to load the value produced by adder 1120 and appearing on leads 1135 of the position of the first pixel occurring after the upcoming group of pixels that is to be currently produced by scaler 750. Lastly, a high level is applied as the NEXT GROUPSIZE VALUE control signal to groupsize error diffusion circuit 1200 in order to cause this circuit to advance the integer groupsize to the next successive value.

As can be seen from the above discussion and the accompanying figures, horizontal reduction scaler 720 and horizontal enlargement scaler 750 possess many similar internal components. As such, these scalers can be readily merged, if desired, into one horizontal scaler that performs both reduction and enlargement functions on incoming pixel data. Likewise, as can be seen from the above discussion and the accompanying figures, vertical reduction scaler 730 and vertical enlargement scaler 740 also possess many similar internal components and, if desired, can be merged into a common vertical scaler that performs both vertical reduction and vertical enlargement functions on incoming pixel data. In addition, the vertical scaling circuits can be readily modified to operate on multi-bit words in a parallel fashion.

Figure 12:
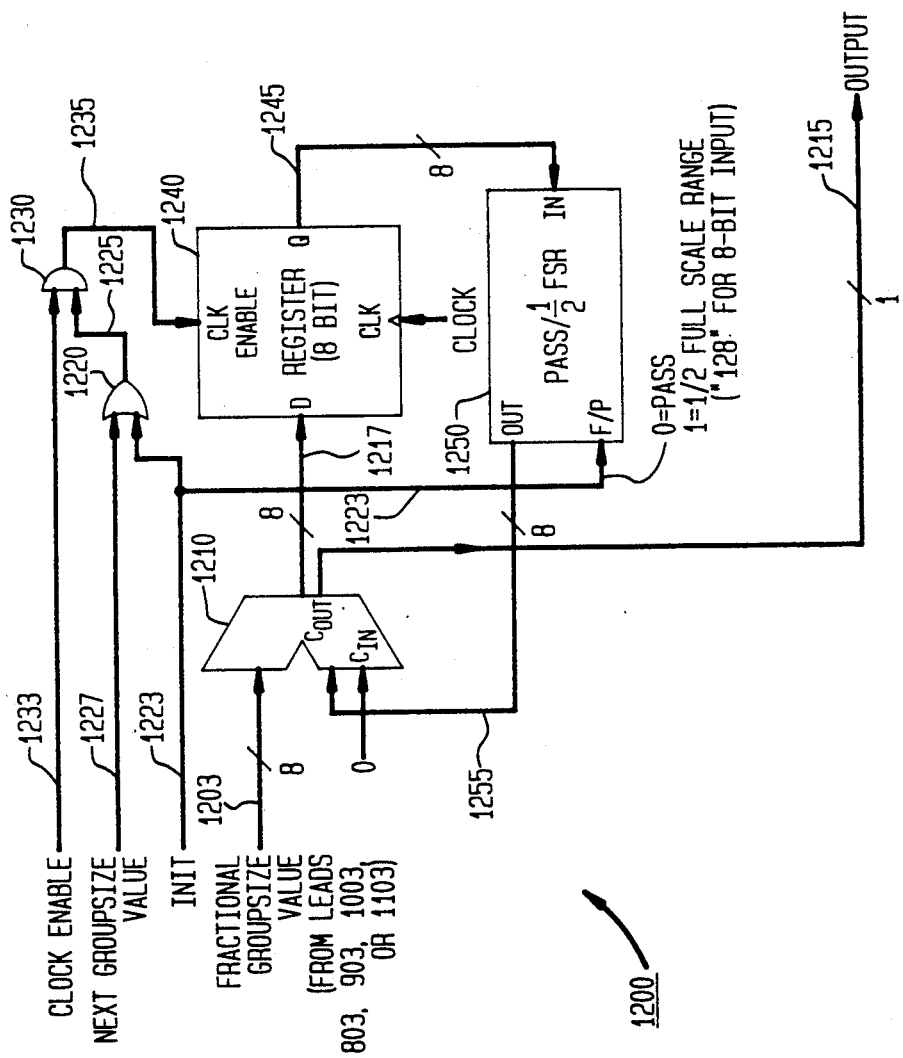
FIG. 12 depicts a block diagram of groupsize error diffusion circuit 1200 shown in FIGS. 8-11.

FIG. 12 depicts a block diagram of groupsize error diffusion circuit 1200 shown in FIGS. 8-11. As discussed above, circuit 1200, based upon the fractional groupsize value, generates an evenly distributed pre-defined pattern of successive "1's" and "0's" on lead 1215 which average out to this fractional value. Each successive value in this pattern is generated at each successive clock pulse coincident with the application of a high level applied to the NEXT VALUE and Clock Enable inputs to the groupsize generator. For example, to generate a value of 0.5, the pattern "1, 0, 1, 0, 1, 0, . . ." is produced. Alternatively, to generate a value of 0.33, the pattern "0, 1, 0, 0, 1, 0, . . . " is produced and so on for other fractional values.

As shown, circuit 1200 contains adder 1210, register 1240, pass/ ½ FSR circuit 1250 and gates 1220 and 1230. Adder 1210 produces the sum of the fractional eight-bit groupsize value applied over leads 1203 and the current output appearing on leads 1255 of pass/ ½ FSR circuit 1250. A zero is continuously applied to the carry-in ($C_{in}$) input to this adder. The single bit carry-out ($C_{out}$) generated by this adder is applied to lead 1215 as the pre-defined pattern of "1's" and "0's". The eight-bit output produced by adder 1210 is applied, via leads 1217, to the data ("D") input of clocked eight-bit register 1240. If a high level is applied, via lead 1235, to a Clock Enable input of register 1240, this register will store input data applied to it upon receiving a clock edge that occurs while its Clock Enable signal is at a high level. To generate the signal used for the Clock Enable of this eight-bit register, the NEXT GROUPSIZE VALUE signal applied to lead 1227 and the initialize signal, INIT, applied to lead 1223 are combined through OR gate 1220. The output of this gate is fed, via lead 1225, to one input of AND gate 1230. The other input to this AND gate is the Clock Enable control signal of the groupsize error diffusion circuit applied to lead 1233. The resulting output of AND gate 1230 is applied, via lead 1235, as the Clock Enable signal to register 1240. The INIT signal appearing on lead 1223 is also routed, via this lead, to the Pass/ ½ FSR control input to circuit 1250. Circuit 1250, which is formed of simple combinatorial gating, similar to that which implements the P/Z circuits discussed above, applies one of two values to its output leads 1255: either, whenever a low level is applied to its F/P control input, the value of its eight-bit input signal appearing on leads 1245 which equals the current contents of register 1240 or, whenever a high level is applied to its F/P input, a fixed number which equals one half of the full scale value (½ FSR) that can be stored in register 1240. Inasmuch as an eight-bit register is used to implement register 1240, the largest (full scale) value that can be store within this register is "256" and hence the fixed value equals "128". The size of register 1240 may be suitably increased or decreased, if desired, to appropriately increase or decrease the accuracy of the pattern generated by circuit 1200 in representing, when averaged, a fractional groupsize value. Also, the fixed value generated by circuit 1250 would then change as well.

In operation, circuit 1200 is first initialized by a high level Clock Enable signal and a pulse applied as the INIT signal to lead 1223. Also, during initialization, the fractional groupsize value is first applied, via leads 1203 to adder 1210 and a high level is asserted on Clock Enable lead 1233. In response to the INIT signal, circuit 1250 applies the fixed value "128" to its output leads 1255 as an input to adder 1210. The resulting carry-out bit produced by this adder onto output lead 1215 is the first bit in the pre-defined pattern. In response to the high level Clock Enable signal and the simultaneously occurring INIT pulse, AND gate 1230 produces a pulse which is applied, via lead 1235, to the Clock Enable input of register 1240. Upon the next clock edge, register 1240 loads the eight-bit sum produced by adder 1210. Thereafter, the high level Clock Enable signal may be removed. Once the INIT signal returns to a low level, circuit 1250 then passes the contents of register 1240 that appear on its output leads 1245, via leads 1255, to one input of adder 1210 for use during the generation of the next successive bit in the pattern. To generate the next bit in the pattern, the Clock Enable signal is again set high, a pulse is applied as the NEXT GROUPSIZE VALUE signal to lead 1227 and a clock edge is then applied to register 1240. This causes the sum having been produced by adder 1210 and appearing at its output, for the most recent bit in the pattern, to be clocked into register 1240 and, via circuit 1250, then fed back to one input of adder 1210. The present value of the carry-out bit produced by the adder becomes the next successive bit in the pattern. Thereafter, the Clock Enable and NEXT GROUPSIZE VALUE signals are both returned to a low level in preparation for generating the next successive value in the pattern, and so on for each successive bit in this pattern. The implementation described above of the groupsize error diffusion circuit may be readily replaced, if desired, with a lookup table accessed by an address counter in order to generate the desired pattern of bits. Alternatively, instead of adding a single bit to an integer value, the groupsize generator could be implemented using two registers, each of which stores an integer value, with appropriate logic that reads the value from one or the other of these registers in a predefined pattern that on the average equals the desired non-integer groupsize value.

Furthermore, in accordance with the teachings of the present invention, a second scaling technique has been developed for producing a reduced size image for inclusion in a composite multi-image display produced by a workstation used in an image management system. This technique, like the inventive error diffusion pixel saving reduction scaling method described above, also substantially eliminates the drawbacks inherent in scaling techniques known in the art while producing a reduced bi-tonal image, that, while being degraded, nevertheless contains sufficient detail to enable the user to grossly recognize the overall content of the image.

Rather than relying on logically combining a block of pixels of varying groupsizes in order to yield a single pixel value in a reduced sized image with a one- or two-dimensional variation in the groupsize of successive blocks as defined by the vertical and horizontal scale factors, in general this second technique produces a scaled image by mapping source pixels into destination pixels. Specifically, a reduced image is produced by moving through a source (original) image by increments of a single full pixel with corresponding movement through a destination (reduced) image in fractional pixel movements to define corresponding pairs of pixel locations in both images, i.e. one pixel location in the original image and a corresponding pixel location in the enlarged image. Once a pair is defined, a current pixel in the reduced image (as defined by the integer portion of the current pixel location therein) is conditionally set to the value of its corresponding pixel in the source image (as defined by the integer portion of the current pixel location therein) thereby effecting pixel saving.

In particular, with the second scaling technique, separate position counters are used to maintain current vertical and horizontal pixel positions (coordinate addresses) in both the original and reduced images. The horizontal and vertical pixel counters for the original image are successively incremented by one count to step through a scan line on a pixel-by-pixel basis and then step from one scan line to the next and so on throughout this image. In contrast, the horizontal and vertical pixel counters in the reduced image are incremented by desired fractional amounts, using values that are nearest to the reciprocal of the horizontal and vertical scale factors, to successively step both horizontally and vertically through this image using fractional increments in both the horizontal and vertical directions. After each separate step is made to a new position for the original image, a corresponding step is made to a corresponding position in the reduced image. The value, e.g. its foreground value, of a pixel at the corresponding position in the reduced image is set equal to the value of a pixel, e.g. its foreground value, situated at the current position in the original image. If no reduction is desired either horizontally or vertically, then successive movements are made through the reduced image by a full pixel rather than a fraction thereof. Each of these position counters contains bits to the right of a decimal point so that fractional movements can be made through an image. Whenever any one of these counters is used to reference a particular pixel in an image, the fractional portion contained in that counter is ignored. Typically, the initial value in each counter is set to one half of the fractional step size to facilitate subsequent rounding operations. Inasmuch as reduction scaling involving this second method utilizes pixel saving and fractional movement, this reduction scaling method is hereinafter referred to as the fractional movement pixel saving reduction scaling method.

Advantageously, both the first and second scaling techniques each provide an output that resembles that of a "low pass" filter thereby providing a reduced amount of output aliasing. Moreover, both inventive saving techniques advantageously do not require the use of multiplies (either for reduction or enlargement scaling) as are normally required in convolution based scaling methods, thereby simplifying the implementation of each of these techniques method and increasing the rate at which scaling can be performed.

Figure 13A:
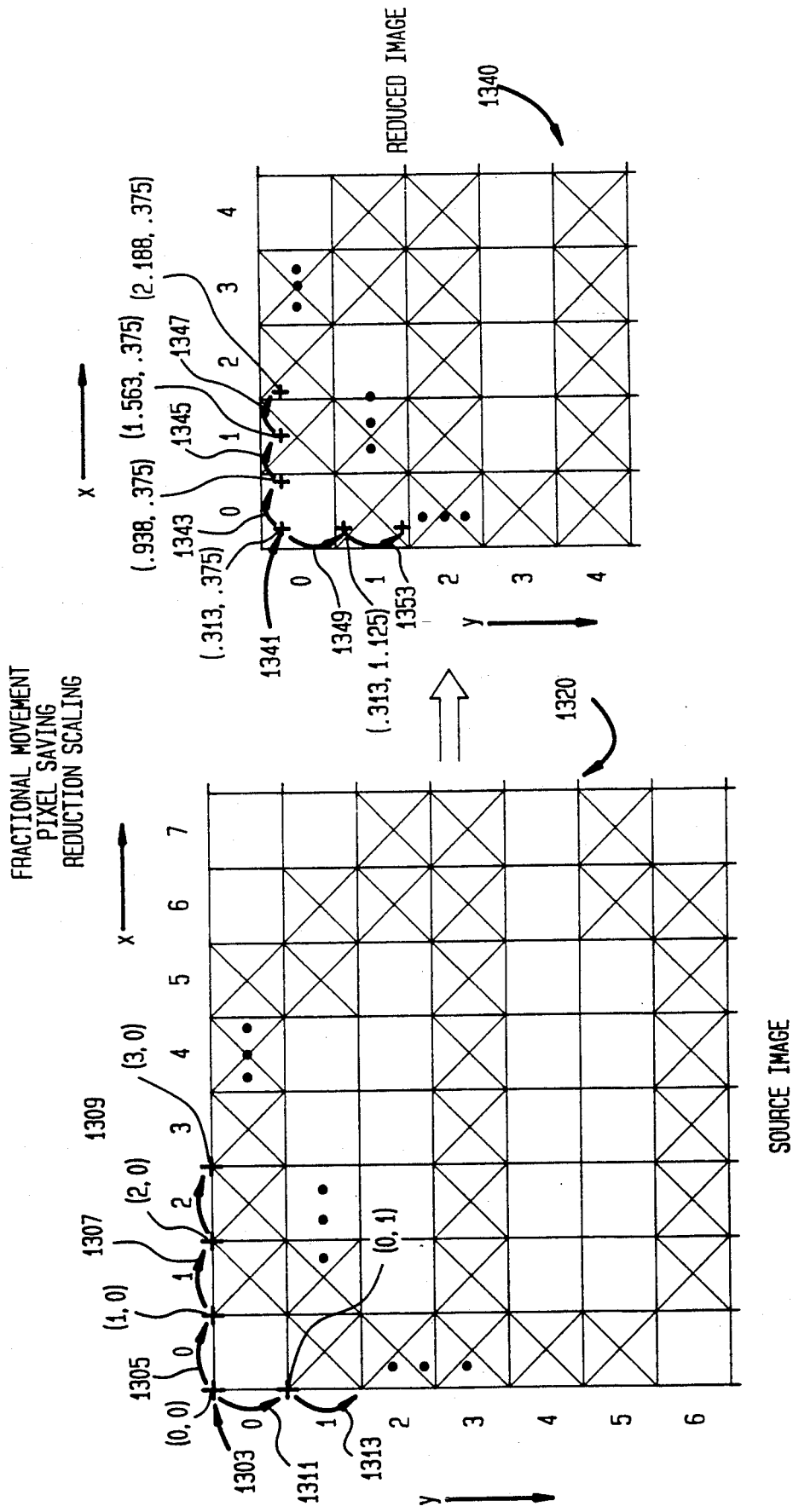
FIG. 13A diagrammatically shows the manner through which an illustrative source image is scaled to yield an illustrative reduced image using the inventive fractional movement pixel saving reduction scaling method.

FIG. 13A diagrammatically shows the manner through which an illustrative source image is scaled to yield an illustrative reduced image using the inventive fractional movement pixel saving reduction scaling method.

As shown, source (original) image 1320 is reduced by different scale factors in both the vertical and horizontal directions, e.g. illustratively 1.6 in the horizontal direction and 1.333 in the vertical direction, to yield reduced (destination) image 1340. To achieve this reduction scaling, the starting position in source image 1320 is taken as (0, 0) and that in reduced image 1340 is 0.313, 0.375). Each subsequent incremental movement through the source image occurs on a full pixel-by-full pixel basis, i.e. in steps of "1", through source image 1320, horizontally and, at end of each scan line, vertically to successively step to each pixel in this image. Each subsequent incremental movement through the reduced image occurs on a fractional pixel basis, specifically in increments of 0.625 pixels horizontally and, at the end of a scan line, 0.75 pixels vertically. After a corresponding incremental movement in both images, the pixel value at a current pixel location in the source image is copied into a current corresponding pixel location in the reduced image. Those illustrative pixels in both the source and reduced images that are darkened are marked by an "X". To begin scaling, first all the pixels in the reduced image are set to a value of zero. Pixel positions for the source and reduced images are initialized to (0, 0) and (0.313, 0.375), respectively. Inasmuch as the value of the pixel in image 1320, i.e. pixel (0,0), that contains this location in the source image has a value of "0", i.e. is not dark, the corresponding pixel, i.e. pixel (0, 0), in reduced image 1340 is not changed. From initial position 1303, having coordinate address values (0, 0), in source image 1320, an incremental movement occurs, as symbolized by line 1305 to pixel coordinate address (pixel location) (1, 0) representing a step horizontally to the next pixel in this image. A corresponding horizontal incremental movement, as symbolized by line 1343 occurs in reduced image 1340 from initial position 1341, having address coordinate value (0.313, 0.375), to coordinate values (0.938, 0.375). As can be seen, pixel (1, 0) in the source image is dark. Coordinate address value (0.938, 0.375) in reduced image 1340 lies within the same pixel, i.e. pixel (0, 0), in the reduced image. Accordingly, since pixel (1, 0) in the source image is dark, e.g. has a value of one, pixel (0, 0) in the reduced image is now written with a value of one. The next set of incremental movements occur in both images. As a result, movement occurs, as symbolized by line 1307, to coordinate value (2, 0) in the source image and, as symbolized by line 1345 to coordinate address value (1.563, 0.375) in the reduced image. Coordinate address value (1.875, 0.5) is truncated to pixel (1, 0) in the reduced image. Since pixel (2, 0) in the source image is dark, pixel (1, 0) in the reduced image 1340 is also darkened. If, alternatively, pixel (2, 0) in the source image was not dark, then the value of pixel (1, 0) in the reduced image would be left in its initial state, i.e. zero. The next set of incremental movements occurs in both the source and reduced images. Now, movements occur, as symbolized by line 1309, to coordinate address value (3, 0) in the source image and, as symbolized by line 1347 to coordinate address value (2.188, 0.375) in the reduced image. Coordinate address value (2.188, 0.375) is truncated to pixel (2, 0) in the reduced image. Since pixel (3, 0) in the source image is dark, pixel (2, 0) in reduced image 1340 is also darkened and so on for all the remaining pixels in scan line zero in both the source and reduced images. Once scan line zero in source image 1320 has been completely processed, incremental movement occurs by a full pixel in a vertical direction, as symbolized by line 1311, in source image 1320 to coordinate address (0, 1) and, as symbolized by line 1349, to coordinate address (0.313, 1.125) in reduced image 1340. Coordinate address value (0.313, 1.125) lies within the next pixel, i.e. pixel (0, 1) in the reduced image. Since pixel (0, 1) in the source image is dark, pixel (0, 1) in reduced image 1340 is darkened and so on for all the remaining pixels in scan line one in both the source and reduced images. Once all the pixels in scan line one in the source image have been reached, incremental movement occurs by a full pixel in a vertical direction, as symbolized by line 1313, in source image 1320 and by 0.75 pixels in the vertical direction as symbolized by line 1353. Pixel processing occurs for the scan line two in the source image with values being conditionally written into corresponding pixels in the reduced image, and so on for the remainder of the source and reduced images. The resulting reduced pattern of darkened pixels for those shown in source image 1320 is shown in reduced image 1340.

In addition, given this inventive technique to reduce the size of a bi-tonal image through fractional movement and pixel saving, a bi-tonal image can also be enlarged through a variation of the inventive reduction scaling technique. Specifically, to digitally enlarge (magnify) an original bi-tonal image, in accordance with the teachings of the present invention, incremental movement occurs on a pixel-by-pixel basis, both horizontally and vertically, in an enlarged image with fractional movement, in either or both directions depending upon the desired scale factors, occurring in the source (original) image. Given these incremental movements, the pixel values that occur at successive integer pixel locations in the source image are merely copied, i.e. replicated, into corresponding integer pixel locations in the enlarged image. Since a value will be written into every pixel situated in an enlarged image during scaling, the contents of all the pixels in the enlarged image do not need to be cleared prior to initiating enlargement scaling. Inasmuch as image enlargement using the inventive technique relies on fractional movement but with pixel replication, this inventive method is hereinafter referred to as the fractional movement pixel replication enlargement scaling method.

FIG. 13B diagrammatically shows the manner through which an illustrative source image is scaled to yield an illustrative enlarged image using the inventive fractional movement pixel replication enlargement scaling method.

As shown, source (original) image 1360 is enlarged by different scale factors in both the horizontal and vertical directions, e.g. illustratively 1.6 in the horizontal direction and 1.833 in the vertical direction, to yield enlarged (destination) image 1380. To achieve this enlargement scaling, the starting position in source image 1360 and enlarged image 1380 are respectively taken as (0.313, 0.375) and (0, 0). Each subsequent incremental movement through the source image occurs on a fractional pixel basis, specifically in increments of 0.625 pixels horizontally and, at the end of a scan line, 0.75 pixels vertically. Each subsequent incremental movement through the enlarged image occurs on a full pixel-by-full pixel basis, i.e. in steps of "1", through enlarged image 1380, horizontally and, at end of each scan line, vertically to successively step to each pixel in this image. After a corresponding incremental movement in both images, the pixel value at a current integer pixel location in the source image is merely replicated into a current corresponding integer pixel location in the enlarged image. Those illustrative pixels in both the source and reduced images that are darkened are again marked by an "X". Pixel positions for the source and enlarged images are initialized to (0, 0) and (0.313, 0.375). Inasmuch as the value of the pixel in image 1360, i.e. pixel (0, 0), that contains this location in the source image has a value of "0", i.e. is not dark, the corresponding pixel, i.e. pixel (0, 0), in enlarged image 1380 is set to zero. From initial position 1361, having coordinate address (pixel location) values (0.313, 0.375), in source image 1360, an incremental fractional horizontal movement occurs, as symbolized by line 1363 to pixel coordinate address (0.938, 0.375) in the first scan line, i.e. scan line zero, in this image. A corresponding horizontal incremental movement of a full pixel, as symbolized by line 1383 occurs in enlarged image 1380 from initial position 1381, having coordinate address value (0, 0), to coordinate address value (1, 0). Coordinate address value (0.938, 0.375) lies within pixel (0, 0) in the source image. As can be seen, pixel (0, 0) is not dark, i.e. has a value of zero. Accordingly, pixel (1, 0) in the enlarged image is written with a value of zero. The next set of incremental movements occur in both images. As a result, movement occurs, as symbolized by line 1365, to coordinate address value (1.563, 0.375) in the source image and, as symbolized by line 1385 to coordinate address value (2, 0) in the enlarged image. Coordinate address value (1.563, 0.375) lies within pixel (1, 0) in the source image. Since pixel (1, 0) in the source image is dark, pixel (2, 0) in enlarged image 1340 is also darkened. The next set of incremental movements occur in both the source and reduced images. Now, movements occur, as symbolized by line 1367, to coordinate address value (2.188, 0.375) in the source image and, as symbolized by line 1387, to coordinate address value (3, 0) in the enlarged image. Coordinate address value (2.188, 0.375) lies within pixel (2, 0) in the source image. Since pixel (2, 0) in the source image is dark, pixel (3, 0) in enlarged image 1380 is darkened. Similar incremental movements, as symbolized by lines 1369, 1371 and 1372 in source image 1360 occur to coordinate address values (2.813, 0.375), (3.438, 0.375) and (4.063, 0.375) in this image; while corresponding incremental movements, as symbolized by lines 1389, 1391 and 1392, occur to successive coordinate addresses (4, 0), (5, 0) and (6, 0) in enlarged image 1380 in order to set the pixel values for pixels (4, 0), (5, 0) and (6, 0) in the enlarged image to the values of pixels (2, 0), (3, 0) and (4, 0) in the source image, and so on for all the remaining pixels in scan line zero in both the source and enlarged images. Once scan line zero in source image 1360 has been completely processed, incremental movement occurs by 0.75 pixels in a vertical direction, as symbolized by line 1373, in source image 1360 to coordinate address (0.313, 1.125) and, as symbolized by line 1393, to coordinate (0, 1) in enlarged image 1380. Coordinate address value (0.313, 1.125) lies within pixel (0, 1) in the source image. Since pixel (0, 1) in the source image is dark, pixel (0, 1) in enlarged image 1380 is darkened and so on for all the remaining pixels in scan line one in both the source and reduced images. Once all the pixels in scan line one in the source image have been reached, incremental movement occurs again by 0.75 pixels in a vertical direction, as symbolized by line 1375, to coordinate address (0.313, 1.875) in source image 1360 and by a full pixel in the vertical direction, as symbolized by line 1395, to coordinate address (0, 2) in enlarged image 1380. Pixel processing continues occurs in the source image with values being written into corresponding pixels in the enlarged image, and so on, as illustratively shown by lines 1377 and 1397 for the next incremental vertical movements, for the remainder of the source and enlarged images. The resulting enlarged pattern of darkened pixels for those shown in source image 1360 is shown in enlarged image 1380.

Figure 14B:
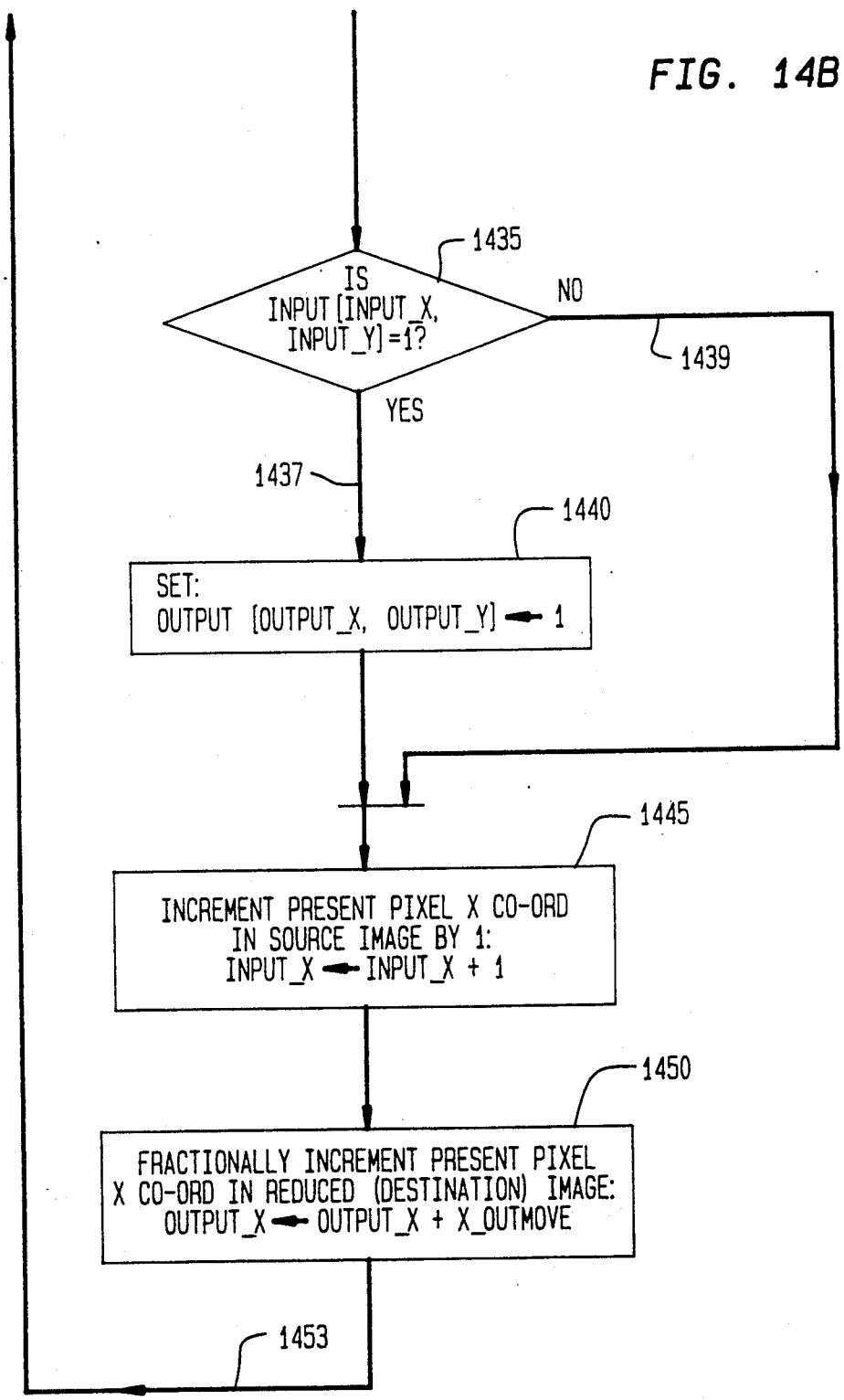

FIGS. 14A and 14B collectively depict a flowchart of Fractional Movement Pixel Saving Reduction Scaling process 1400 that performs image reduction according to the inventive fractional movement pixel saving reduction scaling method; the correct alignment for the drawing sheets for these figures is shown in FIG. 14.

As shown, upon entry into process 1400, step 1405 is first performed which assigns the reciprocals of the desired X and Y scale factors, i.e. X_SCALEFACTOR and Y_SCALEFACTOR, to variables X_OUTMOVE and Y_OUTMOVE. X_OUTMOVE and Y_OUTMOVE store the size of the movement, which is fractional for reduction scaling, in the scaled image that corresponds to a one pixel movement in the input image. Once this occurs, execution proceeds to step 1410 which, when performed, sets the values of all the pixels in the reduced (destination) image to zero. Thereafter, step 1415 is performed to set the values of two temporary variables: INPUT_Y to zero and OUTPUT_Y to half the value of variable Y_OUTMOVE; the latter variable having both integer and fractional components. These variables are indices that point to the vertical location of the current single pixels being processed in both the source and reduced images, respectively. Once step 1415 is performed, execution proceeds to decision step 1420. Reduction scaling is accomplished through execution of steps 1420–1460.

Decision step 1420, when performed, determines whether the entire original (source) image has been scaled by testing whether the vertical location of the next pixel to be processed in this image lies outside the vertical limit, i.e. INPUT_Y_IMAGE_SIZE, of the image. In the event the vertical location of the next pixel to be processed in the source image equals or exceeds the vertical limit of this image, then scaling is complete and execution exits from process 1400, via NO path 1421 that emanates from decision step 1420. Alternatively, if the vertical location of this pixel lies within the source image, then decision step 1420 routes execution, via its YES path, to step 1425. This latter step, when executed, sets the values of two temporary variables: INPUT_X to zero and OUTPUT_X, to half of the value of variable X_OUTMOVE, the latter variable having both integer and fractional components. These variables are indices that point to the horizontal location of the current single pixels being processed in both the source and reduced images, respectively. Together, the variables INPUT_X and INPUT_Y, and OUTPUT_X and OUTPUT_Y define coordinates of a pair of corresponding pixel locations that are currently being processed: one location in the source image and the other location in the reduced image.

Once step 1425 has been executed, execution proceeds to decision step 1430. This decision step, when performed, determines whether a current scan line in the original (source) image has been completely scaled by testing whether the horizontal location of the next pixel to be processed in this line, i.e. the value of variable INPUT_X, lies outside the horizontal limit of the image, i.e. INPUT_X_IMAGE_SIZE. In the event that the next pixel to be processed in the current scan line does not lie outside the horizontal boundary of the source image, then decision step 1430 routes execution, via YES path 1433, to decision step 1435. This latter decision step, when performed, tests whether the value of this next pixel, i.e. the pixel situated at location [INPUT_X, INPUT_Y] in the source image, is one. In the event this pixel has a value of one, then decision step 1435 routes execution, via YES path 1437, to step 1440 to set the corresponding pixel in the scaled image, i.e. that situated at [OUTPUT_X, OUTPUT_Y], to one. The indices are subsequently truncated to determine which integer pixel location to affect during scaling. Execution then proceeds to step 1445. Alternatively, in the event that this pixel in the source image is zero, then decision step 1435 routes execution, via NO path 1439, directly to step 1445. Step 1445, when performed, increments the present horizontal location of the current pixel being processed in the source image (i.e. the horizontal component of the coordinate address for the source image) by one in order to point to the next pixel in the current scan line in this image. Thereafter, step 1450 is performed. This step fractionally increments the present horizontal location in the reduced image (i.e. the horizontal component of the coordinate address for the output image) by the value X_OUTMOVE. Once this occurs, execution loops back, via path 1453, to decision step 1430 and so on to scale the next pixel, if any, that appears in the current scan line in the source image. Alternatively, in the event the horizontal location of the next pixel to be processed in the source image equals or exceeds the horizontal limit of this image, then scaling of the current scan line is complete and execution proceeds, via NO path 1431 emanating from decision step 1430, to step 1455. This latter step, when performed, increments the present vertical location of the current pixel being processed in the source image (i.e. the vertical component of the coordinate address for the source image) by one in order to point to the next scan line in this image. Thereafter, execution proceeds to step 1460 which fractionally increments the present vertical location in the reduced image, i.e. the value of the variable OUTPUT_Y equalling the vertical component of the coordinate address for the output image, by the value of the variable Y_OUTMOVE. Once this occurs, execution loops back, via path 1463, to decision step 1420 and so on to scale the next scan line, if any, that appears in the source image.

Figure 15B:
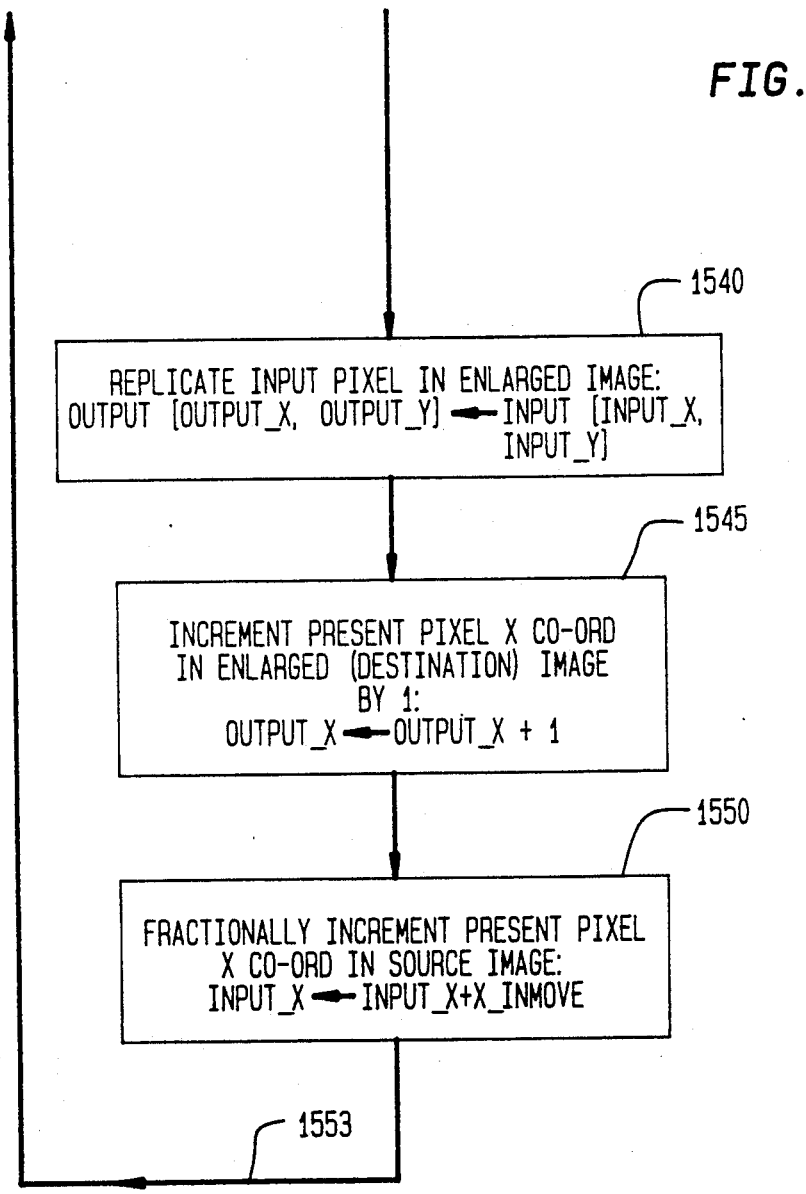

FIGS. 15A and 15B collectively depict a flowchart of Fractional Movement Pixel Replication Enlargement Scaling process 1500 that performs image enlargement according to the inventive fractional movement pixel enlargement scaling method; the correct alignment for the drawing sheets for these figures is shown in FIG. 15.

As shown, upon entry into process 1500, step 1505 is first performed which assigns the reciprocal of the values of the desired X and Y scale factors, i.e. X_SCALEFACTOR and Y_SCALEFACTOR, to variables X_INMOVE and Y_INMOVE. X_INMOVE and Y_INMOVE store the size of the movement, which is fractional for enlargement scaling, in the source image that corresponds to a one pixel movement in the enlarged image. Once this occurs, execution proceeds to step 1510 to set the values of two temporary variables: INPUT_Y to one half of the value of variable Y_INMOVE and; the former variable has both integer and fractional components. These variables are indices that point to the vertical location of the current single pixels being processed in both the source and enlarged images, respectively. Once step 1510 is performed, execution proceeds to decision step 1520. Enlargement scaling is accomplished through execution of steps 1520–1560.

Decision step 1520, when performed, determines whether the entire enlarged image has been generated by testing whether the vertical location of the next pixel to be processed in this image lies outside the vertical limit, i.e. OUTPUT_Y_IMAGE_SIZE, of this image. In the event the vertical location of the next pixel to be processed in the enlarged image equals or exceeds the vertical limit of this image, then scaling is complete and execution exits from process 1500, via NO path 1521 that emanates from decision step 1520. Alternatively, if the vertical location of this pixel lies within the enlarged image, then decision step 1520 routes execution, via its YES path, to step 1525. This latter step, when executed, sets the values two temporary variables: INPUT_X to one half of the value of variable X_INMOVE and OUTPUT_X to zero, the former variable has both integer and fractional components. These variables are indices that point to the horizontal location of the current single pixels being processed in both the source and enlarged images, respectively. Together, the variables INPUT_X and INPUT_Y, and OUTPUT_X and OUTPUT_Y define a pair of corresponding pixel locations that are currently being processed: one pixel location in the source image and the other pixel location in the enlarged image.

Once step 1525 has been executed, execution proceeds to decision step 1530. This decision step, when performed, determines whether a current scan line in the enlarged image has been completely scaled by testing whether the horizontal location of the next pixel to be processed in this line, i.e. the value of variable OUTPUT_X, lies outside the horizontal limit of the image, i.e. OUTPUT_X_IMAGE SIZE. In the event that the next pixel to be processed in the current scan line does not lie outside the horizontal boundary of the enlarged image, then decision step 1530 routes execution, via YES path 1533, to step 1540. This latter step, when performed, merely replicates the value of the pixel at the current location in the source image, i.e. INPUT [INPUT_X, INPUT_Y], to the pixel situated at the present pixel location in the enlarged image, i.e. OUTPUT [OUTPUT_X, OUTPUT_Y]. Indices INPUT_X and INPUT_Y are truncated, though not specifically shown, to determine the integer pixel position to read in the source image. Execution then proceeds to step 1545. Step 1545, when performed increments the present horizontal pixel location of the current pixel being processed in the enlarged image (i.e. the horizontal component of the coordinate address for the output image) by one in order to point to the next pixel in the current scan line in this image. Thereafter, step 1550 is performed. This step fractionally increments the present horizontal pixel location in the source image (i.e. the horizontal component of the coordinate address in the source image) by the value X_INMOVE. Once this occurs, execution loops back, via path 1553, to decision step 1530 and so on to generate the next pixel, if any, that appears in the current scan line in the enlarged image. Alternatively, in the event the horizontal location of the next pixel to be generated in the enlarged image equals or exceeds the horizontal limit of this image, then scaling of the current, scan line is complete and execution proceeds, via NO path 1531 emanating from decision step 1530, to step 1555. This latter step, when performed, increments the present vertical location of the current pixel being generated in the enlarged image (i.e. the vertical component of the coordinate address for the output image) by one in order to point to the next scan line in this image. Thereafter, execution proceeds to step 1560 which fractionally increments the present vertical location, i.e. the value of variable INPUT_Y, in the source image (which is the vertical component of the coordinate address for the source image) by the value of the variable Y_INMOVE. Once this occurs, execution loops back, via path 1563, to decision step 1520 and so on to generate the next scan line, if any, that is to appear in the enlarged image.

Figure 16:
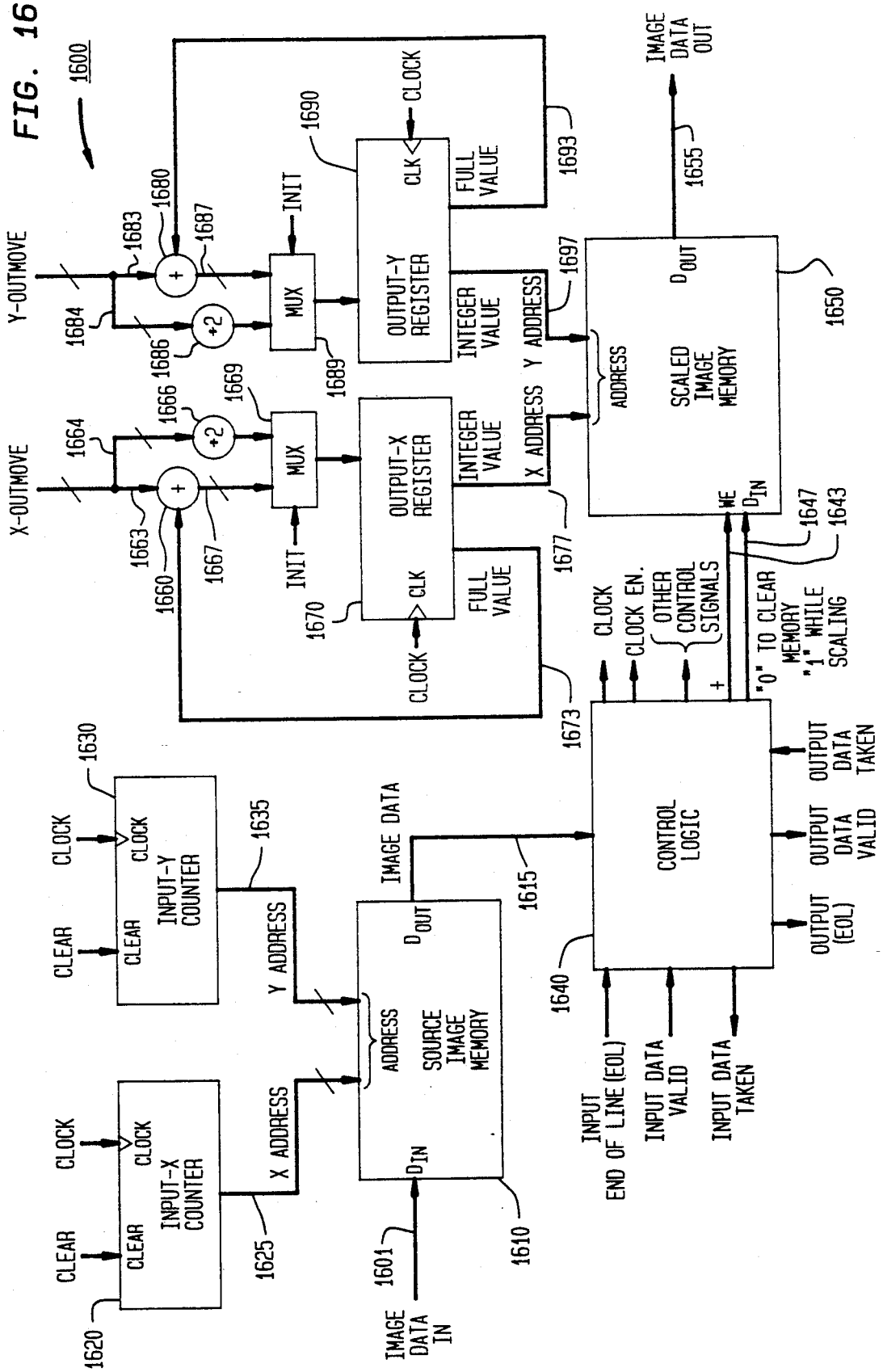
FIG. 16 is a block diagram of fractional movement pixel saving reduction scaler 1600 that performs image reduction scaling in hardware using the inventive fractional movement pixel saving reduction scaling method.

Lastly, FIG. 16 shows a block diagram of fractional movement pixel saving reduction scaler 1600 that performs image reduction scaling in hardware using the inventive fractional movement pixel saving reduction scaling method.

As shown, scaler 1600 contains Input_X counter 1620, Input_Y counter 1630, input image memory 1610, adder 1660, Output_X register 1670, adder 1680, Output_Y register 1690, output (scaled) image memory 1650, multiplexors 1669 and 1689, and control logic 1640. Input_X and Input_Y counters 1620 and 1630 are initially loaded with the desired vertical and horizontal scale factors, through inputs not specifically shown. These counters are then suitably incremented by one at successive clock edges to generate an incrementing two-dimensional address of a current pixel being accessed in the source image which steps through each pixel on a pixel-by-pixel and scan line by scan line basis in the source image. The horizontal, X Address, appears on leads 1625; while the vertical, Y Address, appears on leads 1635. Both of these addresses are collectively applied as a common address to source image memory 1610. This memory stores the a complete bit map of the bi-tonal pixel values that form the source image. Either prior to start of reduction scaling or while scaling is in process, the pixel values for the source image successively appear on lead 1601 and are successively written into the source image memory under the control of control logic 1640 and counters 1620 and 1630. During scaling, each pixel value in the source image that is accessed from memory 1610 is applied over lead 1615 as an input to control logic 1640. In response to each high level pixel value appearing on lead 1615, control logic 1640 produces a high level signal on lead 1643 as a write enable signal to scaled image memory 1650 along with a high level on lead 1647 as the data input to this memory. As a result of these signals, scaled image memory 1650 writes a "one" into its currently addressed location. This memory stores a bit-map of bi-tonal pixel values that form the entire scaled image. The address to memory 1650 is formed by adders 1660 and 1680, and Output_X and Output_Y registers 1670 and 1690. Specifically, during reduction scaling, the desired fractional values of the incremental horizontal and vertical movement, X_OUTMOVE and Y_OUTMOVE, through the reduced image are applied, in parallel form, via leads 1663 and 1683, to separate inputs of adders 1660 and 1680, respectively. The output of these adders is routed via leads 1667 and 1687 and multiplexors 1669 and 1989 to Output_X and Output_Y registers 1670 and 1690 and clocked therein at successive clock edges during reduction scaling. Specifically Output_X register 1670 is clocked simultaneously with Input_X register 1620 to generated a scan line of reduced pixels in the scaled image. Likewise, Output_Y register 1690 is clocked simultaneously with Input_Y register 1630 to begin generating the next scan line of reduced pixels in the scaled image. The full contents, i.e. both the integer and non-integer components, of registers 1670 and 1690 are fed back, via leads 1673 and 1693, respectively, to corresponding inputs of adders 1660 and 1680. Accordingly, at each successive clock pulse, the contents of register 1670 are incremented to a successive horizontal coordinate in the scaled image. Once the end of a scan line has been reached in the source image, register 1690 is clocked in order to increment its contents by the desired fractional vertical increment. Collectively, at each clock edge, the integer components of the contents stored within registers 1670 and 1690 generate the next pixel location in the scaled image at which a pixel value is to be written in the scaled image. The integer address outputs produced by counters 1670 and 1690 are applied by leads 1677 and 1697, respectively, to a common address input to scaled image memory 1650. After the scaled image has been fully generated, this image is read from memory 1650 on a serial basis over output lead 1655 under the control of control logic 1640. Prior to the start of reduction scaling, the contents of registers 1670 and 1690 are suitably initialized by control logic 1640 through multiplexors 1669 and 1689, to one half the values of variables X_OUTMOVE and Y_OUTMOVE, respectively. Specifically, an INIT pulse applied to a control (C) input of each multiplexor cause multiplexors 1669 and 1689 to route one half of the value of variables X_OUTMOVE and Y_OUTMOVE to the inputs of Output_X register 1670 and Output_Y register 1690. Control logic 1640 then loads these values into registers 1670 and 1690. These half values are obtained by simply offsetting the individual leads that collectively form leads 1664 and 1684, which feed respective inputs of multiplexors 1669 and 1689, by one bit position to the right in order to effectuate division by two, as symbolized by dividers 1666 and 1686. In addition, the contents of memory 1650 are also cleared to zero by control logic 1640 by suitably and successively incrementing the address in counters 1670 and 1690 by one full pixel in order to step through all the pixels in memory 1650 while generating suitable data (a zero level) and write enable signals to this memory.

Control logic 1640, in response to various incoming control and clock signals, such as inter alia input EOL and input data valid and output data taken signals, generates the appropriate clock, write enable and other control signals necessary to control both the operation of the circuitry contained within reduction scaler 1600 and the transfer of input and output bit-mapped image data to and from this scaler.

A hardware implementation of a scaler that implements the inventive fractional movement pixel replication enlargement scaling process would be very similar to that used for scaler 1600. The input and output X and Y position registers would be reversed from that shown in scaler 1600 in order to fractionally step through the source image rather than through an output image, here the enlarged image, and successively incrementally step by a single full pixel through the enlarged image rather than through the source image. Due to the high degree of similarity between the hardware implementations of these two scalers, the implementation for the enlargement scaler that embodies the inventive fractional movement pixel replication method has not been shown but by now would be readily apparent to those skilled in the art.

Clearly, after reading the foregoing description, those skilled in the art will quickly recognize that the inventive error diffusion pixel replication enlargement scaling method can be readily extended in a variety of ways. First, although this inventive method has been described in the context of filling a block by replicating a single pixel value, this single value can itself be replaced by a logical combination of pixel values that form a block in an original image. The resulting pixel value formed through this combination would then itself be replicated accordingly to fill a larger block of pixels in an enlarged image, or, in conjunction with the inventive error diffusion pixel saving reduction scaling method, a smaller block of pixels in a reduced image. This combination can be formed by simply "OR'ing" together the pixels in a block or combining these pixels using a different logical function, such as for example, majority polling. In conjunction with reduction scaling, the logical function that is used can be selected from several such functions to vary the degree of pixel saving based upon a pre-defined characteristic(s) of the source image. For example, on the one hand, a logical function, such as a simple "OR" operation, may be selected in those images where maximal source image detail is to be preserved in the reduced image. On the other hand, a different logical function may be chosen in an attempt to recognize and preserve image edges but simultaneously eliminate image noise that takes the form of isolated pixel(s) in the source image. In this instance, isolated single pixels or isolated groups of multiple pixels, having pre-defined shapes, may be assumed to be noise. Input pattern matching could be used, in conjunction with a moving window of a pre-defined size, to recognize this type of image noise wherever it occurs in a source image and then remove it by setting each of the pixels associated with each occurrence of such noise to zero before these pixel values are used to generate corresponding pixel values in a scaled image. As a result, selective rather than universal pixel saving occurs in order to remove (filter out) image noise but retain image detail, at least to an extent that is realistically possible. As images are processed that have increasingly high levels of noise, the logical function, including, for example, the number and size of the pre-defined different noise patterns used in pattern matching to identify and remove image noise, can be suitably changed to provide increased degrees of noise filtering. However, the logical functions and/or noise patterns must be suitably chosen such that image detail, to the extent it does degrade through noise removal, does not degrade to the point where the image, particularly when reduced, ceases to be grossly recognizable to a viewer.

Furthermore, the inventive error diffusion pixel saving reduction scaling method could be readily utilized in conjunction with continuous tone ("contone"), rather than just bi-tonal, pixel values. In this case, each "contone" pixel value can be appropriately thresholded to yield a corresponding bi-tonal pixel value which is subsequently processed by this inventive method. Alternatively, the "contone" values that occur within a block of pixels in a source image can be combined, such as by taking the maximum or average value of all these "contone" values, to yield a corresponding single "contone" value for use in the reduced image. Similarly, the inventive error diffusion pixel replication enlargement scaling method can be readily modified to process "contone" pixel values. Here, a "contone", rather than a bi-tonal, pixel value would be simply replicated for each pixel in the source image to each of the pixels that form a corresponding block in the enlarged image.

In addition, the inventive scaling methods have been discussed in the context of scaling along illustratively the vertical and horizontal directions in a source image. While these directions are likely to be those over which scaling occurs most often in practice, those skilled in the art realize that scaling could occur along other directions as well, such as diagonally through a source image. As such, if scaling is to occur in a different direction, then the groupsize of the blocks oriented along this direction, either in the source or destination image depending upon whether reduction or enlargement scaling is being used, is periodically varied to generate the appropriate scale factor occurring along that direction. Moreover, while scaling is discussed as occurring along two orthogonal directions, these directions need not be orthogonal. In fact, different scale factors can be used along parallel directions in an image to provide differing amounts of scaling along each of these directions. Moreover, a selected portion of a source image, rather than the entire image itself, can be scaled to "zoom" into and expand that portion of the image. In this case, scaling would occur of a defined range of pixels in the source image, rather than over all of these pixels. The horizontal and vertical address for pixels located at the boundaries of this range would be used in lieu of the end of line (EOL) and end of image control signals in order to appropriately terminate scaling.

Although various embodiments of the present invention have been shown and described in detail herein, many other varied embodiments that incorporate the teachings of the invention may be easily constructed by those skilled in the art.

INDUSTRIAL APPLICABILITY AND ADVANTAGES

The present invention is particularly useful in those applications that need digital image scaling and particularly in image management systems where several bi-tonal images, in reduced size format, are to be simultaneously displayed in non-overlapping portions of a common display screen of a multi-image display. The invention advantageously reduces bi-tonal images in a relatively fast and simple manner as compared to that previously used in the art thereby advantageously increasing the performance of the image management system. The invention can also be used to enlarge bi-tonal digital images in a relatively fast and simple manner.

I claim:

1. A method for scaling a digitized source image of a first size to yield a digitized output image of a second size; said method comprising the steps of:
   (a) initializing first and second coordinate addresses to corresponding first and second starting pixel addresses in respectively digitized source and output images;
   (b) incrementing the first coordinate address horizontally by a first pre-defined horizontal increment to yield a new value of the first coordinate address, said first coordinate address representing a position in the source image;
   (c) incrementing the second coordinate address horizontally by a second pre-defined horizontal increment to yield a new value of the second coordinate address, said second coordinate address representing a position in the output image;
   (d) setting, in response to the new values of said first and second coordinate addresses, a value of a specific pixel in the bit map of said output image equal to a specific pixel in a bit map of said source image, wherein said specific pixels in the bit maps of said source and output images are respectively defined by integer portions of the new values of said first and second coordinate addresses;
   (e) repeating steps (b)-(d) until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and
   (f) repeating steps (b)-(e) until a pre-defined vertical end condition is reached in the bit map of the source image whereby a desired bit map for the output image is generated, and
   wherein said first and second pre-defined horizontal increments are respectively one and less than one in value so that horizontal reduction scaling is produced in the output image.

2. The method in claim 1 further comprising the step of setting a value of a first initial pixel in the bit map of said output image to a value of a second initial pixel in the bit map of said source image, said first and second initial pixels being defined by integer portions of respectively said first and second starting pixel addresses.

3. A method for scaling a digitized source image of a first size to yield a digitized output image of a second size; said method comprising the steps of:
   (a) initializing first and second coordinate addresses to corresponding first and second starting pixel addresses in respectively digitized source and output images;
   (b) incrementing the first coordinate address horizontally by a first pre-defined horizontal increment to yield a new value of the first coordinate address, said first coordinate address representing a position in the source image;
   (c) incrementing the second coordinate address horizontally by a second pre-defined horizontal increment to yield a new value of the second coordinate address, said second coordinate address representing a position in the output image;
   (d) setting, in response to the new values of said first and second coordinate addresses, a value of a specific pixel in the bit map of said output image equal to a specific pixel in a bit map of said source image, wherein said specific pixels in the bit maps of said source and output images are respectively defined by integer portions of the new values of said first and second coordinate addresses;
   (e) repeating steps (b)-(d) until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and
   (f) repeating steps (b)-(e) until a pre-defined vertical end condition is reached in the bit map of the source image whereby a desired bit map for the output image is generated, and
   wherein said first and second pre-defined vertical increments are respectively one and less than one in value so that vertical reduction scaling is produced in the output image.

4. The method in claim 3 further comprising the step of setting a value of a first initial pixel in the bit map of said output image to a value of a second initial pixel in the bit map of said source image, said first and second initial pixels being defined by integer portions of respectively said first and second starting pixel addresses.

5. A method for scaling a digitized source image of a first size to yield a digitized output image of a second size; said method comprising the steps of:
  (a) initializing first and second coordinate addresses to corresponding first and second starting pixel addresses in respectively digitized source and output images;
  (b) incrementing the first coordinate address horizontally by a first pre-defined horizontal increment to yield a new value of the first coordinate address, said first coordinate address representing a position in the source image;
  (c) incrementing the second coordinate address horizontally by a second pre-defined horizontal increment to yield a new value of the second coordinate address, said second coordinate address representing a position in the output image;
  (d) setting, in response to the new values of said first and second coordinate addresses, a value of a specific pixel in the bit map of said output image equal to a specific pixel in a bit map of said source image, wherein said specific pixels in the bit maps of said source and output images are respectively defined by integer portions of the new values of said first and second coordinate addresses;
  (e) repeating steps (b)-(d) until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and
  (f) repeating steps (b)-(e) until a pre-defined vertical end condition is reached in the bit map of the source image whereby a desired bit map for the output image is generated, and
  wherein said first and second pre-defined horizontal increments are respectively less than one and one in value so that horizontal enlargement scaling is produced in the output image.

6. The method in claim 5 further comprising the step of setting a value of a first initial pixel in the bit map of said output image to a value of a second initial pixel in the bit map of said source image, said first and second initial pixels being defined by integer portions of respectively said first and second starting pixel addresses.

7. A method for scaling a digitized source image of a first size to yield a digitized output image of a second size; said method comprising the steps of:
  (a) initializing first and second coordinate addresses to corresponding first and second starting pixel addresses in respectively digitized source and output images;
  (b) incrementing the first coordinate address horizontally by a first pre-defined horizontal increment to yield a new value of the first coordinate address, said first coordinate address representing a position in the source image;
  (c) incrementing the second coordinate address horizontally by a second pre-defined horizontal increment to yield a new value of the second coordinate address, said second coordinate address representing a position in the output image;
  (d) setting, in response to the new values of said first and second coordinate addresses, a value of a specific pixel in the bit map of said output image equal to a specific pixels in the bit maps of said source and output images are respectively defined by integer portions of the new values of said first and second coordinate addresses;
  (e) repeating steps (b)-(d) until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and
  (f) repeating steps (b)-(e) until a pre-defined vertical end condition is reached in the bit map of the source image whereby a desired bit map for the output image is generated, and
  wherein said first and second pre-defined vertical increments are respectively less than one and one in value so that vertical enlargement scaling is produced in the output image.

8. The method in claim 7 further comprising the step of setting a value of a first initial pixel in the bit map of said output image to a value of a second initial pixel in the bit map of said source image, said first and second initial pixels being defined by integer portions of respectively said first and second starting pixel addresses.

9. Apparatus for scaling a digitized source image of a first size to yield a digitized output image of a second size, said apparatus comprising:
  means for initializing first and second coordinate addresses to corresponding first and second starting pixel addresses in respectively digitized source and output images;
  first means for incrementing the first coordinate address horizontally by a first pre-defined horizontal increment to yield a new value of the first coordinate address, said first coordinate address representing a position in the source image;
  second means for incrementing the second coordinate address horizontally by a second pre-defined horizontal increment to yield a new value of the second coordinate address, said second coordinate address representing a position in the output image;
  means, responsive to the new values of said first and second coordinate addresses, for setting a value of a specific pixel in the bit map of said output image equal to a specific pixel in a bit map of said source image, wherein said specific pixels in the bit maps of said source and output images are respectively defined by integer portions of the new values of said first and second coordinate addresses; and
  control mans for repetitively invoking said first and second incrementing means and said setting means until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and for terminating scaling when a pre-defined vertical end condition is reached in the bit map of the source image whereby a desired bit map for the output image is generated; and
  wherein said first and second pre-defined horizontal increments are respectively one and less than one in value so that horizontal reduction scaling is produced in the output image.

10. The apparatus in claim 9 wherein said control means further comprises means for setting a value of a first initial pixel in the bit map of said output image to a value of a second initial pixel in the bit map of said source image, said first and second initial pixels being defined by integer portions of respectively said first and second starting pixel addresses.

11. The apparatus in claim 10 wherein said specific pixel value setting means comprises:
   a first image memory, responsive to the new value of said first coordinate address, for storing the bit map of said source image, and
   a second image memory, responsive to the new value of said second coordinate address, for storing the bit map of said output image.

12. Apparatus for scaling a digitized source image of a first size to yield a digitized output image of a second size, said apparatus comprising:
   means for initializing first and second coordinate addresses to corresponding first and second starting pixel addresses in respectively digitized source and output images;
   first means for incrementing the first coordinate address horizontally by a first pre-defined horizontal increment to yield a new value of the first coordinate address, said first coordinate address representing a position in the source image;
   second means for incrementing the second coordinate address horizontally by a second pre-defined horizontal increment to yield a new value of the second coordinate address, said second coordinate address representing a position in the output image;
   means, responsive to the new values of said first and second coordinate addresses, for setting a value of a specific pixel in the bit map of said output image equal to a specific pixel in a bit map of said source image, wherein said specific pixels in the bit maps of said source and output images are respectively defined by integer portions of the new values of said first and second coordinate addresses; and
   control means for repetitively invoking said first and second incrementing means and said setting means until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and for terminating scaling when a pre-defined vertical end condition is reached in the bit map of the source image whereby a desired bit map for the output image is generated; and
   wherein said first and second pre-defined vertical increments are respectively one and less than one in value so that vertical reduction scaling is produced in the output image.

13. The apparatus in claim 12 wherein said control means further comprises means for setting a value of a first initial pixel in the bit map of said output image to a value of a second initial pixel in the bit map of said source image, said first and second initial pixels being defined by integer portions of respectively said first and second starting pixel addresses.

14. The apparatus in claim 13 wherein said specific pixel value setting means comprises:
   a first image memory, responsive to the new value of said first coordinate address, for storing the bit map of said source image, and
   a second image memory, responsive to the new value of said second coordinate address, for storing the bit map of said output image.

15. Apparatus for scaling a digitized source image of a first size to yield a digitized output image of a second size, said apparatus comprising:
   means for initializing first and second coordinate addresses to corresponding first and second starting pixel addresses in respectively digitized source and output images;
   first means for incrementing the first coordinate address horizontally by a first pre-defined horizontal increment to yield a new value of the first coordinate address, said first coordinate address representing a position in the source image;
   second means for incrementing the second coordinate address horizontally by a second pre-defined horizontal increment to yield a new value of the second coordinate address, said second coordinate address representing a position in the output image;
   means, responsive to the new values of said first and second coordinate addresses, for setting a value of a specific pixel in the bit map of said output image equal to a specific pixel in a bit map of said source image, wherein said specific pixels in the bit maps of said source and output images are respectively defined by integer portions of the new values of said first and second coordinate addresses; and
   control means for repetitively invoking said first and second incrementing means and said setting means until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and for terminating scaling when a pre-defined vertical end condition is reached in the bit map of the source image whereby a desired bit map for the output image is generated; and
   wherein said first and second pre-defined horizontal increments are respectively less than one and one in value so that horizontal enlargement scaling is produced in the output image.

16. The apparatus in claim 15 wherein said control means further comprises means for setting a value of a first initial pixel in the bit map of said output image to a value of a second initial pixel in the bit map of said source image, said first and second initial pixels being defined by integer portions of respectively said first and second starting pixel addresses.

17. The apparatus in claim 16 wherein said specific pixel value setting means comprises:
   a first image memory, responsive to the new value of said first coordinate address, for storing the bit map of said source image, and
   a second image memory, responsive to the new value of said second coordinate address, for storing the bit map of said output image.

18. Apparatus for scaling a digitized source image of a first size to yield a digitized output image of a second size, said apparatus comprising:
   means for initializing first and second coordinate addresses to corresponding first and second starting pixel addresses in respectively digitized source and output images;

first means for incrementing the first coordinate address horizontally by a first pre-defined horizontal increment to yield a new value of the first coordinate address, said first coordinate address representing a position in the source image;

second means for incrementing the second coordinate address horizontally by a second pre-defined horizontal increment to yield a new value of the second coordinate address, said second coordinate address representing a position in the output image;

means, responsive to the new values of said first and second coordinate addresses, for setting a value of a specific pixel in the bit map of said output image equal to a specific pixel in a bit map of said source image, wherein said specific pixels in the bit maps of said source and output images are respectively defined by integer portions of the new values of said first and second coordinate addresses; and control means for repetitively invoking said first and second incrementing means and said setting mans until a pre-defined horizontal end condition is reached in the bit map of either said source or output images at which both the first and second coordinate addresses are reset to starting horizontal coordinate locations of said first and second starting pixel addresses and are incremented by first and second pre-defined vertical increments, respectively; and for terminating scaling when a pre-defined vertical end condition is reached in the bit map of the source image whereby a desired bit map for the output image is generated; and wherein said first and second pre-defined vertical increments are respectively less than one and one in value so that vertical enlargement scaling is produced in the output image.

19. The apparatus in claim 18 wherein said control means further comprises means for setting a value of a first initial pixel in the bit map of said output image to a value of a second initial pixel in the bit map of said source image, said first and second initial pixels being defined by integer portions of respectively said first and second starting pixel addresses.

20. The apparatus in claim 19 wherein said specific pixel value setting means comprises:

a first image memory, responsive to the new value of said first coordinate address, for storing the bit map of said source image, and a second image memory, responsive to the new value of said second coordinate address, for storing the bit map of said output image.

* * * * *